US010427518B2

(12) United States Patent
Komiya

(10) Patent No.: US 10,427,518 B2
(45) Date of Patent: Oct. 1, 2019

(54) WORK VEHICLE

(71) Applicant: YANMAR CO., LTD., Osaka-shi, Osaka (JP)

(72) Inventor: Toshitaka Komiya, Osaka (JP)

(73) Assignee: YANMAR CO., LTD., Osaka (JP)

( * ) Notice: Subject to any disclaimer, the term of this patent is extended or adjusted under 35 U.S.C. 154(b) by 119 days.

(21) Appl. No.: 15/489,034

(22) Filed: Apr. 17, 2017

(65) Prior Publication Data

US 2017/0225561 A1 Aug. 10, 2017

Related U.S. Application Data

(63) Continuation of application No. PCT/JP2015/078381, filed on Oct. 6, 2015.

(30) Foreign Application Priority Data

Oct. 16, 2014 (JP) ................. 2014-211347

(51) Int. Cl.
| | |
|---|---|
| *B60K 15/063* | (2006.01) |
| *B60K 15/067* | (2006.01) |
| *F02M 37/00* | (2006.01) |
| *F02M 37/22* | (2019.01) |
| *B60K 1/04* | (2019.01) |
| *B60K 15/03* | (2006.01) |

(52) U.S. Cl.
CPC .............. *B60K 15/067* (2013.01); *B60K 1/04* (2013.01); *B60K 15/063* (2013.01); *F02M 37/00* (2013.01); *F02M 37/22* (2013.01); *B60K 2015/03118* (2013.01); *B60Y 2200/221* (2013.01)

(58) Field of Classification Search
CPC .... B60K 15/063; B60K 15/067; B60K 15/07; B60K 2015/0632
See application file for complete search history.

(56) References Cited

U.S. PATENT DOCUMENTS

| | | | | |
|---|---|---|---|---|
| 2,622,887 A | * | 12/1952 | Prior | B60K 15/00 220/23.2 |
| 3,311,183 A | * | 3/1967 | Phillips | B60K 15/00 180/54.1 |
| 3,667,563 A | * | 6/1972 | Korb | B60K 15/00 180/68.5 |

(Continued)

FOREIGN PATENT DOCUMENTS

| | | |
|---|---|---|
| JP | 2002-144895 A | 5/2002 |
| JP | 2004-074939 A | 3/2004 |

(Continued)

*Primary Examiner* — Tony H Winner
(74) *Attorney, Agent, or Firm* — Norton Rose Fulbright US LLP

(57) ABSTRACT

In the work vehicle, a pair of left and right fuel tanks is distributed into left and right sides of a traveling body. A tank support plate to support the fuel tanks from below is made up of a pair of front and rear transverse frames extended leftward and rightward below the left and right rear frames, and a pair of left and right tank mounting plates on which the front and rear transverse frames are held in a back-and-forth direction on both left and right sides. The left and right fuel tanks are respectively mounted and secured onto the left and right tank mounting plates. A support mount and the front transverse frame are coupled to each other by a coupling bracket.

7 Claims, 33 Drawing Sheets

(56) References Cited

U.S. PATENT DOCUMENTS

| | | | | |
|---|---|---|---|---|
| 4,149,733 A | * | 4/1979 | Grooss | B62D 49/08 |
| | | | | 280/834 |
| 4,149,734 A | * | 4/1979 | Sylvester | A01M 7/0085 |
| | | | | 280/833 |
| 6,550,811 B1 | * | 4/2003 | Bennett | B60K 15/03 |
| | | | | 180/314 |
| 2008/0007096 A1 | * | 1/2008 | Fleming | B60K 15/063 |
| | | | | 296/204 |
| 2010/0206883 A1 | * | 8/2010 | Honzek | A01C 15/006 |
| | | | | 220/562 |
| 2015/0060171 A1 | * | 3/2015 | Tani | B60K 15/063 |
| | | | | 180/69.4 |
| 2016/0089974 A1 | * | 3/2016 | Tanigawa et al. | B60K 15/063 |
| | | | | 280/834 |

FOREIGN PATENT DOCUMENTS

| | | |
|---|---|---|
| JP | 2006-273147 A | 10/2006 |
| JP | 2007-92400 A | 4/2007 |
| JP | 2007-204993 A | 8/2007 |
| JP | 2007-245750 A | 9/2007 |
| JP | 2008-6981 A | 1/2008 |
| JP | 2010-042779 A | 2/2010 |
| JP | 2010-115990 A | 5/2010 |
| JP | 2012-201187 A | 10/2012 |
| JP | 2013116692 A | 6/2013 |
| JP | 2013-226872 A | 11/2013 |

* cited by examiner

WORK VEHICLE

CROSS-REFERENCE TO RELATED APPLICATIONS

The present application is a continuation application of International Application No. PCT/JP2015/078381, filed Oct. 6, 2015, which claims priority to Japanese Patent Application No. 2014-211347, filed Oct. 16, 2014. The contents of these applications are incorporated herein by reference in their entirety.

BACKGROUND OF THE INVENTION

The invention of the present application relates to work vehicles.

As higher-level emission regulations have been applied to diesel engines, agricultural machines, construction machines, and ships that include a diesel engine are required to include a post-processing device, such as an exhaust-gas purification device that removes air pollutants in exhaust gas. Therefore, when mounting an exhaust-gas purification device, in some of work vehicles of related art, such as tractors, the exhaust gas purification device is disposed together with a diesel engine inside an engine compartment below a hood (refer to Japanese Unexamined Patent Application Publication No. 2013-116692).

In work vehicles, such as tractors, a fuel tank to store fuel supplied to an engine is made into a pair, and the pair of fuel tanks is distributed into the left and right of a vehicle body while avoiding the engine, a transmission, or the like (refer to Japanese Unexamined Patent Application Publication No. 2010-042779). Further in the work vehicles, such as the tractors, the battery is disposed at a position ahead of a heat exchanger, such as a radiator, in the engine compartment in order to make the battery insusceptible to the influence of exhaust heat from the engine.

SUMMARY OF THE INVENTION

When the diesel engine having the above-mentioned exhaust-gas countermeasure device is applied to the work vehicles, such as the tractors, it is necessary to pack, in a limited narrow mounting space, not only the diesel engine and the exhaust-gas countermeasure device but also various components, such as electronic components related to the radiator, the battery, and the exhaust-gas countermeasure device.

However, in the mounting space of the work vehicle, not only the diesel engine itself but also the exhaust-gas purification device becomes extremely hot due to heat generation from the diesel engine being driven. Therefore, temperature adjustment in the engine compartment becomes necessary so as not be adversely affected by the heat generation from the diesel engine and the exhaust-gas countermeasure device, and it is necessary to consider appropriate arrangement structure and cooling structure. Comfortableness of an operator is deteriorated unless heating to an operator's seat disposed behind the engine compartment is reduced.

An installation position of the fuel tank is also limited, and hence there is a limit in increasing an entire capacity of the fuel tank, and it is also obstructive to getting on and off of the operator depending on the shape of the fuel tank. Sufficient support strength is needed when mounting a large capacity fuel tank.

Accordingly, the invention of the present application provides a work vehicle that has been improved taking into consideration the above-described current status.

According to one aspect of the invention of the present application, a work vehicle includes an engine serving as a driving source, a traveling section configured to drive on a basis of power of the engine, and a transmission section configured to transmit the power of the engine to the traveling section. A traveling body is configured by coupling left and right front frames and left and right rear frames in a back-and-forth direction. An operator's seat is supported on the traveling body with a support mount interposed therebetween. A pair of left and right fuel tanks are distributed into left and right sides of the traveling body. A tank support plate to support the fuel tanks from below is made up of a pair of front and rear transverse frames extended leftward and rightward below the left and right rear frames and a pair of left and right tank mounting plates on which the front and rear transverse frames are held in the back-and-forth direction on both left and right sides. The left and right fuel tanks are respectively mounted and secured onto the left and right tank mounting plates. The support mount and the front transverse frame are coupled to each other by a coupling bracket.

In the work vehicle, a front end of each of the left and right rear frames may be held by a beam frame. A rear end of each of the left and right rear frames may be coupled to left and right side surfaces of the transmission section. The traveling body may be supported by the traveling section with the transmission section interposed therebetween. Each of the front and rear transverse frames may be secured in a hanging manner by being fastened to a lower surface of the beam frame and a lower surface of the transmission section.

In the work vehicle, the left and right fuel tanks may be fuel tanks having different capacities. An oil separator to separate water from a fuel in the fuel tanks may be mounted on the first tank mounting plate with a first fuel tank having a small capacity mounted thereon. The oil separator may be mounted at a front position of the first fuel tank on the first tank mounting plate.

In the work vehicle, a step for getting on and off the operator's seat may be coupled to one end of the transverse frame being coupled to the support mount.

According to another aspect of the invention of the present application, a work vehicle includes an engine serving as a driving source, a traveling section configured to drive on a basis of power of the engine, and a transmission section configured to transmit the power of the engine to the traveling section. A traveling body is configured by coupling left and right front frames and left and right rear frames in a back-and-forth direction. A pair of left and right fuel tanks are distributed into left and right sides of the traveling body. A tank support plate to support the fuel tanks from below is made up of a pair of front and rear transverse frames extended leftward and rightward below the left and right rear frames and a pair of left and right tank mounting plates on which the front and rear transverse frames are held in the back-and-forth direction on both left and right sides. The left and right fuel tanks are respectively mounted and secured onto the left and right tank mounting plates. A battery is supported on one end of the front transverse frame.

In the work vehicle, an operator's seat may be supported by an upper part of the traveling body with support mounts interposed therebetween. The battery case may be supported by a coupling bracket being coupled to one of front support mounts of the support mounts which support a front of the operator's seat. The battery may be accommodated in the battery case.

In the work vehicle, the battery may be supported, adjacently to a hood covering the engine, by one lower side of the operator's seat.

In the work vehicle, the step for getting on and off the operator's seat may be disposed at lower left and right parts of the operator's seat. A part of the step may be supported by the front transverse frame.

The work vehicle may include a post-processing device which is disposed on an upper part of the engine and purifies exhaust gas of the engine, and an exhaust pipe through which exhaust gas from the post-processing device is exhausted to the outside. The exhaust pipe made into a U-shape may be secured in front of the operator's seat. A drain hole for draining water may be disposed on a lower side of the exhaust pipe. A wind direction plate to cover a lower side of the drain hole from one side may be coupled to the exhaust pipe.

With the embodiment of the invention of the present application, the tank support plate is configured to include the front and rear transverse frames supported by the rear frame, and only the fuel tank mounting part is configured by the plate. This ensures support strength to support the fuel tanks that become heavy, while reducing the weight of the tank support plate. Further, by fastening the front and rear transverse frames to the beam frame and the transmission section, the tank support plate to support the fuel tank that becomes heavy is secured to the highly rigid beam frame and the transmission section, thereby making it possible to support the fuel tanks in a highly rigid and stable manner.

With the embodiment of the invention of the present application, the battery is supported by the body frame that is a strength member with the bracket interposed therebetween, thus leading to improved strength to support the battery. Additionally, the battery can be disposed at a position close to each of the engine and the operator's seat which are located outside the hood and need power supply. This contributes to reduction of a power supply harness.

With the embodiment of the invention of the present application, the step is supported by the body frame that is a strength member with the bracket and the front transverse frame interposed therebetween. This makes it possible to improve the strength to support the step. Furthermore, with the invention of the present application, draining in a direction free from covering by the wind direction plate is attainable by covering the drain hole with the wind direction plate. This prevents failures due to heat damage or water leak in components having low heat resistance or water resistance, such as the harness and the battery disposed adjacent to the exhaust pipe, when water that becomes hot in the exhaust pipe is drained to the outside.

DESCRIPTION OF THE EMBODIMENTS

Figure 1:
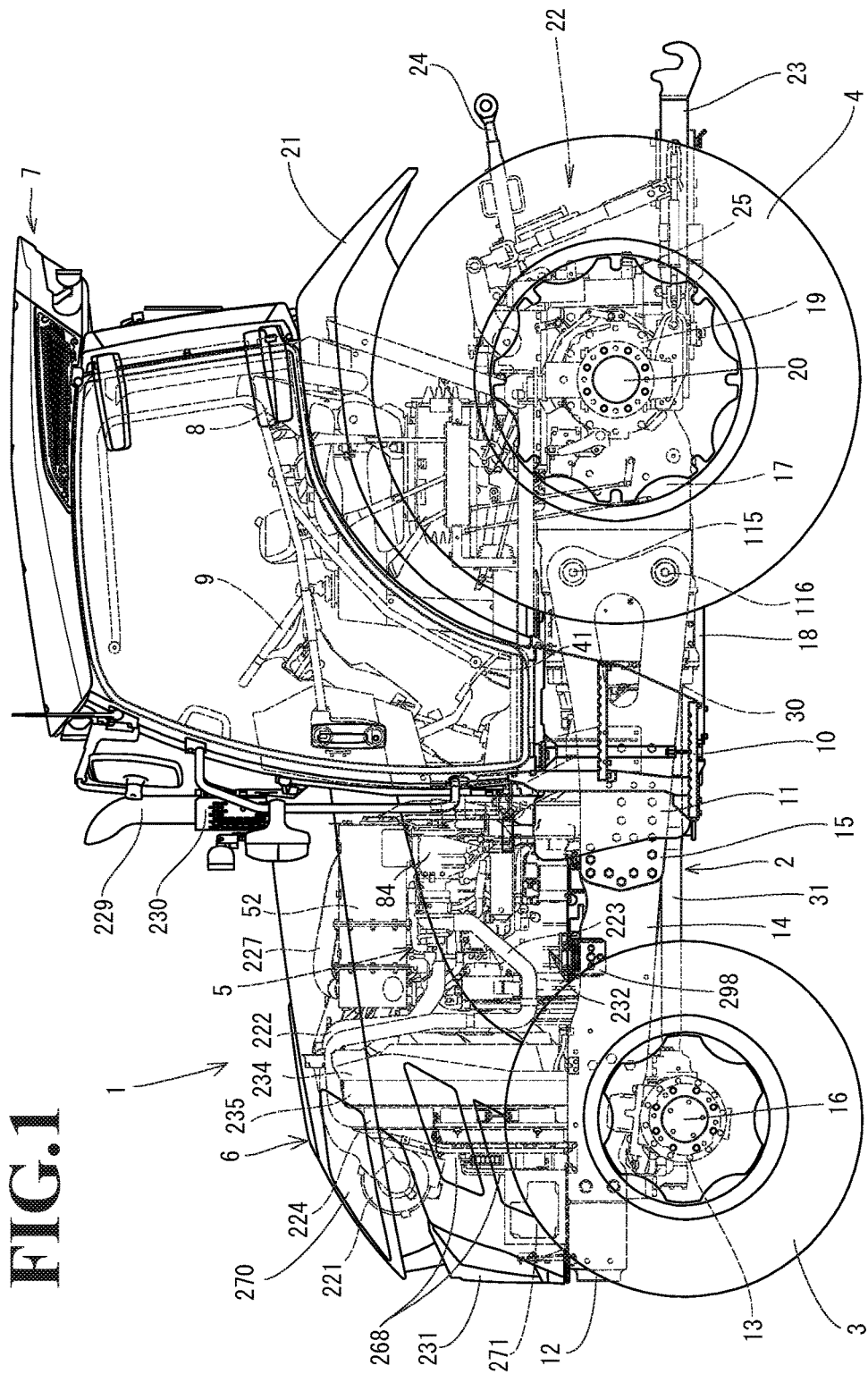
FIG. 1 is a left side view of a work vehicle according to the invention of the present application.
Figure 2:
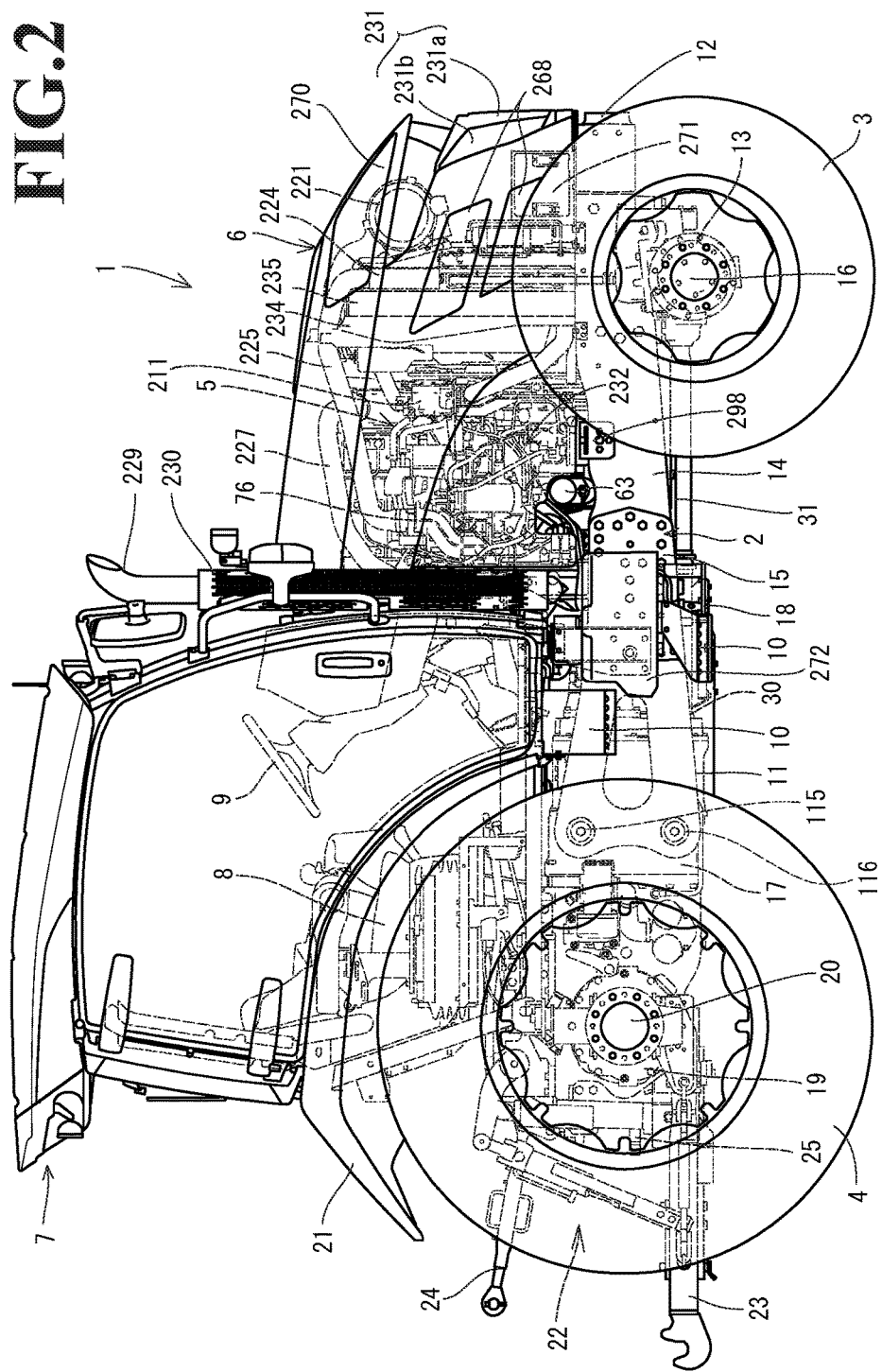
FIG. 2 is a right side view of the work vehicle.
Figure 3:
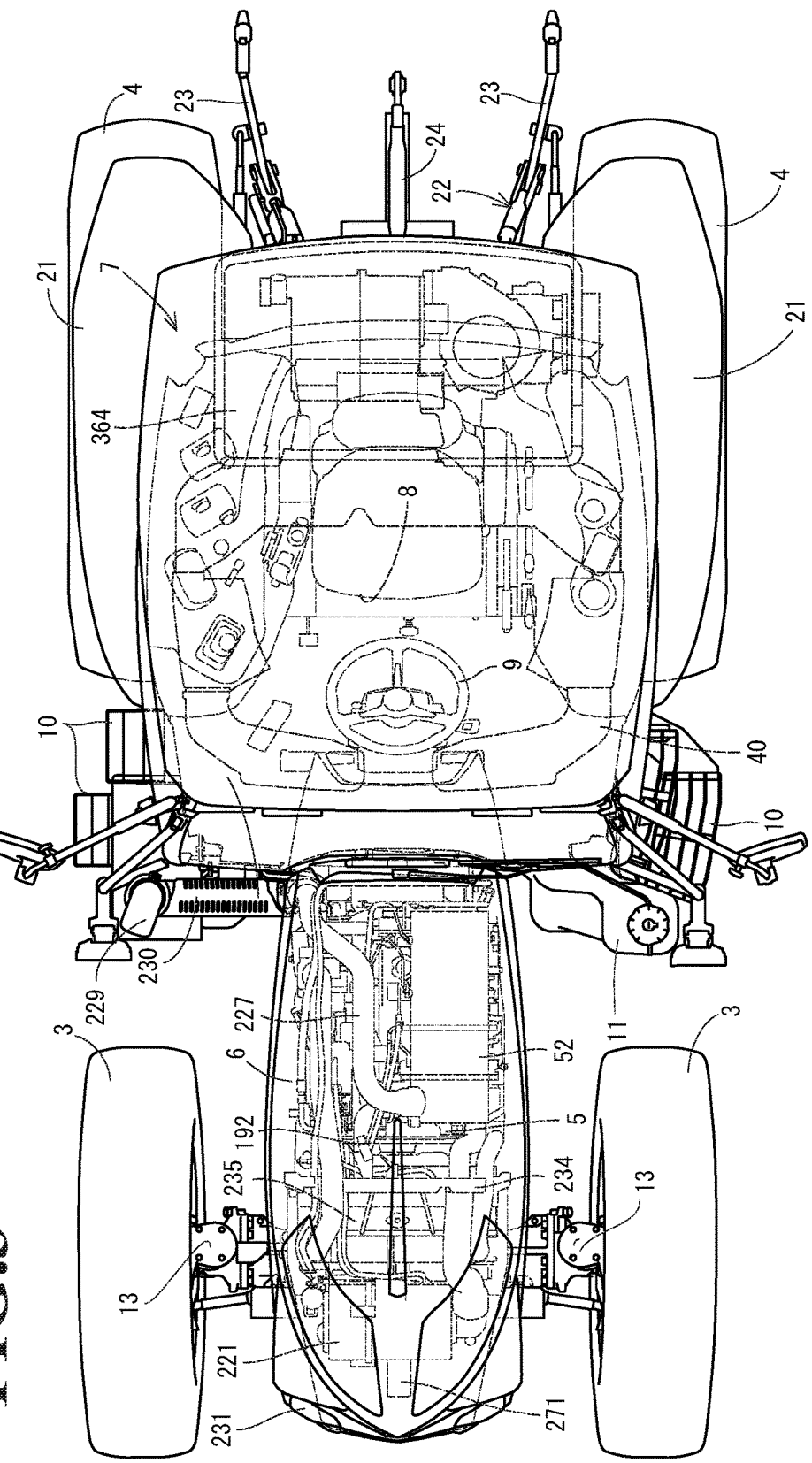
FIG. 3 is a plan view of the work vehicle.
Figure 4:
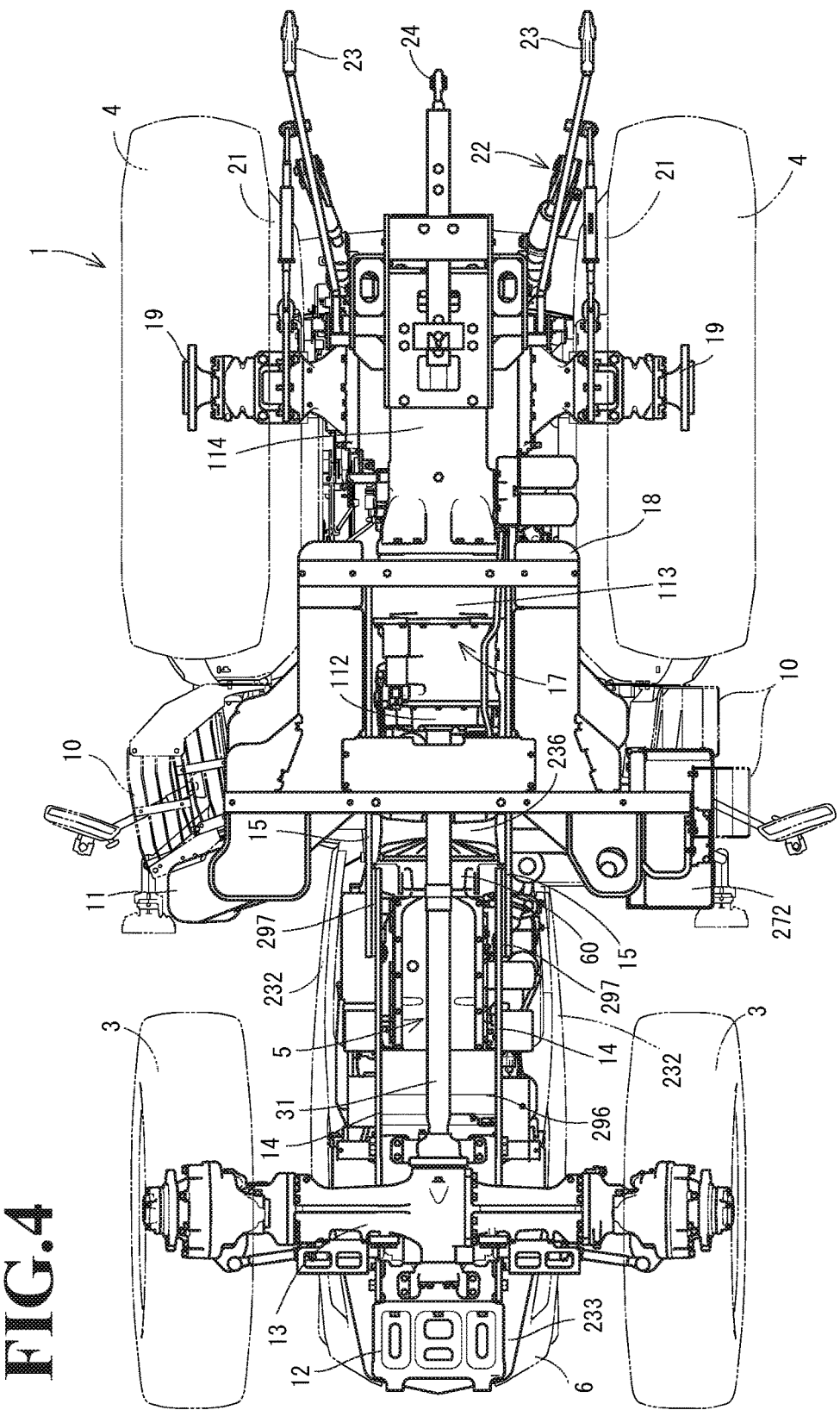
FIG. 4 is a bottom view of the work vehicle.
Figure 5:
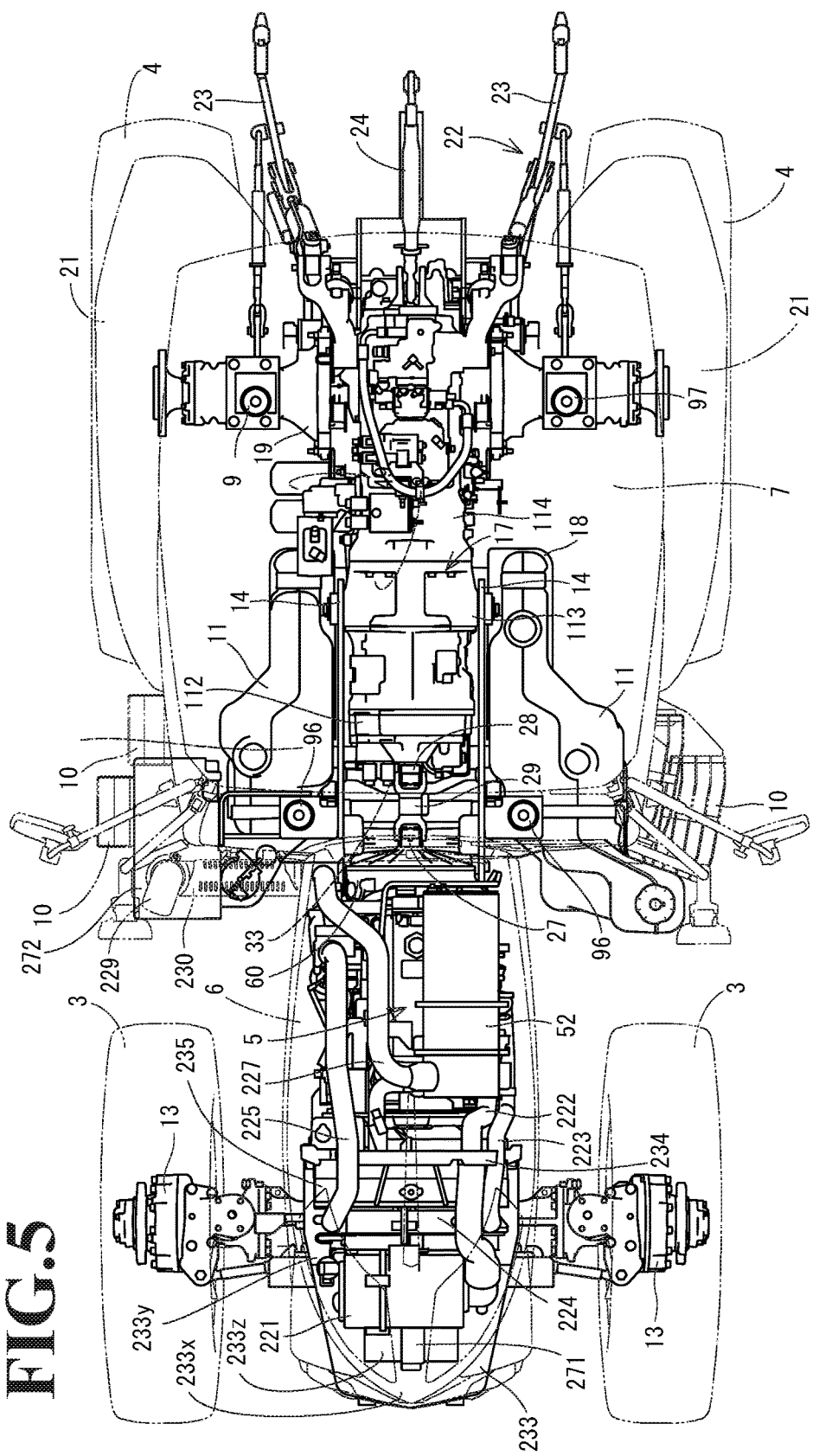
FIG. 5 is a plan view of a travelling machine body of the work vehicle.
Figure 6:
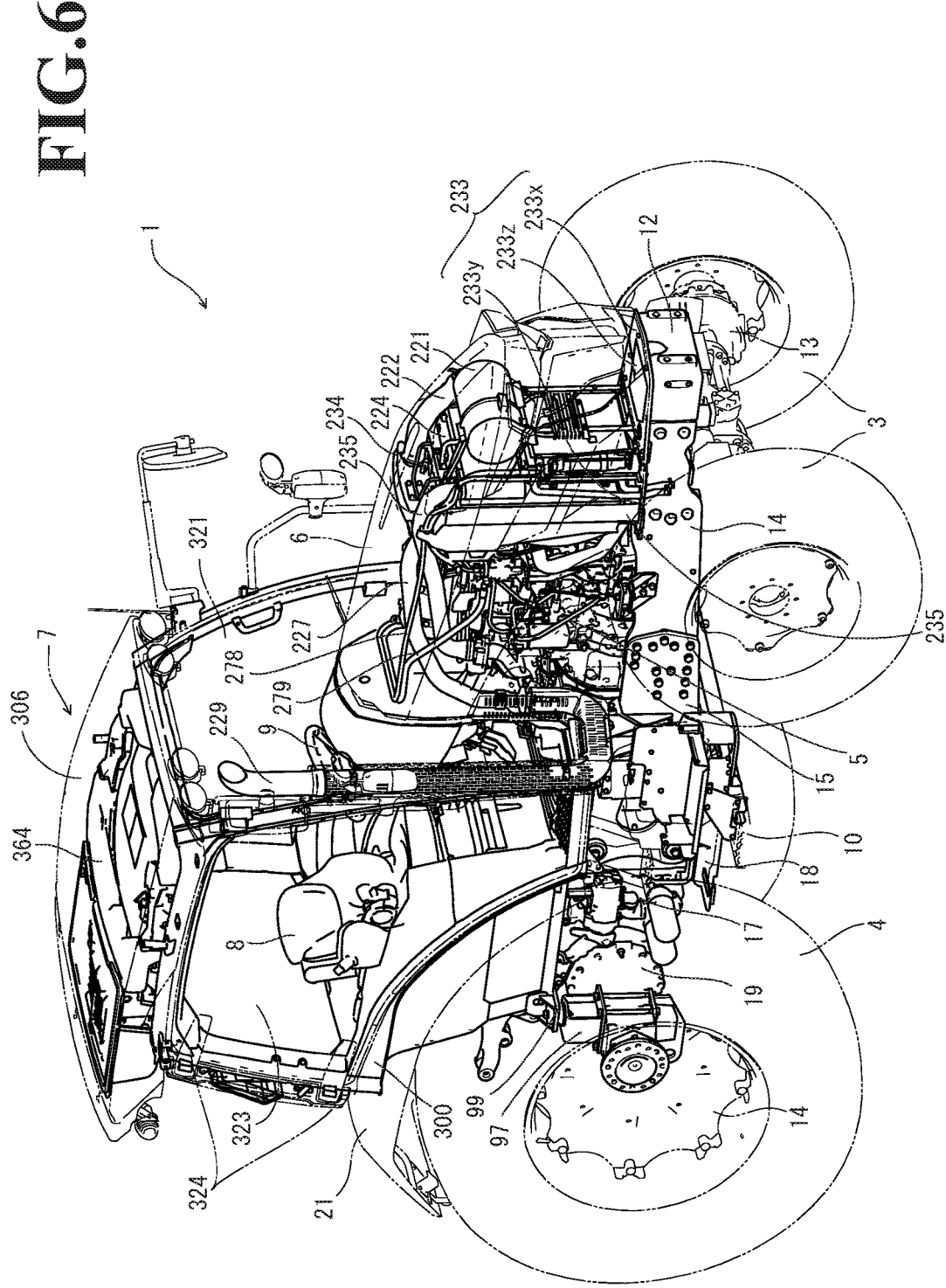
FIG. 6 is a front perspective view of the work vehicle.

Hereinafter, an embodiment of the present invention will be described with reference to the drawings. First, a configuration of a tractor 1 according to the embodiment will be described with reference to FIGS. 1 to 10. The tractor 1 is a work vehicle. The tractor 1 of this embodiment includes a travelling machine body 2. The travelling machine body 2 is supported by travelling sections. The travelling sections are a pair of left and right front wheels 3 and a pair of left and right rear wheels 4 in this embodiment. The rear wheels 4 and the front wheels 3 are driven by a power source mounted on the front section of the travelling machine body 2. The power source is a common rail diesel engine 5 (hereinafter, simply referred to as the engine) in this embodiment. The tractor 1 travels forward and backward by driving the rear wheels 4 and the front wheels 3. The engine 5 is covered with a hood 6. A cabin 7 is provided on the upper surface of the travelling machine body 2. An operator's seat 8 and a steering wheel (round steering wheel) 9 are located inside the cabin 7. The steering wheel 9 is steered to move the steering direction of the front wheels 3 to left and right. A step 10 is provided on the lower section outside the cabin 7. The step 10 is used by an operator to get on and off. A fuel tank 11 is provided below the bottom portion of the cabin 7. The fuel tank 11 supplies fuel to the engine 5.

The travelling body 2 includes engine frames (front frames) 14 and left and right body frames (rear frames) 15. The engine frames 14 include a front bumper (frame coupling member) 12 and front axle cases 13. The left and right body frames 15 are detachably secured to the rear portions of the engine frames 14. A front axle 16 rotationally projects outward from the left side of the left front axle case 13 and from the right side of the right front axle case 13. The front wheels 3 are secured to the left side of the left front axle case 13 and the right side of the right front axle case 13 via the front axle 16. A transmission case 17 is coupled to the rear portion of the body frame 15. The transmission case 17 changes speed of rotational power from the engine 5 as required and transmits the rotational power to the four front and rear wheels 3, 3, 4, 4.

A tank frame 18 is bolted to the left and right body frames 15 and the bottom surface of the transmission case 17. The tank frame 18 is a rectangular frame plate as viewed from the bottom and bulges outward in the left and right direction. The fuel tank 11 of this embodiment is separated into two left and right parts. The left and right parts of the fuel tank 11 are distributed on the upper surface of the left and right bulging sections of the tank frame 18. The tank frame 18 is extended rightward, and a battery 272 is mounted on a right extended part of the tank frame 18. One of steps 10 is also secured to the right extended part of the tank frame 18. Left and right rear axle cases 19 are mounted on the left and right external side surfaces of the transmission case 17 to project outward. Left and right rear axles 20 are rotationally inserted in the left and right rear axle cases 19. The rear wheels 4 are secured to the transmission case 17 via the rear axles 20. The upper sections of the left and right rear wheels 4 are covered with left and right rear fenders 21.

A hydraulic lifting and lowering mechanism 22 is detachably secured to the rear upper surface of the transmission case 17. The hydraulic lifting and lowering mechanism 22 lifts and lowers a farm implement such as a rotary tiller. The farm implement, such as a rotary tiller, is coupled to the rear portion of the transmission case 17 via a three point link mechanism including a pair of left and right lower links 23 and a top link 24. A power take-off (PTO) shaft 25 projects rearward from the rear side of the transmission case 17. The PTO shaft 25 transmits PTO drive power to the farm implement, such as a rotary tiller.

A flywheel 61 is directly coupled to an engine output shaft 53. The engine output shaft 53 projects rearward from the rear side of the engine 5. A main drive axle 27 and a main transmission-shift input shaft 28 are coupled with each other via a power transmission shaft 29. The main drive axle 27 projects rearward from the flywheel 61. The main transmission-shift input shaft 28 projects forward from the front side of the transmission case 17. The power transmission shaft 29 includes universal couplings on both ends. A hydraulic continuously variable transmission device, a forward/backward travelling direction switching mechanism, a travelling sub transmission-shift gear mechanism, and a rear wheel differential gear mechanism are located in the transmission case 17. Rotational power of the engine 5 is transmitted through the main drive axle 27 and the power transmission shaft 29 to the main transmission-shift input shaft 28 in the transmission case 17. The rotational speed of the rotational power is changed by the hydraulic continuously variable transmission and the travelling sub transmission-shift gear mechanism. The speed-changed power is transmitted to the left and right rear wheels 4 via the rear wheel differential gear mechanism.

Front wheel output shafts 30 project forward from the lower part of the front surface of the transmission case 17. A front wheel transmission shaft (not shown) projects rearward from each front axle case 13, which embeds a front wheel differential gear mechanism (not shown). The front wheel transmission shafts are coupled to the front wheel output shafts 30 via front wheel drive shafts 31. The speed-changed power changed by the hydraulic continuously variable transmission and the travelling sub transmission-shift gear mechanism in the transmission case 17 is transmitted from the front wheel output shafts 30, the front wheel drive shafts 31, and the front wheel transmission shafts via the front wheel differential gear mechanisms in the front axle cases 13 to the left and right front wheels 3.

The transmission case 17 includes a front transmission case 112, a rear transmission case 113, and an intermediate case 114. The front transmission case 112 includes, for example, the main transmission-shift input shaft 28. The rear transmission case 113 includes, for example, the rear axle cases 19. The intermediate case 114 couples the front end of the rear transmission case 113 to the rear end of the front transmission case 112. The rear end portions of the left and right body frames 15 are coupled to the left and right side surfaces of the intermediate case 114 via left and right upper and lower machine body coupling shafts 115, 116. That is, rear end portions of the left and right machine body frames 15 are coupled to the left and right side surfaces of the intermediate case 114 with the two upper machine body coupling shafts 115 and the two lower machine body coupling shafts 116 so that the machine body frames 15 and the transmission case 17 are integrally connected and form the rear portion of the travelling machine body 2. The travelling machine body 2 is configured such that, for example, the front transmission case 112 or the power transmission shaft 29 is located between the left and right machine body frames 15 to protect, for example, the front transmission case 112.

Furthermore, left and right front supports 96 support the front side of the cabin 7, and left and right rear supports 97 support the rear portion of the cabin 7. The front supports 96 are bolted to the front end portions on the machine outer surfaces of the left and right machine body frames 15. The front bottom portion of the cabin 7 is supported on the upper surfaces of the front supports 96 via rubber vibration isolators 98 while preventing vibration. The left and right rear axle cases 19 extend horizontally in the left and right direction. Each of the rear support 97 is bolted to a middle portion of the upper surface of the associated one of the left and right rear axle cases 19 in the left and right width direction. The rear bottom portion of the cabin 7 is supported on the upper surfaces of the rear supports 97 via rubber vibration isolators 99 while preventing vibration. Thus, the travelling machine body 2 supports the cabin 7 via the plurality of rubber vibration isolators 98, 99 while preventing vibration.

The rear axle cases 19 have a cross-sectional end surface that is approximately a rectangular tube. The rear supports 97 are located on the upper surfaces of the rear axle cases 19 to sandwich the rear axle cases 19. Anti-vibration brackets 101 are located on the lower surface of the rear axle cases 19. The rear supports 97 and the anti-vibration brackets 101 are fastened with bolts 102. The ends of an anti-vibration rod 103 with an extendable turnbuckle are coupled to the intermediate portion of each lower link 23, which extends in the fore-and-aft direction, and the associated anti-vibration bracket 101 to prevent the lower link 23 from swinging in the left and right direction.

The cabin 7 covering the operator's seat 8 above the traveling body 2 includes a cabin frame 300 constituting a framework. The cabin frame 300 has an approximately box frame shape. The cabin frame 300 includes a pair of left and right front pillars 301 located ahead of the operator's seat 8, a pair of left and right rear pillars 302 located behind the operator's seat 8, a front beam member 303 to couple upper end parts of the front pillars 301, a rear beam member 304 to couple upper end parts of the rear pillars 302, and left and right side beam members 305 to respectively couple the upper end parts between the front pillars 301 and the rear pillars 302 disposed in a back-and-forth direction. A roof body 306 is detachably secured to a rectangular frame made up of the upper end parts of the cabin frame 300, namely, the front beam members 303 and the rear beam members 304, and the left and right side beam members 305.

End parts in a longitudinal direction of left and right bottom frames 311 extending in the back-and-forth direction are coupled to lower end sides of the front pillars 301 and the rear pillars 302. A floor plate 40 is disposed in a tensioned state on an upper surface side of the left and right bottom frames 311. A dashboard 33 is disposed upright on a front end side of the floor plate 40, and a steering wheel 9 is disposed on a rear surface side of the dashboard 33 via a steering column 32. A brake pedal 35 and the like are disposed on a front upper surface side of the floor plate 40, and the operator's seat 8 is secured to a rear upper surface side of the floor plate 40.

A rear part of the roof body 306 secured to the upper end side of the cabin frame 300 accommodates therein an air conditioner 364 to control air conditioning in the cabin 7. The air conditioner 364 is intended to control the air conditioning (room temperature) in the cabin 7 by heating using coolant for the engine 5, and by cooling using a compressor 211, a condenser 275, an evaporator, or the like. A coolant hose 280 being coupled to the air conditioner 364 is laid to a front lower side along the cabin frame 300.

As is clear from an arrangement structure of a front window glass 321, a rear window glass 322, and left and right side doors 323, the pillars 301 and 302 and the beam members 303, 304, and 305 are respectively located at side parts of the cabin 7 (cabin frame 300). That is, it is possible to ensure a large window on front, rear, left, and right side surfaces of the cabin frame 300. In the present embodiment, the front window glass 321, the rear window glass 322, the left and right side doors 323 made of a transparent glass are disposed on the front, rear, left, and right side surfaces of the cabin frame 300. Consequently, a wide view in all directions for the operator is ensured while ensuring rigidity of the cabin frame 300.

As illustrated in FIGS. 11 to 14, the diesel engine 5 includes a cylinder block 54. The cylinder block 54 embeds an engine output shaft 53 (crankshaft) and pistons. A cylinder head 55 is mounted on the cylinder block 54. An intake manifold 56 is located on the right side surface of the cylinder head 55. An exhaust manifold 57 is located on the left side surface of the cylinder head 55. That is, the intake manifold 56 and the exhaust manifold 57 are distributed on both side surfaces of the engine 5 along the engine output shaft 53. A cooling fan 59 is disposed on a front surface of the cylinder block 54 in the diesel engine 5, and a flywheel 6 is disposed on a rear surface of the cylinder block 54. That is, the flywheel 61 and the cooling fan 59 are distributed into both side surfaces of the engine 5 that intersect the engine output shaft 53.

A flywheel housing 60 houses a flywheel 61. The flywheel 61 is pivotally supported on the rear end of the output shaft 53. Motive power of the diesel engine 5 is transmitted to the operation parts of the work vehicle via the output shaft 53. An engine starter 69 is provided in the flywheel housing 60. A pinion gear of the engine starter 69 is engaged with a ring gear of the flywheel 61. When starting the diesel engine 5, the ring gear of the flywheel 61 is rotated by rotational force of the starter 69 so that the output shaft 53 starts rotating (or cranked). Engine leg securing parts 60a are disposed on the upper surface of the flywheel housing 60. A rear engine leg body (engine mount) 240 having an anti-vibration rubber is bolt-fastenable onto the engine leg securing parts 60a.

In the diesel engine 5, an oil pan 62 is located on the lower surface of the cylinder block 54. Lubricant in the oil pan 62 is supplied to lubrication parts of the diesel engine 5 via an oil filter 63. The oil filter 63 is located on the right side surface of the cylinder block 54. The oil filter 63 is secured to the right side surface of the cylinder block 54 via an oil filter support member 88. One side (left side) of the oil filter support member 88 is coupled to the coupling port (oil filter securing position) that communicates with the above-described oil passage provided in the cylinder block 54. The oil filter 63 is secured to the upper section of the other side (right side) of the oil filter support member 88.

When the oil filter 63 is secured to the cylinder block 54, the oil filter support member 88 is provided in between. Thus, the oil filter 63 is arranged at a position higher than the original securing position in the cylinder block 54. This prevents the oil filter 63 from interfering with the travelling machine body 2 even if the engine 5 is mounted on the travelling machine body 2 having a narrow lateral width. That is, the oil filter 63 is located above the engine frame 14 due to the existence of the oil filter support member 88. A right engine cover 232 is made into a shape obtained by cutting away a part of a lower edge thereof, and the front surface of the oil filter 63 is protruded outward beyond the right engine cover 232. Thus, the oil filter 63 is accessible and can be replaced easily.

The oil filter support member 88 includes an oil passage (not shown) formed in the oil filter support member 88. Lubrication oil that is drawn in from the oil pan 62 by the oil pump (not shown) is received through the oil passage (not shown) in the cylinder block 54 and supplied to the oil filter 63. The lubrication oil that has been filtered by the oil filter 63 is circulated to the cylinder block 54 and supplied to the lubrication parts of the engine 5. At this time, some of the lubrication oil filtered by the oil filter 63 is supplied to the external component through the lubrication oil outlet 88b via a lubrication oil supply pipe 89. Since part of a lubrication oil passage from the oil filter 63 to the external component is formed by the oil passage in the oil filter support member 88, the oil filter support member 88 serves multiple functions. This configuration reduces the number of components of the engine apparatus.

The diesel engine 5 includes, on the right side surface thereof, a fuel supply pump 64 for supplying fuel, a cylindrical common rail 66 for feeding fuel under pressure to injectors, a fuel filter 67 for removing foreign matter from the fuel from the fuel tank 11, and an EGR device 75 coupled to the intake manifold 56. The fuel in the fuel tank 11 is fed under pressure from the fuel supply pump 64 to the common rail 66 via the fuel filter 67. Thus, because the pressurized fuel is stored in the common rail 66, the pressurized fuel in the common rail 66 is injected from the injectors into the cylinders of the diesel engine 5 by controlling opening and closing of the fuel injection valves of the injectors.

A coolant pump 71 for coolant lubrication is located in front of the cylinder head 55 (close to the cooling fan 59) to be coaxial with a fan axis of the cooling fan 59. The coolant pump 71 is configured to be driven by rotation of the engine output shaft 53 together with the cooling fan 59. The work vehicle includes a radiator 235. The coolant in the radiator 235 is supplied to the coolant pump 71 via a thermostat case 70. The thermostat case 70 is located above the coolant pump 71. When the coolant pump 71 is driven, the coolant is supplied to a water-cooling jacket (not shown) formed in the cylinder head 55 and the cylinder block 54 to cool the diesel engine 5. The coolant that has contributed to cooling of the diesel engine 5 is returned to the radiator 235. Due to the positional relationship, the coolant pump 71 opposes the cooling fan 59. Thus, the cool air from the cooling fan 59 contacts the coolant pump 71. The coolant in the radiator 235 is supplied to the cylinder block 54 and the cylinder head 55 in order to cool the diesel engine 5 by the driving of the coolant pump 71.

An engine mount fitting 74 is provided on each of left and right side surfaces of the cylinder block 54. A front engine mount 238 can be bolted to each engine mount fitting 74. The front engine mount 238 includes an anti-vibration rubber. The work vehicle includes a pair of left and right engine frames 14. In this embodiment, the engine mount fittings 74 of the cylinder block 54 are each bolted to the associated engine frame 14 via the associated engine mount 238 such that the cylinder block 54 is sandwiched between the engine frames 14. With this configuration, the engine frames 14 of the work vehicle support the front part of the diesel engine 5.

An intake connecting pipe 76 is coupled to the right side inlet portion of the intake manifold 56. Fresh air (external air) is supplied to the intake connecting pipe 76. An intake throttle member 77 is provided at the intake-air inlet side (upstream side) of the intake connecting pipe 76. A recirculation exhaust gas pipe 78 is coupled to the top inlet portion of the intake manifold 56 via an EGR valve member 79. Some of exhaust gas (EGR gas) of the diesel engine 5 is supplied to the recirculation exhaust gas pipe 78. In the intake manifold 56, the intake-air outlet side (downstream side) of the intake connecting pipe 76 and the coupling portion (rear portion) between the intake manifold 56 and an EGR valve member 79 configure a body case of an exhaust gas recirculation (EGR) apparatus 75. That is, the intake-air introduction side of the intake manifold 56 configures the EGR body case.

The EGR apparatus (exhaust gas recirculation apparatus) 75 is located mainly on the right side of the diesel engine 5, and more specifically, rightward of the cylinder head 55 and mixes some of the exhaust gas of the diesel engine 5 (EGR gas) with fresh air to supply the mixture to the intake manifold 56. The apparatus (exhaust gas recirculation apparatus) 75 includes the EGR body case configured by part of the intake manifold 56, the intake connecting pipe 76, which communicates with the intake manifold 56, the intake throttle member 77, which is located in the intake connecting pipe 76, the recirculation exhaust gas pipe 78, which is coupled to the exhaust manifold 57 via an EGR cooler 80, and the EGR valve member 79, which connects the intake manifold 56 to the recirculation exhaust gas pipe 80. In the engine 5, the EGR cooler 80 and the EGR apparatus 75 that are distributed into both side surfaces are coupled to each other via the recirculation exhaust gas pipe 78 that is diverted along the rear surface of the engine 5 (close to the flywheel 61) as a reflux pipeline.

The intake throttle member 77 is coupled to the intake-air introduction side of the intake manifold 56 via the intake connecting pipe 76. The outlet of the recirculation exhaust gas pipe 78 is also coupled to the intake-air introduction side of the intake manifold 56 via the EGR valve member 79. The inlet of the recirculation exhaust gas pipe 78 is coupled to the exhaust manifold 57 via the EGR cooler 80. The amount of EGR gas supplied to the intake-air introduction side of the intake manifold 56 is adjusted by adjusting the opening degree of the EGR valve in the EGR valve member 79.

With the above-described configuration, while fresh air is supplied to the intake-air introduction side of the intake manifold 56 via the intake connecting pipe 76 and the intake throttle member 77, the EGR gas is supplied to the intake-air introduction side of the intake manifold 56 from the exhaust manifold 57. The fresh air from the outside and the EGR gas from the exhaust manifold 57 are mixed in the intake-air introduction side of the intake manifold 56. Some of the exhaust gas discharged to the exhaust manifold 57 from the diesel engine 5 is circulated from the intake manifold 56 to the diesel engine 5. This reduces the highest combustion temperature during high load operation and the discharge amount of NOx (nitrogen oxides) from the diesel engine 5.

The engine 5 includes a turbocharger 81 to compress air by exhaust gas from the exhaust manifold 57. The turbocharger 81 includes a compressor case 83 that includes a blower wheel therein. An intake-air introduction side of the compressor case 83 is coupled to an intake-air discharge side of an air cleaner 221 via a supply pipe 222. An intake-air discharge side of the compressor case 83 is coupled to an upstream relay pipe 223. The turbocharger 81 includes a turbine case 82 that includes a turbine wheel therein. An exhaust introduction side of the turbine case 82 is coupled to an exhaust gas outlet of the exhaust manifold 57. An intake-air discharge side of the turbine case 82 is coupled to an exhaust gas inlet of the exhaust-gas purification device 52 that is a post-processing device.

The diesel engine 5 includes the continuously regenerating type exhaust gas purification device (DPF) 52. The exhaust-gas purification device 52 includes an exhaust gas inlet pipe 161 on a case outer circumferential surface at one end (rear end) of the exhaust gas purification device 52 in the longitudinal direction. The exhaust gas inlet pipe 161 communicates with the exhaust gas discharge side of the turbine case 82 in the turbocharger 81 via the exhaust connecting pipe 84. In the exhaust-gas purification device 52, the exhaust gas inlet pipe 161 is open downward to the left, and the exhaust gas outlet pipe 162 is open upward to the right.

The exhaust-gas purification device 52 is coupled to an exhaust communication pipe 84 being in communication with the turbocharger 81. The exhaust communication pipe 84 is configured as a support body of the exhaust-gas purification device 52 (DPF support body) by bolt-fastening a lower end side of the exhaust communication pipe 84 to the exhaust manifold 57. An exhaust introduction side of an exhaust communication pipe 84 is bolt-fastened to the exhaust discharge side of the turbine case 82, and an exhaust discharge side thereof is fastened to an exhaust gas inlet pipe 161 of the exhaust-gas purification device 52. Therefore, the exhaust manifold 57 and the exhaust-gas purification device 52 communicate with each other via the turbine case 82 and the exhaust communication pipe 84 in the turbocharger 81.

The engine 5 includes an outlet side bracket 177 and an inlet side bracket 176 as a housing support to support and secure the exhaust-gas purification device 52. The outlet side bracket 177 and the inlet side bracket 176 are distributed and disposed upright on the front and the rear of the cylinder head 55 of the engine 5 which intersect the engine output shaft 53. The inlet side bracket 176 is located on the rear surface side of the engine 5 and supports the exhaust introduction side of the exhaust-gas purification device 52 together with the exhaust communication pipe 84. The outlet side bracket 177 is located on the front surface side of the engine 5 and supports the exhaust discharge side of the exhaust-gas purification device 52.

The inlet side bracket 176 is located at the rear of the cylinder head 55 (above the flywheel housing 60). The inlet side bracket 176 includes a securing bracket (first bracket) 178. The lower edge of the securing bracket 178 is bolted to the rear surface of the cylinder head 5. A relay bracket 179 is bolted to the upper end of the securing bracket 178. The proximal end of an extended bracket (third bracket) 180 is bolted to the middle of the relay bracket (second bracket) 179. The distal end of the extended bracket 180 is fastened to the inlet side lid (upstream lid) 169 of the gas purification housing 168 with bolts and nuts.

The outlet side bracket 177 is located at the front of the cylinder head 55 (close to the cooling fan 59). The outlet side bracket 177 of this embodiment is separated into an outlet side first bracket (fourth bracket) 181 and an outlet side second bracket (fifth bracket) 182. The outlet side first bracket 181 is an approximately L-shaped member that extends upward from the right side of the cylinder head 55 and bends to the left side above the cylinder head 55. The outlet side second bracket 182 is an approximately L-shaped member that extends upward from the left side of the cylinder head 55 and bends to the right side above the cylinder head 55. Thus, the outlet side bracket 177 has an approximately inverted U shape in front of the cylinder head 55 and is secured to extend over the cylinder head 55 at a position rearward of the thermostat case 70.

As is clear from the above description, the exhaust gas purification device 52 of this embodiment is detachably coupled to the cylinder head 55, the intake manifold 56, and the exhaust manifold 57 of the engine 1 via the housing support above the diesel engine 4. The housing support includes the exhaust connecting pipe 84, the inlet side bracket 176, and the outlet side bracket 177. The inlet side bracket 176 and the exhaust connecting pipe 84, which are located upstream in the exhaust gas moving direction (exhaust introduction side), are distributed to the cylinder head 55 and the exhaust manifold 57. The outlet side bracket 177 (the outlet side first bracket 181 and the outlet side second bracket 182), which is located downstream in the exhaust gas moving direction (exhaust discharge side), is distributed to the cylinder head 55 and the intake manifold 56. Thus, the exhaust gas purification device 52 is supported at four points.

The securing bracket 178 includes a side component coupling portion 178*c*. The side component coupling portion 178*c* is located on the right side of the upper end portion and includes bolt holes. A component securing bracket (exhaust pipe securing bracket) 210 for securing an external component such as an exhaust pipe 227 is bolt-fastened to the side component coupling portion 178*c*. A proximal end of the outlet side first bracket 181 includes, for example, a proximal end component coupling portion 181*b*. The proximal end component coupling portion 181*b* secures a component securing bracket (compressor securing bracket) 212 for securing an external component such as an air conditioner compressor 211. The outlet side first bracket 181 includes a bent portion (middle portion) 181*d*. The upper surface of the bent portion 181*c* includes, for example, a middle component coupling portion 181*d*. The middle component coupling portion 181*d* secures a component securing bracket (warm water pipe securing bracket) 208 for securing external components such as air conditioner warm water pipes 203 and 204. The outlet side second bracket 182 includes a bent portion (middle portion). The bent portion includes a rear component coupling portion 182*d* for securing a component fixture (shield securing bracket) 207 for supporting an upstream relay pipe 223 and a shield 206.

Figure 13:
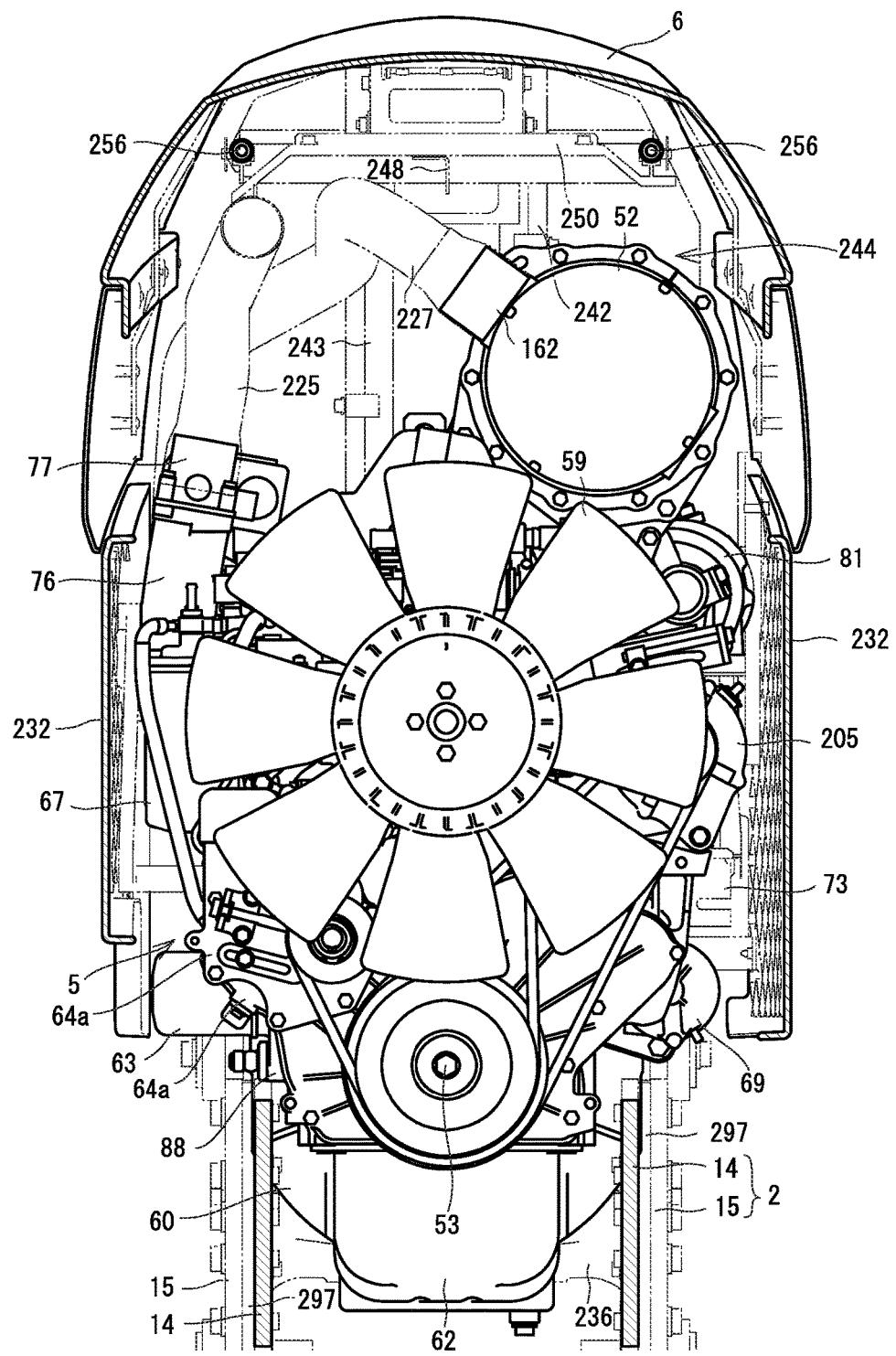
FIG. 13 is a cross-sectional view of the work vehicle illustrating the configuration in the engine compartment as viewed from the front.
Figure 14:
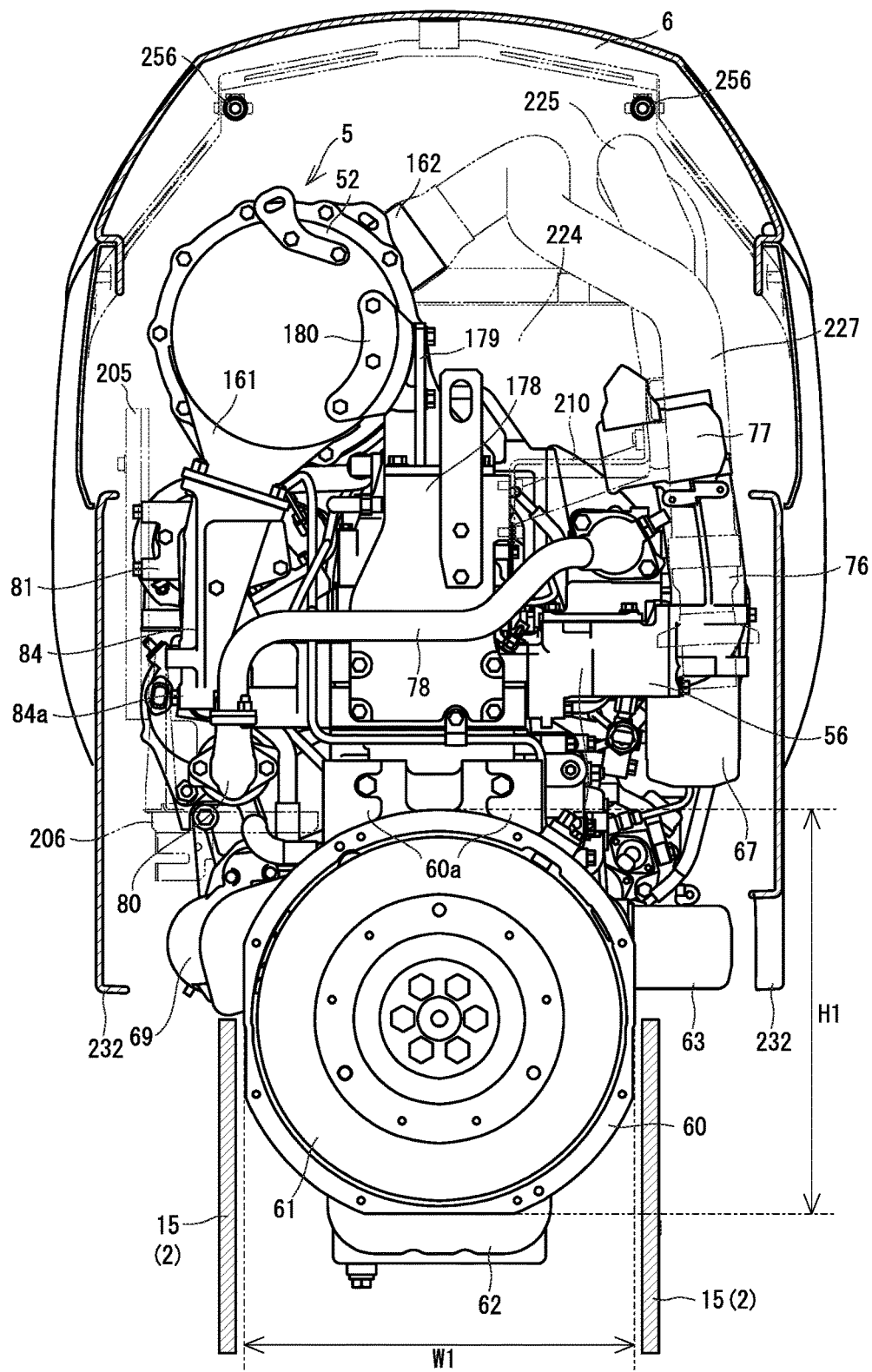
FIG. 14 is a cross-sectional view of the work vehicle illustrating the configuration in the engine compartment as viewed from the back.

As illustrated in FIGS. 13 and 14, the hood 6 of the tractor 1 has an inverted U-shaped cross-section. Since the left and right corners of the hood 6 are chamfered to incline diagonally and outwardly downward to the left and right as viewed from the front, the forward view of the operator seated in the operator's seat 8, in particular, the view ahead of the left and right of the hood 6 is improved. While the exhaust gas purification device (DPF) 52 and the exhaust connecting pipe 84 oppose the left side inner wall of the hood 6, the intake connecting pipe 76 opposes the right side inner wall of the hood 6. While the exhaust connecting pipe 84 is located at a position facing the left side engine cover 232, the exhaust connecting pipe 84 is located at a position facing the right side engine cover 232.

The intake connecting pipe 76, which includes a hollow portion and supplies fresh air to the intake manifold 56, is configured to be tilted toward the cylinder head 55 as the intake connecting pipe 76 extends upward. The intake connecting pipe 76 extends upward from the intake manifold 56. That is, a fresh air introduction port located at the upper end of the intake connecting pipe 76 is offset with respect to a fresh air discharge port located at the lower end of the intake connecting pipe 76 toward the output shaft 53 of the engine 5 (center position of the engine 5). The intake connecting pipe 76 is arranged to be in conformance with the shape of the hood 6 that narrows upward, and the intake throttle member 77 is located closer to the center position of the hood 6 than the intake connecting pipe 76 between the upper section of the engine 5 and the inner surface of the hood 6. This configuration not only reduces the designed length of the downstream relay pipe 225, which connects a fresh air discharge end of the intercooler 224 to the intake throttle member 77, but also allows the downstream relay pipe 225 to be compactly accommodated in the hood 6, which has an upwardly decreasing lateral width.

The exhaust connecting pipe 84, which includes a hollow portion that supplies exhaust gas from the exhaust manifold 57 to the exhaust gas purification device 52, is configured to be tilted toward the cylinder head 55 as the exhaust connecting pipe 84 extends upward. The exhaust connecting pipe 84 is coupled to the exhaust gas inlet pipe 161 of the exhaust gas purification device 52 to support the exhaust gas purification device 52. That is, the exhaust gas discharge port at the upper end of the exhaust connecting pipe 84 is offset toward the output shaft 53 of the engine 5 (center position of the engine 5) with respect to the coupling support portion 84*a* at the lower end of the exhaust connecting pipe 84. The coupling support portion 84*a* is coupled to the exhaust manifold 57 at the lower end. The exhaust gas inlet pipe 161 of the exhaust gas purification device 52 is tilted toward the outer side of the engine 5 (toward the inner wall of the hood 6) as the exhaust gas inlet pipe 161 extends downward (toward the inlet flange).

The exhaust gas purification device 52 and the exhaust connecting pipe 84 are arranged to be in conformance with the shape of the hood 6 that narrows upward, and the exhaust gas purification device 52 is supported at a position closer to the center of the engine 5 between the upper section of the engine 5 and the inner surface of the hood 6. Thus, the exhaust gas purification device 52 is compactly accommodated in the hood 6, which has an upwardly decreasing lateral width. Supporting the exhaust gas purification device 52, which is a heavy object, at a position closer to the center of gravity of the engine 5 inhibits increase in, for example, vibration and noise of the engine 5 caused by mounting the exhaust gas purification device 52. This configuration also reduces influence on the shape of the hood 6 caused by mounting the exhaust gas purification device 52 on the engine 5 and prevents the shape of the hood 6 from becoming complicated.

Figure 15:
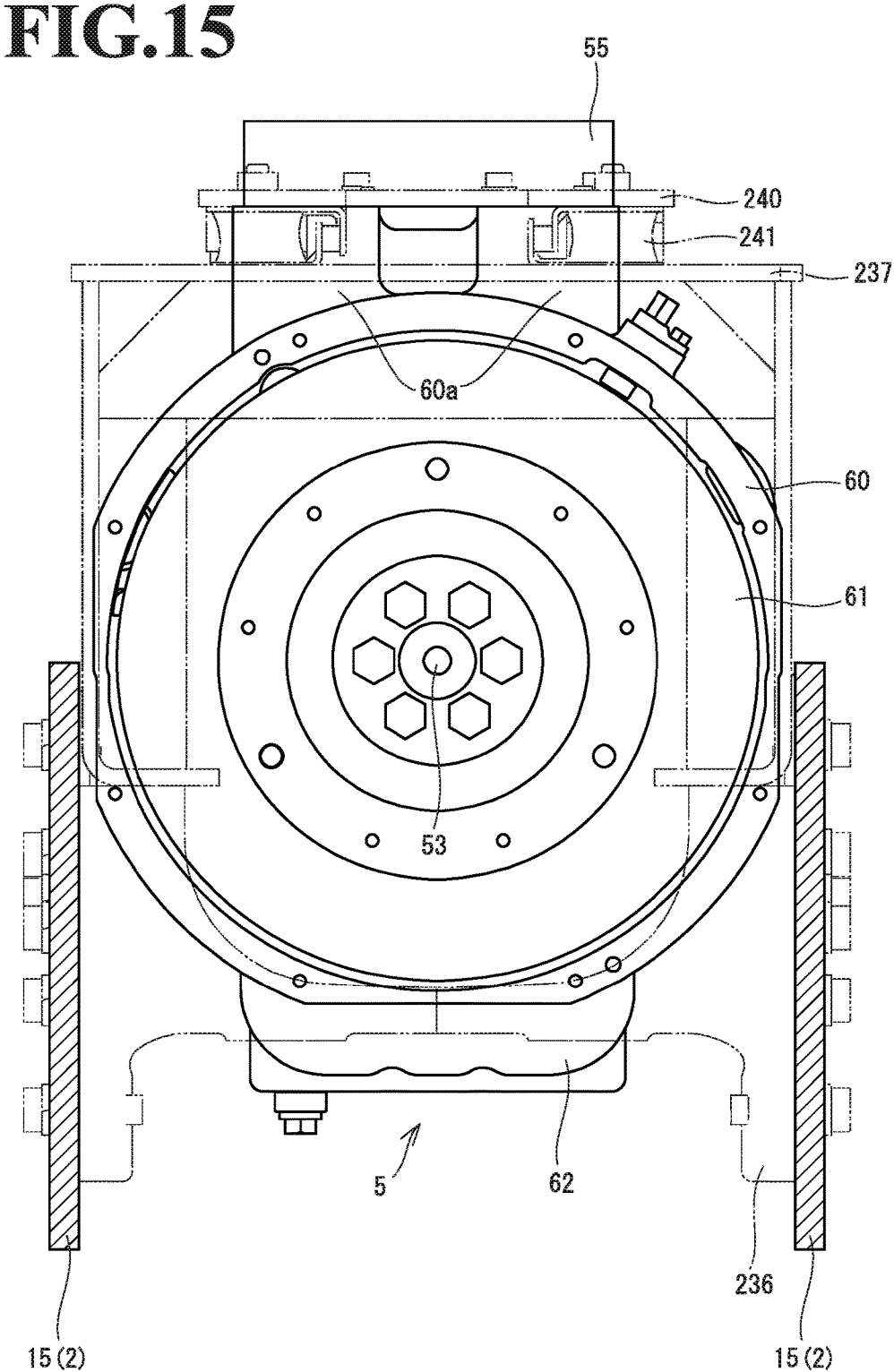
FIG. 15 is a partially enlarged view of the work vehicle illustrating the relationship between the traveling body and the flywheel housing.

As illustrated in FIGS. 14 and 15, the width W1 of the flywheel housing 60, which covers the flywheel 61 is narrower than the height H1. The flywheel 61 is located on the end surface that intersects the core of the engine output shaft 53. Since the width of the flywheel housing 60 is narrow, the engine 5 can be mounted on the traveling body 2, which has a narrow lateral width, without interference by the flywheel housing 60. In the traveling body 2, each body engine frame 15 is provided on the outer side of the associated engine frame 14 via the associated spacer 293. Thus, the width between the left and right body engine frames 15 is wider than the width between the left and right engine frames 14. The flywheel housing 61 is located at the rear of the engine 5. The main transmission input shaft 28 of the transmission case 17, which is coupled to the body frames 15, is coupled to the flywheel 61. Thus, the flywheel housing 61, which has the greatest lateral width in the engine 5, is sufficiently located between the body frames 15. This prevents the flywheel housing 61 from colliding with the traveling body 2, which has a different vibration system and thus prevents failure or breakage of the engine 5.

The flywheel housing 61 has an outline in which the left and right parts of a circle are cut off and in which the seat-like engine mount fittings 60*a* project from the upper section. The engine mount fittings 60*a* at the upper section are coupled to the traveling body 2 via the engine mount 240 at the rear portion. The flywheel housing 61 is not only mountable on the traveling body 2 having a narrow width, but also includes the seat-like engine mount fittings 60*a* that are capable of being coupled to the traveling body 2. Thus, coupling the flywheel housing 61 having a high rigidity to the traveling body 2 compensates for the rigidity achieved by the support structure of the engine 5.

More particularly, the inverted U-shaped engine support frame 237 is provided above the support beam frame 236, which is held between the pair of left and right body frames 15. The flywheel housing 61 and the engine support beam frame 237 are arranged next to each other in the fore-and-aft direction. While the rear section of the engine mount 238 is coupled to the upper surface of the engine support frame 237 via the anti-vibration rubbers 239, the front section of the engine mount 238 is coupled to the upper surface of the engine mount fittings 60*a* on the flywheel housing 61.

Figure 16:
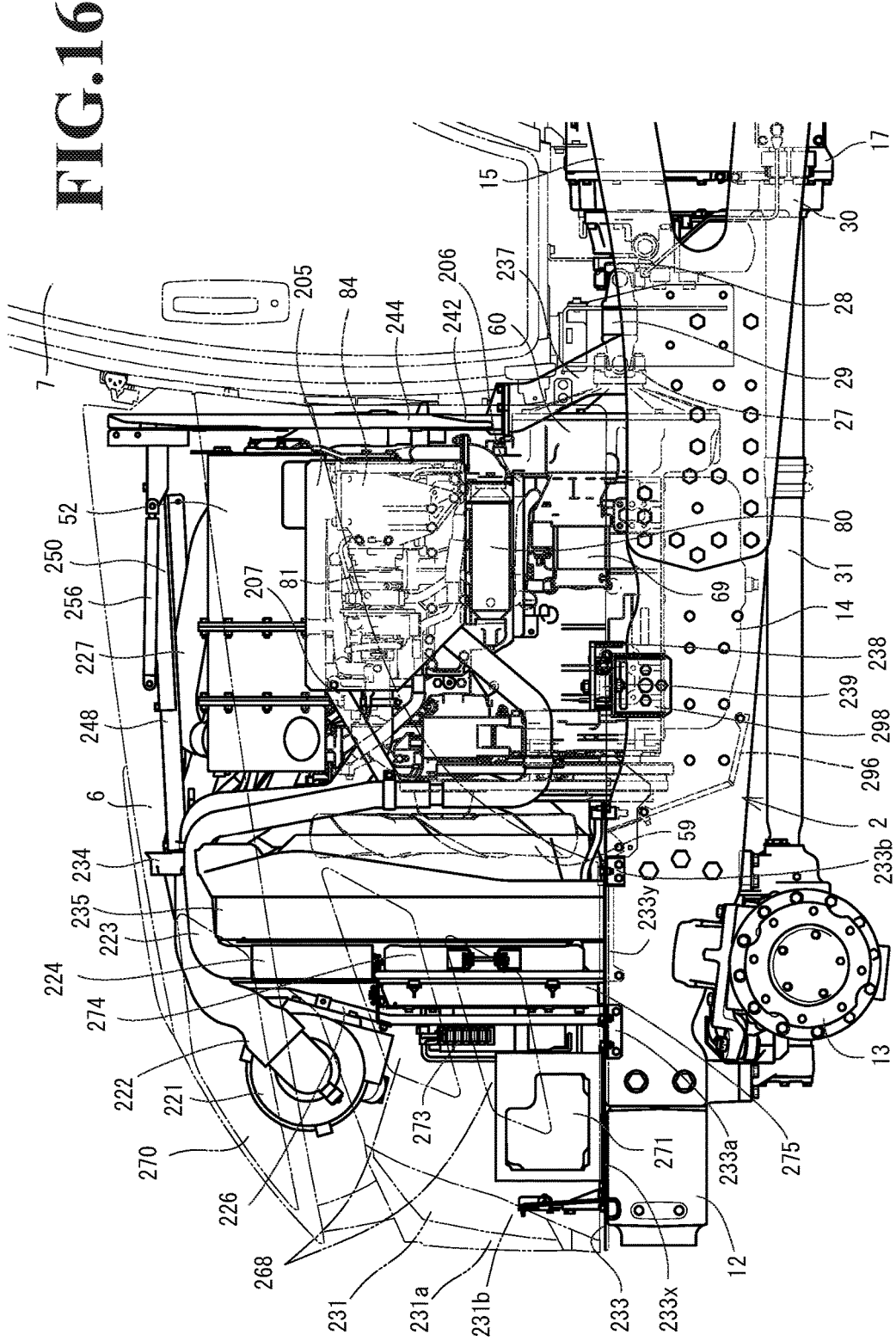
FIG. 16 is a left side enlarged view of the work vehicle illustrating the configuration in the engine compartment.
Figure 17:
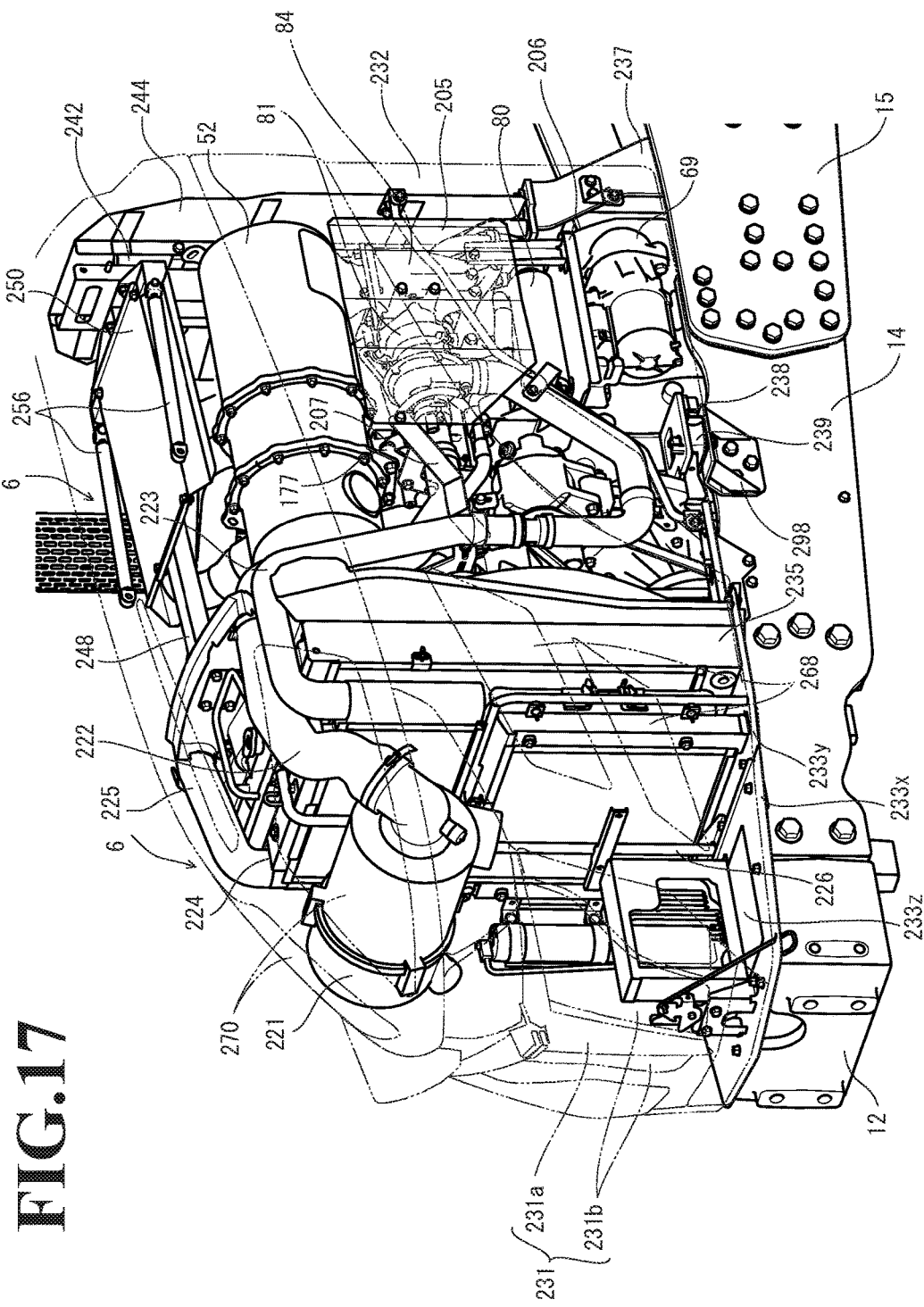
FIG. 17 is a left side enlarged view of the work vehicle illustrating the configuration in the engine compartment.

Next, a configuration of the engine compartment frame including the hood 6 will be described with reference to FIGS. 4 to 10 and FIGS. 13 to 22. First, as illustrated in FIGS. 16 and 17 or the like, the hood 6 includes a front grille 231 at the front lower section to cover the front of the engine compartment. The engine covers 232 are formed of perforated plates and are located below the hood 6 on the left and right sides to cover the left and right sides of the engine compartment. That is, the hood 6 and the engine covers 232 cover the front, the upper section, and the left and right sides of the diesel engine 5.

As illustrated in FIGS. 16 and 17 or the like, the hood 6 includes the front grille 231 at the center position on the front surface. The ceiling at the upper section of the hood 6 is shaped to tilt diagonally upward from the front to the rear. The front grille 231 includes a pair of left and right anti-dust screens 231*b*. The anti-dust screens 231*b* are secured with a central frame 231*a*. The hood 6 provides a wide space at the rear section below the ceiling. The hood 6 forms a large space for accommodating the exhaust-gas purification device 52 in the engine compartment inside the hood 6. The hood 6 includes opening holes 268 at the front section on the left and right side surfaces. Cooling air is drawn in from both left and right sides of the hood 6 through the pair of left and right opening holes 268. The hood 6 further includes left and right pair of meshed opening holes 270 at the front section of the ceiling. Cooling air is drawn in from the front upper section of the hood 6 through the pair of left and right opening holes 270. The opening holes 268, 270 are covered with meshed anti-dust screens.

Figure 18:
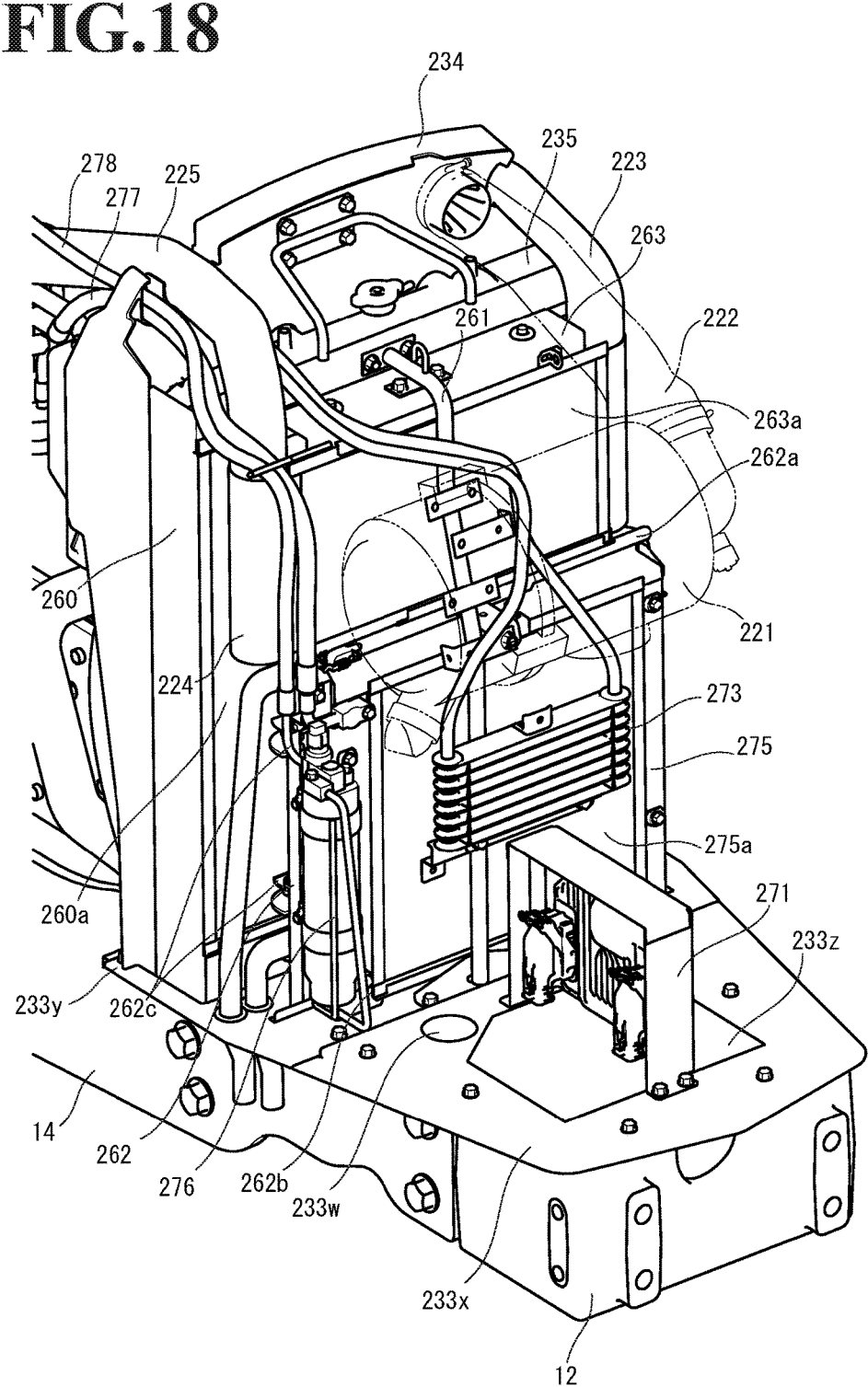
FIG. 18 is a perspective view of the work vehicle illustrating the configuration at a front position in the engine compartment.

As illustrated in FIGS. 16 to 18 or the like, the front end inner surfaces of the pair of left and right engine frames (front frames) 14 are coupled to the left and right outer surfaces of the frame coupling member 12. The frame coupling member 12 is formed of a rectangular metal casting. The diesel engine 5 is supported on the engine frames 14, which are held by the frame coupling member 12. A frame bottom plate 233 is held by the upper edges of the left and right engine frames 14 and the upper surface of the front bumper 12 to cover the front end upper sections of the engine frames 14. An undercover 296 to cover a lower front of the engine 5 is disposed at a rear end of the frame bottom plate 233. A front end of the undercover 296 is coupled to the flame bottom plate 233, and rear left and right side edges are respectively coupled to the left and right engine frames 14. The undercover 296 is made up of a front section extended from the rear end of the frame bottom plate 233 toward a lower end of the engine frame 14, and a rear section located below the engine 5 and extended forward.

The lower surface of the frame bottom plate 233 is coupled to the side surfaces of the left and right engine frames 14 via coupling brackets 233*a*, 233*b*. The coupling brackets 233*a*, 233*b* are located at the front and the rear. The frame bottom plate 233 is divided into two parts at the front and the rear and includes a front bottom plate 233*x* and a rear bottom plate 233*y*. A first end of each coupling bracket 233*a* is coupled to the side surface of the associated one of the pair of left and right engine frames 14. A front section of a second end of each coupling bracket 233*a* is coupled to the associated one of the left and right edges of the lower surface of the front bottom plate 233*x*. The front section of the front bottom plate 233*x* is fastened to the frame coupling member 12. A rear section of the second end of each of the pair of left and right coupling brackets 233*a* is coupled to the associated one of the left and right edges of the front lower surface of the rear bottom plate 233y. A second end of each of the pair of left and right coupling brackets 233b is coupled to the associated one of the left and right edges of the front lower surface of the rear bottom plate 233y.

The frame bottom plate 233 includes an opening hole 233z at a central region in the left and right direction. The opening hole 233z is located in the front bottom plate 233x of the frame bottom plate 233 and is covered with a meshed anti-dust screen. That is, the hood 6 and the frame bottom plate 233 include, at a position forward of the cooling fan 59 of the engine 5, the opening portions 231b, 233z, 268, 270. When the cooling fan 59 is driven, cooling air is drawn into the engine compartment in the hood 5 through the opening portions 231b, 233z, 268, 270 of the hood 6 and the frame bottom plate 233.

In the limited configuration at the front of the cooling fan 59, the open area is made greater than the flow rate of air to be passed through the cooling fan 59 by causing the hood 6 and the frame bottom plate 233 to be opened. This configuration reduces the flow velocity of the cooling air to be passed through the cooling fan 59, and the cooling air in the engine compartment is optimally controlled. By making the opening portion 233z of the frame bottom plate 233 into a mesh shape, dust is prevented from entering the engine compartment and allowed to fall down by its own weight after the engine 5 is stopped.

The opening portion 233z of the frame bottom plate 233 is located at a position above the frame coupling member 12. Since the frame coupling member 12 of the travelling machine body 2 is located below the opening portion 233z of the frame bottom plate 233, when the outside air flows into the engine compartment through the opening portion 233z, the frame coupling member 12 prevents dust and mud from entering the engine compartment. The engine frames 14, which support the engine 5, are secured by the frame coupling member 12. The frame coupling member 12 is made of a metal casting. This configuration reinforces the support structure of the engine 5.

As illustrated in FIGS. 16 to 18 or the like, an engine control unit (engine ECU) 271 is disposed at a front position of a heat exchanger such as the radiator 235 described later. The engine ECU 271 receives a sensor signal from each of sensors of the engine 5 and controls the driving of the engine 5. The engine control unit 271 is disposed upright on the frame bottom plate 233 by making the longitudinal direction of the engine control unit 271 extend along a back-and-forth direction of the traveling body 2 (the longitudinal direction of the engine frame 14). That is, the engine ECU 271 is disposed upright on the front bottom plate 233x of the frame bottom plate 233 and is disposed at a position located on a front rear side of the hood 6 so as to reduce a transverse width of the engine ECU 271.

By disposing the engine ECU 271 by setting the longitudinal direction to the back-and-forth direction, an installation direction of the engine ECU 271 can be extended along the cooling air passing through the engine compartment in the back-and-forth direction by the cooling fan 59. This makes it possible to reduce a shield area formed by the engine ECU 271 with respect to a flow of the cooling air. It is therefore possible to suppress a decrease of a flow rate of the cooling air toward the engine 5, and the inside of the engine compartment can be maintained at an appropriate temperature.

The frame bottom plate 233x includes a harness continuity hole 233w at a position adjacent to an upright position of the engine ECU 271 and behind the opening portion 233z. A harness (not shown) coupled to the engine ECU 271 is guided to a bottom side of the traveling body 2 through the harness continuity hole 233w and then coupled to, for example, the engine 5 and the battery 272 located therebehind. By disposing the engine ECU 271 on the front bottom plate 233x and the harness continuity hole 233w on the front bottom plate 233x, the engine ECU 271 can be configured by one unit with the use of the front bottom plate 233x, thereby improving assembling performance.

Additionally, the engine ECU 271 is disposed at a position between the anti-dust screens (opening portions) 231b arranged symmetrically horizontally on the front surface of the hood 6 and above the opening portion 233z of the frame bottom plate 233. That is, the engine ECU 271 is disposed on a pair of frames 231a of the front grille 231, and stand on the front bottom plate 233x so as to cross a lateral center of the opening portion 233z of the frame bottom plate 233. Because the engine ECU 271 can be disposed at a position not overlapping with the opening portion 231b of the hood 6, an opening area for cooling air introduction is not reduced by the engine ECU 271. It is also possible to obtain the effect of cooling the engine ECU 271 by disposing the engine ECU 271 above the opening portion 233z of the frame bottom plate 233.

As illustrate in FIGS. 16 to 18 or the like, the radiator 235 having a fan shroud 234 secured to a back side thereof is disposed upright on the rear bottom plate 233y of the frame bottom plate 233 so as to be located on the front side of the engine 5. The fan shroud 234 surrounds an outer periphery of the cooling fan 59 and establishes communication between the radiator 235 and the cooling fan 59. The radiator 235 is supported inside a rectangular-shaped radiator frame 260 that is secured in its standing state to the frame bottom plate 233. The radiator frame 260 has an anti-dust mesh 260a disposed on a front thereof in order to prevent dust or the like from entering the frame-shaped radiator frame 260. The radiator frame 260 is also secured onto the frame bottom plate 233 so as to surround the radiator 235 located inside the radiator frame 260, and is also coupled to the fan shroud 234.

The frame 226 is disposed upright on the rear bottom plate 233y of the frame bottom plate 233 in front of the radiator 235. The frame 226 includes an air cleaner support frame 261 to support the air cleaner 221. The air cleaner support from 261 is a bent bar-shaped frame, one end of which is coupled to the rear bottom plate 233y and whose other end is coupled to the radiator frame 260. The air cleaner 221 is secured over the air cleaner support frame 260, and a fuel cooler 273 for cooling fuel is secured to the air cleaner support frame 261 at a position below the air cleaner 221.

The frame 226 further includes a gate type frame 262 being bent in a gate type, whose both ends are secured onto the frame bottom plate 233y. Both left and right ends (lower ends) of the gate type frame 262 are coupled to the frame bottom plate 233y, and the gate type frame 262 is disposed upright between the radiator frame 260 and the air cleaner support frame 261. A lateral central part of an upper frame of the gate type frame 262 is coupled to a vertical intermediate part of the air cleaner support frame 261. The air cleaner support frame 261 supports the air cleaner 221 by a part of the frame 261 located above a portion thereof coupled with the gate type frame 262, and supports the fuel cooler 273 by a part of the frame 261 located below the portion thereof coupled with the gate type frame 262.

The gate type frame 262 supports the oil cooler 274 for cooling a lubricant by the back of the frame 262 (close to the radiator 235), and supports a condenser 275 for cooling a lubricant by the front thereof (close to the fuel cooler 273).

An intercooler 224 is vertically held by an intercooler coupling bracket 263 secured to the upper end of the air cleaner support frame 261, and the upper frame of the gate type frame 262, and the intercooler 224 is supported above the oil cooler 274. An anti-dust mesh 263a is held and supported by the upper frame of the gate type frame 262 and the intercooler coupling bracket 263 in front of the intercooler 224.

The condenser 275 is configured as a case-integrated type. A receiver drier 276 that subjects coolant to gas-liquid separation is coupled and secured to a side surface of the case, and an anti-dust mesh 27a is disposed on a front surface of the case. The air cleaner support frame 261 being disposed upright from the frame bottom plate 233 is bent diagonally backward above the condenser 275, and is also bent backward above the intercooler 224. Therefore, the air cleaner 221 is supported by the air cleaner support frame 261 so as to be located above the condenser 275 at a position partially overlapped with the condenser 275 in the back-and-forth direction.

As illustrated in FIGS. 16 to 18 or the like, a plurality of heat exchangers such as the intercooler 224 are disposed at the front of the radiator 235 so as to reduce a pressure loss of an offset portion with the cooling fan 59. This makes it possible to level a flow rate distribution of cooling air passing through the fan shroud 234, thereby suppressing occurrence of differential pressure in the fan shroud 234. It is therefore possible to prevent a backward flow of the cooling air in the radiator 235 and enhance cooling efficiency in the radiator 235.

More specifically, the intercooler 224 is disposed on an upper side in front of the radiator 235, and the oil cooler 274 for cooling lubricating oil is disposed on a lower side in front of the radiator 235. The condenser 275 is disposed in front of the oil cooler 274. This arrangement reduces a pressure loss in an offset region between the cooling fan 59 and the radiator 235. This leads to such a structure that is easy to take the cooling air, thereby reducing a load exerted on the cooling fan 59.

The air cleaner 221 is secured to a position away from the intercooler 224 in front of the intercooler 224. By disposing the air cleaner 221 and the intercooler 224 away from each other, a space is formed above the radiator 235, thus leading to such a structure that makes it easier for the cooling air to flow into the radiator 235. Consequently, the flow rate distribution of the cooling air in the engine compartment below the hood 6 can be levelled in a height direction, thereby suppressing, for example, the back flow of the cooling air.

Figure 19:
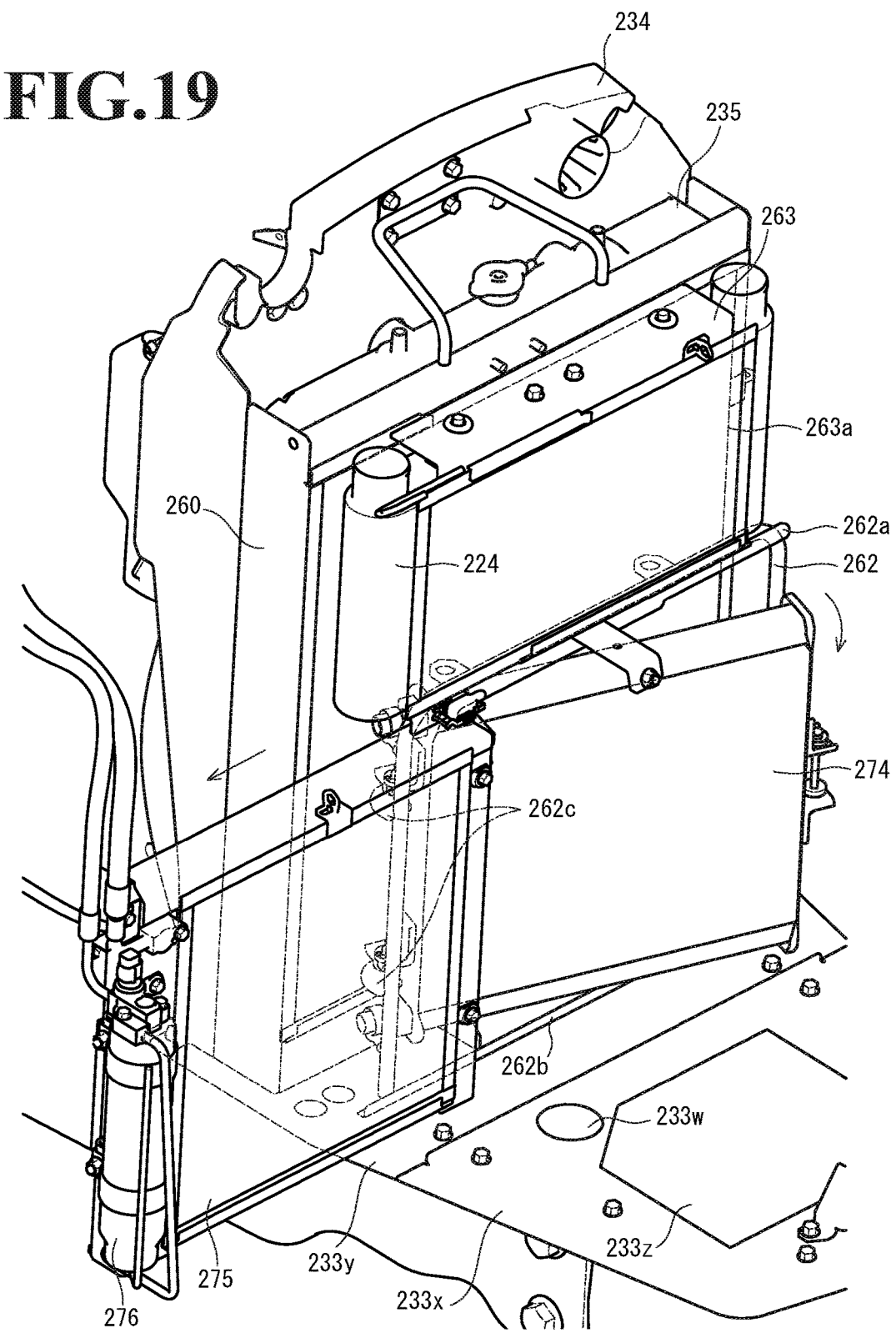
FIG. 19 is a perspective view illustrating a moving state of a condenser and an oil cooler disposed in the work vehicle.

As illustrated in FIGS. 18 and 19 or the like, the air cleaner 221 and the condenser 275 are respectively disposed upper and lower sides in front of the radiator 235, and the condenser 275 is drawable in a transverse direction. That is, a rail 262a is disposed in front of the upper fame of the gate type frame 262, and a rail 262b is disposed at a position immediately below the rail 262a of the frame bottom plate 233. By locking upper and lower edges of the back of the condenser 275 to the upper and lower rails 262a and 262b, the condenser 275 is held slidably in the transverse direction by the gate type frame 262 and the rear bottom plate 233y.

The condenser 275 is configured integrally with the receiver drier 276 to establish coupling between the coolant hoses 277 and 278 coupled to the air conditioner compressor 211 and the air conditioner 364. The coolant hoses 277 and 278 are nipped while being locked by fan shroud 234 and the intercooler coupling bracket 263. Only by unlocking the coolant hoses 277 and 278, the condenser 275 becomes drawable, and there is no need to remove the coolant hoses 277 and 278 from the receiver drier 276. Thus, by drawing the condenser 275 with the use of the space below the air cleaner 221 in the engine compartment, it is easy to access to a back space of the condenser 275. It is therefore possible to eliminate complications of a maintenance operation, such as a dust removal operation behind the condenser 275.

The intercooler 224 and the oil cooler 274 are disposed to vertically overlap each other at the front of the radiator 235, and the oil cooler 274 is secured rotatably around a vertical axis in the gate type frame (stationary frame) 262 to secure the upper stage intercooler 224. That is, a pivot member 262c is disposed either one of left and right frames of the gate type frame 262. One of left and right side surfaces of the oil cooler 274 is pivotally supported around the vertical axis, and the oil cooler 274 is disposed openably and closably with respect to the gate type frame 262. In the present embodiment, the condenser 275 is configured to be drawn rightward together with the receiver drier 276 disposed on the right side surface, and therefore the oil cooler 274 is pivotally supported on the right frame of the gate type frame 262. The oil cooler 274 is disposed rotatably around the vertical axis at the back of the drawable condenser 275. This makes it easier for an operator to access to a lower part at the front of the radiator 235 where dust is apt to stay due to the flow of the cooling air, thereby eliminating the complexities of the maintenance operation.

As illustrated in FIGS. 4 to 10 and 16, the upstream relay pipe 223 and the downstream relay pipe 225 are distributed on both sides of the engine 5 and extend toward the front upper section of the engine 5 to be coupled to the intercooler 224, which is located on a frame 226 at the front of the engine 5. The air cleaner 221 is located on the upper section of the front surface of the frame 226. The supply pipe 222, which is coupled to the air cleaner 221, extends over the frame 226 toward the rear section on the left side of the engine 5. A fresh air intake side of the intake communication pipe 76 of the engine 5 is communicated with the downstream relay pipe 225 via the intake throttle member 77. In the turbocharger 81 of the engine 5, a fresh air intake side of the compressor case 83 is communicated with the supply pipe 222, and a fresh air discharge side of the compressor case 83 is communicated with the downstream relay pipe 225.

With the above-described configuration, dust is removed from the fresh air (external air) taken into the air cleaner 221 to purify the fresh air, and the fresh air is then drawn into the compressor case 83 of the turbocharger 81 via the supply pipe 222. The pressurized fresh air that has been compressed in the compressor case 83 of the turbocharger 81 is supplied to the EGR body case of the EGR apparatus 75 via the relay pipes 223, 225 and the intercooler 224. Some of the exhaust gas (EGR gas) from the exhaust manifold 57 is cooled by the EGR cooler 80, and the cooled EGR gas is then supplied to the EGR body case of the EGR apparatus 85 via the recirculation exhaust gas pipe 78.

Furthermore, by distributing the supply pipe 222 and the upstream relay pipe 223, and the downstream relay pipe 225 into the left and right sides in the engine compartment below the hood 6, efficient piping is attainable with respect to the engine 5 in which the turbocharger 81 and the intake manifold 56 are distributed into the left and right sides. Therefore, by disposing these pipes 222, 223, and 225 for air passage on the outside of the engine 5 with an enough margin, warming due to exhaust heat from the engine 5 and the exhaust-gas purification device 52 can be suppressed to reduce thermal influence on the air passing through the pipes. The intercooler 224 disposed in front of the engine compartment can be disposed in such a way that a fresh air outlet side of the intercooler 224 and a fresh air inlet side thereof are distributed into the left and right sides. It is therefore possible to not only shorten each of the upstream relay pipe 223 and the downstream relay pipe 225 that establish communication with the engine 5, but to achieve compact accommodation of the intercooler 224 on the front side in the engine compartment.

As illustrated in FIGS. 13 to 15, 29, and 30 or the like, the front end of each of the left and right body frames 15 is coupled to the rear end of the corresponding one of the left and right engine frames 14 via a spacer 297. The left and right body frames 15 are located to sandwich the left and right engine frames 14. The sections of the pair of left and right body frames 15 located below the front section of a floor plate 40 are coupled to each other by a support beam frame 236. The coupling surface (outer side) between each body frame 15 and the support beam frame 236 is flush with the coupling surface (outer side) between each spacer 297 and the associated body frame 15. The support beam frame 236 is bolted to the left and right body frames 15 to hold the left and right body frames 15. An engine support frame 237 is mounted on the upper surface of the support beam frame 236. The lower end surface of the engine support frame 237 is bolted to the upper surface of the support beam frame 236 so that the engine support frame 237 surrounds the flywheel 61 of the diesel engine 5 together with the support beam frame 236.

Engine leg securing portions 74 are provided on left and right lower sides of the diesel engine 5. The engine leg securing portions 74 are coupled to engine support brackets 298 via engine legs 238. The engine support brackets 298 are located at the middle of the pair of left and right engine frames 14. The engine legs 238 each include a rubber vibration isolator 239. Engine leg securing portions 60a are provided on the upper section of a flywheel housing 60. The flywheel housing 60 is located on the rear surface of the diesel engine 5. The engine leg securing portions 60a are coupled to the upper surface of the engine support frame 237 via an engine leg (engine mount) 240. The engine leg 240 includes rubber vibration isolators 241.

The engine legs 238 are bolted to the upper sections of the engine support brackets 298, which are coupled to the outer side at the middle of the pair of left and right engine frames 14, with the rubber vibration isolators 239 located on the lower side. The diesel engine 5 is sandwiched between the engine frames 14 with the pair of left and right engine legs 238 so that the front section of the diesel engine 5 is supported. The rear surface of the diesel engine 5 is coupled to the front ends of the pair of left and right body frames 15 via the support beam frame 236, the engine support frame 237, and the engine leg 240 so that the rear section of the diesel engine 5 is supported by the front ends of the body frames 15. The left and right front rubber vibration isolators 239 and the left and right rear rubber vibration isolators 241 support the diesel engine 5 on the travelling machine body 2.

Figure 20:
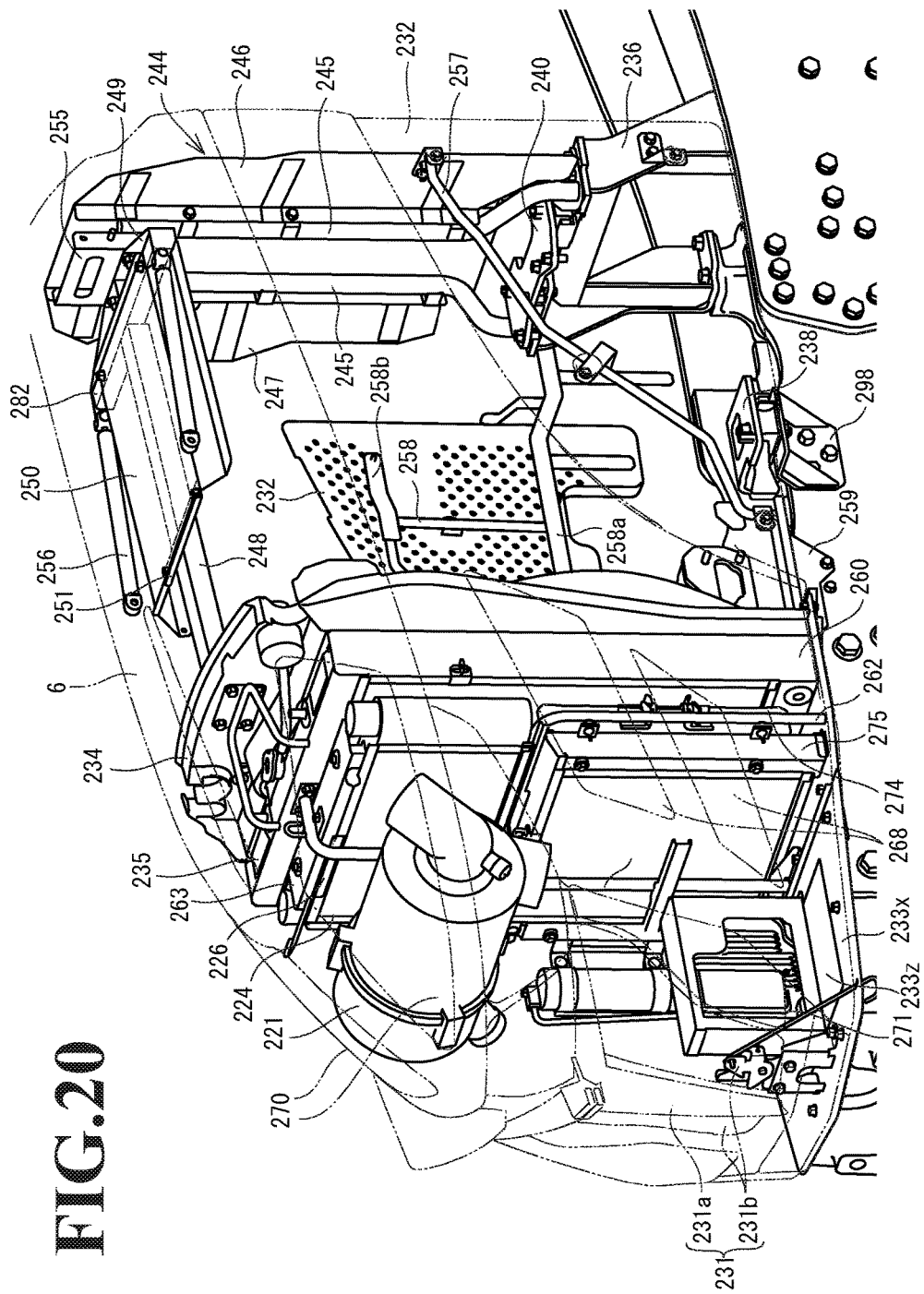
FIG. 20 is a front perspective view of the work vehicle illustrating a frame configuration in the engine compartment.
Figure 21:
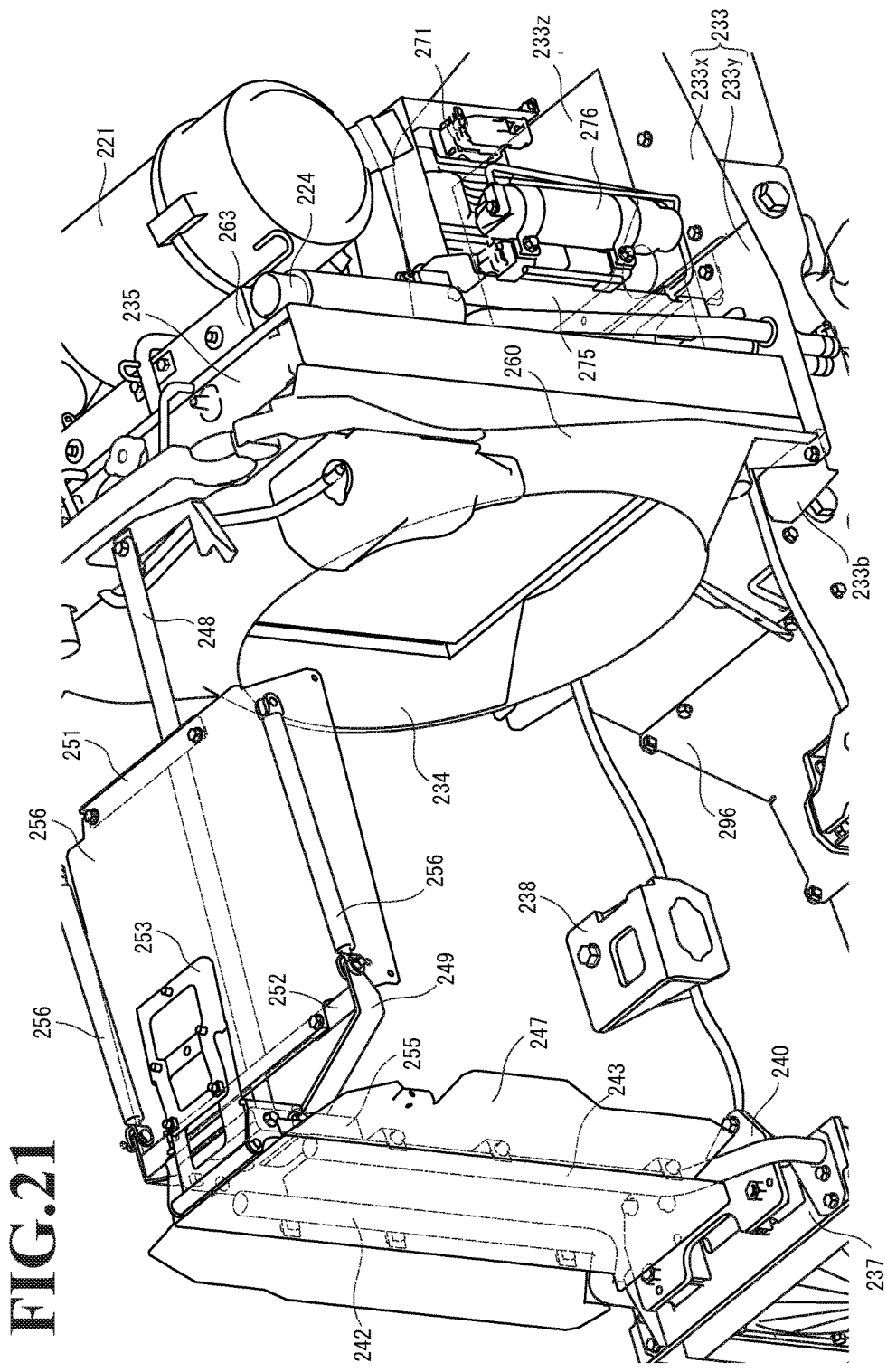
FIG. 21 is an enlarged perspective view of the frame configuration in the engine compartment.

As illustrated in FIGS. 20 and 21 or the like, a pair of left and right pillar frames 242, 243 extend upright from the upper surface of the engine support frame 237 to sandwich the engine leg 240 from left and right sides. A hood shield 244 covers the rear of the hood 6. The hood shield 244 is coupled to the pair of left and right pillar frames 242, 243 such that the lower edge of the hood shield 244 is separate from the upper surface of the engine leg 240. Beam frames 248 are held between the upper sections of the fan shroud 234 and the hood shield 244. Since the fan shroud 234 and the hood shield 244, which are stably supported by the travelling machine body 2, are coupled to each other by the pair of beam frames 248, which are held between the fan shroud 234 and the hood shield 244, these members integrally configure a sturdy engine compartment frame as a whole.

Figure 7:
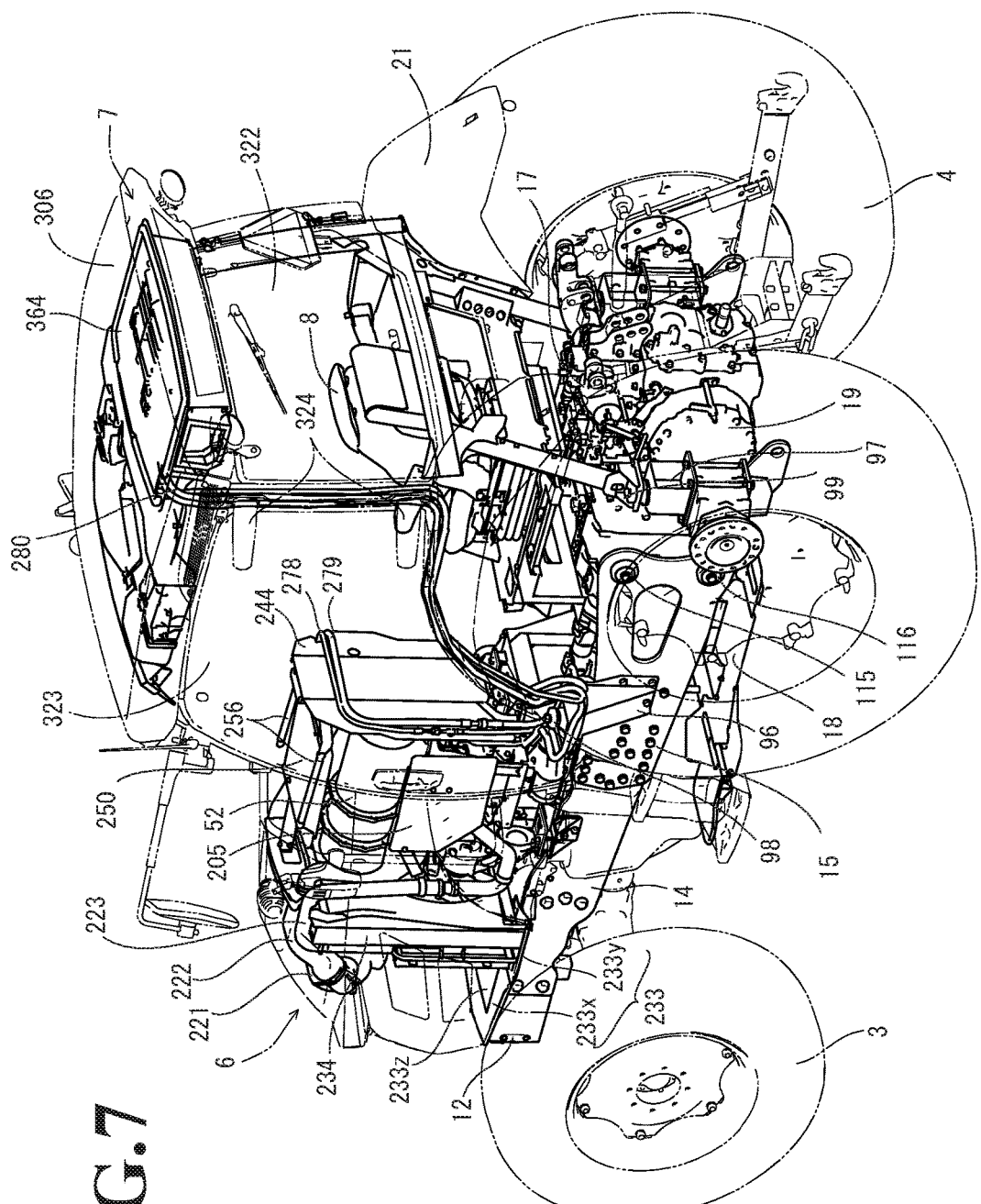
FIG. 7 is a rear perspective view of the work vehicle.
Figure 8:
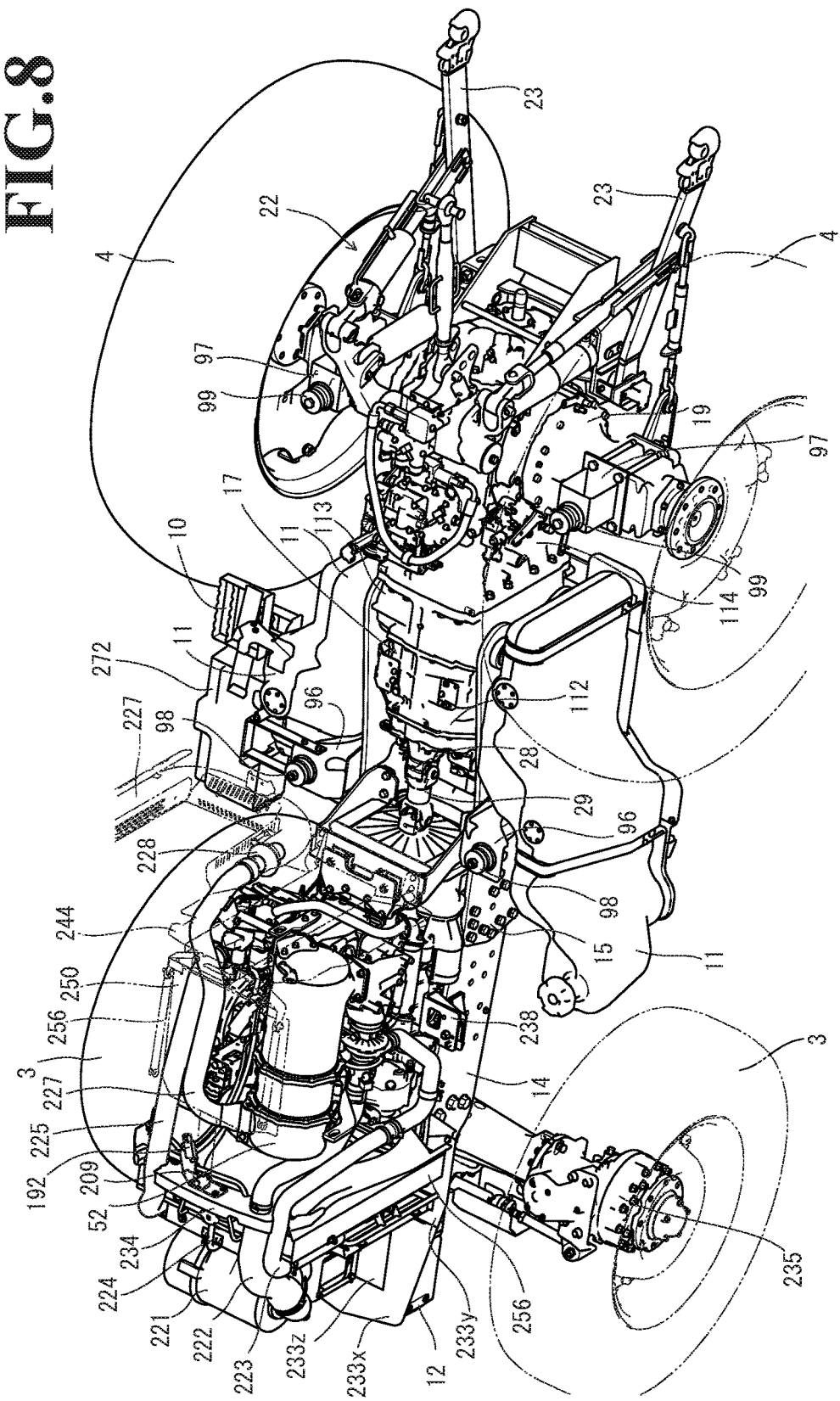
FIG. 8 is a rear perspective view of the travelling machine body as viewed from the left side.
Figure 9:
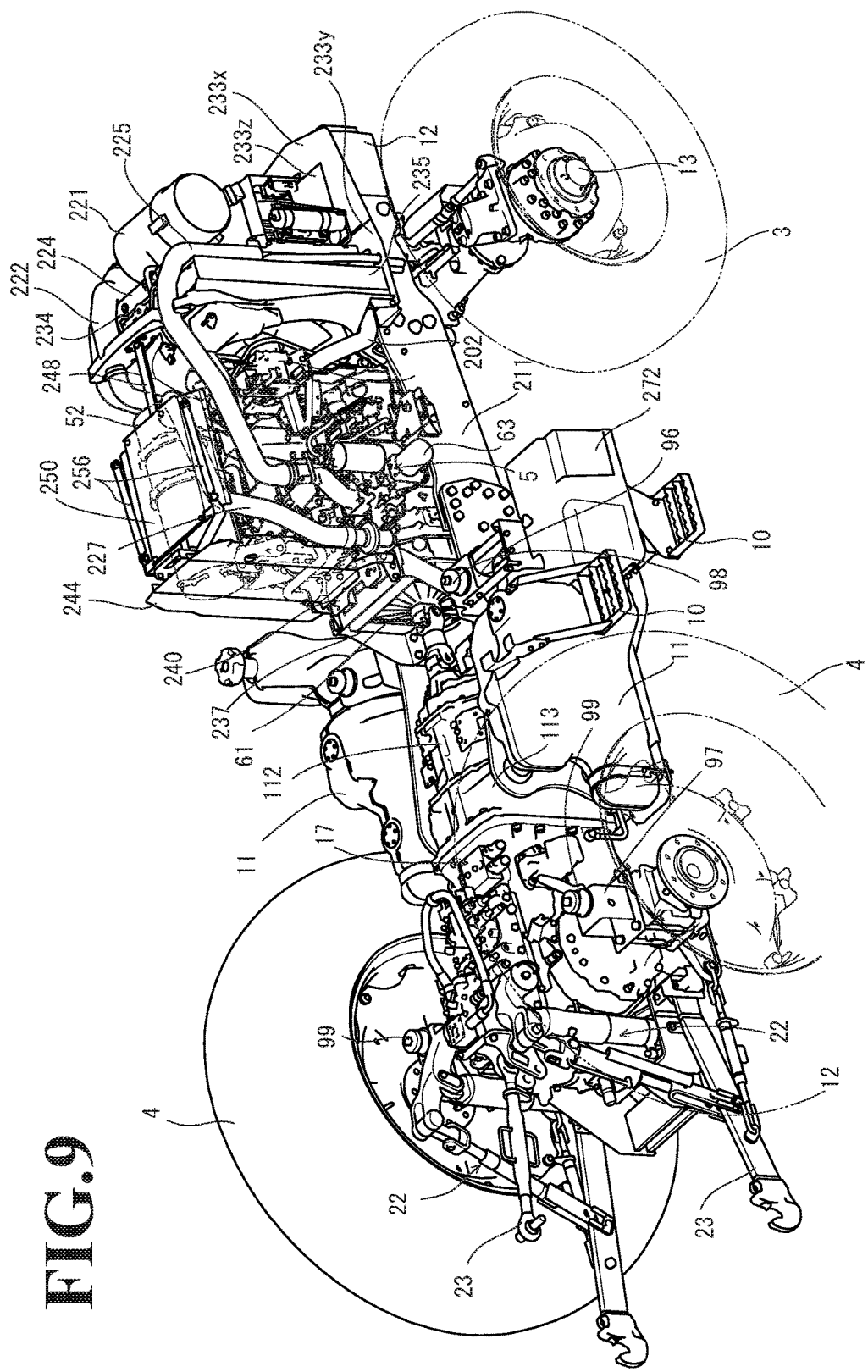
FIG. 9 is a rear perspective view of the travelling machine body as viewed from the right side.
Figure 10:
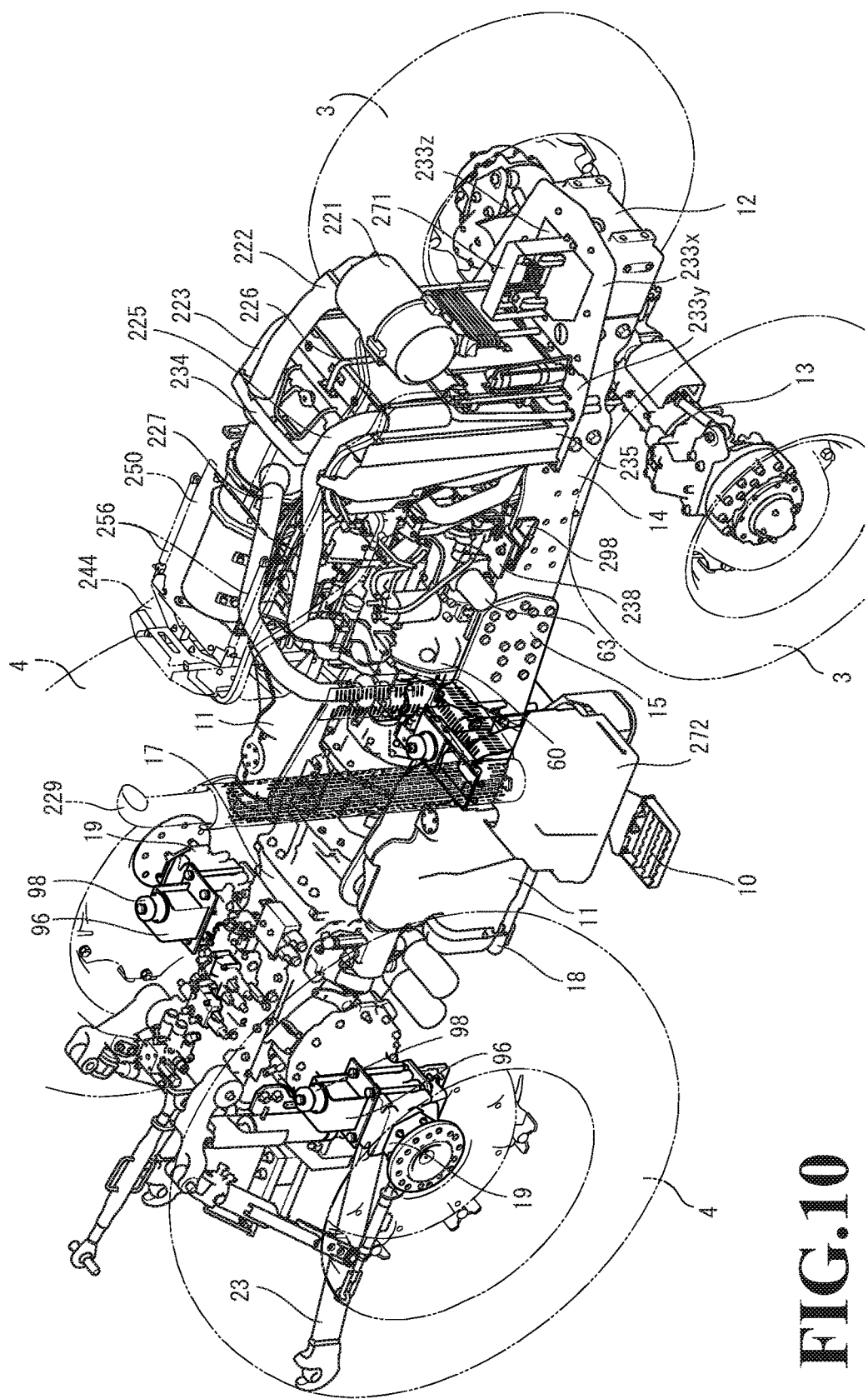
FIG. 10 is a front perspective view of the travelling machine body as viewed from the right side.
Figure 11:
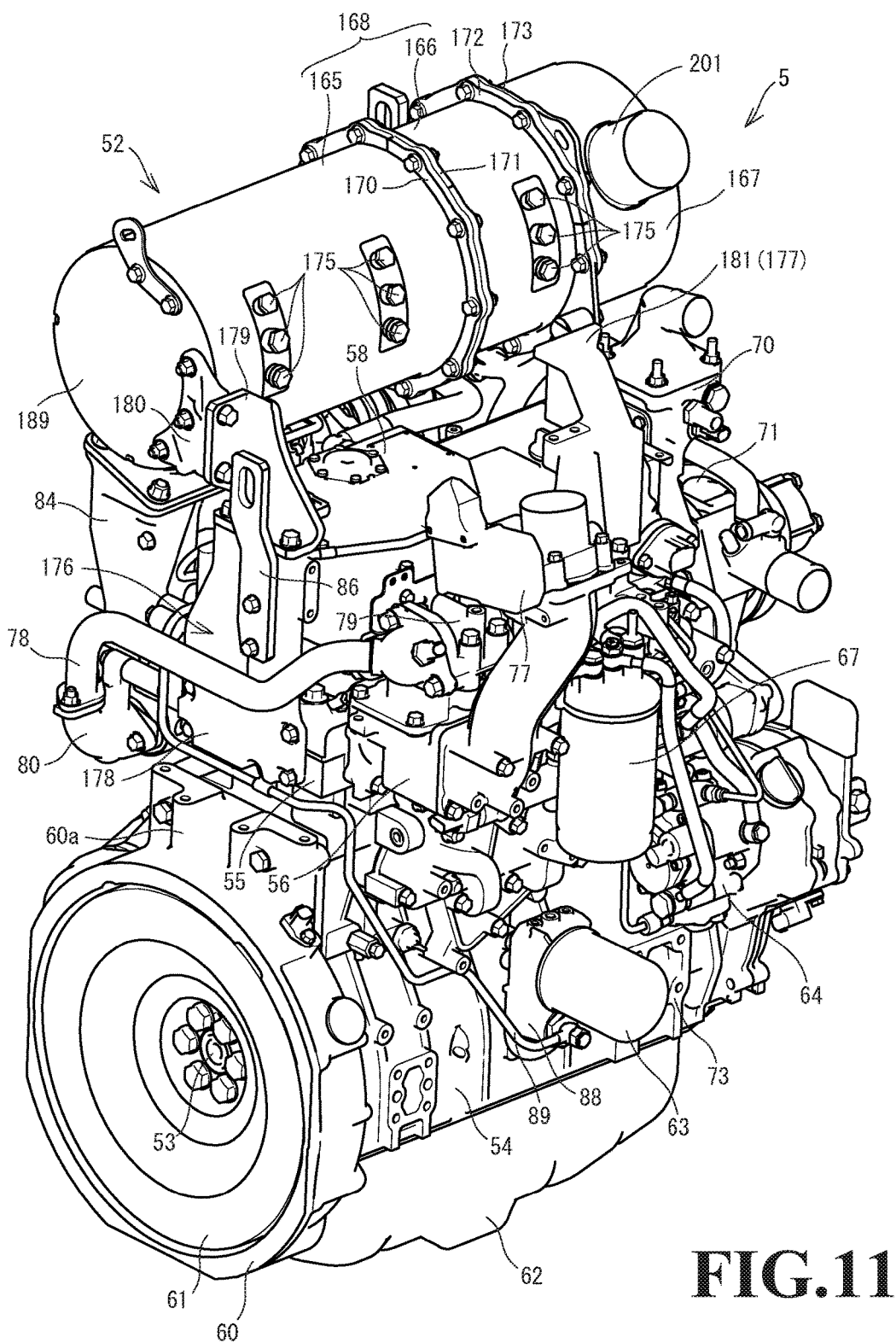
FIG. 11 is a rear perspective view of a diesel engine mounted on the work vehicle of the invention of the present application.
Figure 12:
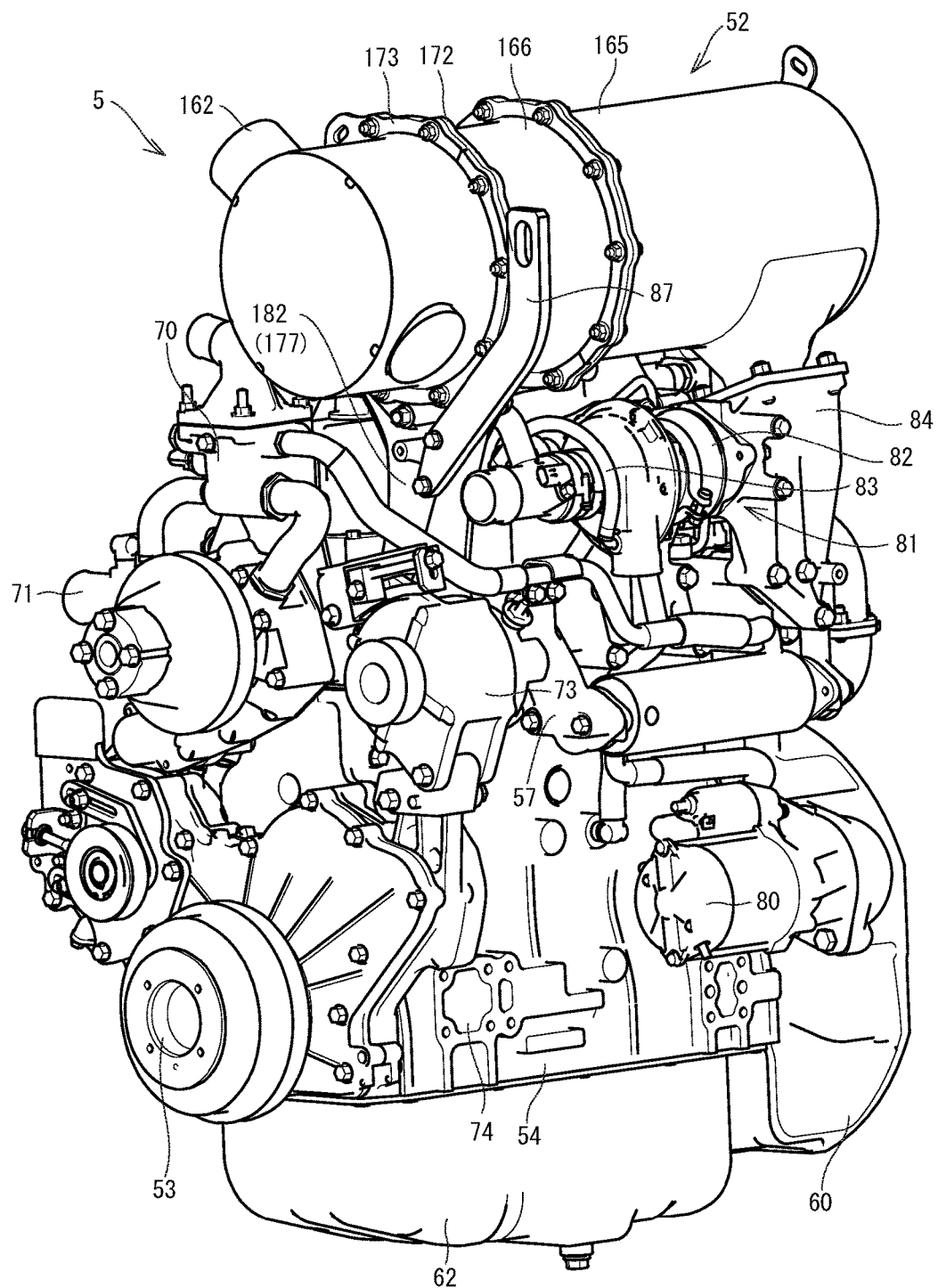
FIG. 12 is a front perspective view of the diesel engine.

By bending both left and right sides of the hood shield 244, it is possible to cover left and right rear parts of the engine compartment and also form a space with respect to the front of the cabin 7. This prevents noise generated from the engine 5 in the engine compartment from propagating to the cabin 7 (operators' seat 8). Additionally, the hood shield 244 is made into such a shape that both left and right sides thereof are inclined forward in a plan view, thereby enlarging left and right regions in the space surrounded by the engine compartment and the cabin 7 below the hood 6. Therefore, as illustrated in FIG. 7 or the like, when the coolant hoses 277 and 279 close to the engine compartment coupled to the receiver drier 276 and the air conditioner compressor 211 are coupled to the coolant hoses 280 coupled to the air conditioner 364 of the cabin 7, it becomes easy to perform a coupling operation behind the hood shield 244.

The hood shield 244 is made up of a rear shield surface (first shield surface) 245 which has a front secured to the pair of left and right pillar frames 242 and 243 and extends in approximately parallel to the front of the front window glass 321 of the cabin 7, and the pair of left and right side shield surfaces (second and third shield surfaces) 246 and 247 which are tilted forward from the left and right edges of the rear shield surface 245. The left and right side shield surfaces 246 and 247 are supported more firmly by being also coupled to middle portions of the pillar frames 242 and 243.

The hood shield 244 is located at a position away from the front of the front window glass 321 by the pillar frames 242 and 243. Due to the fact that the left and right side shield surfaces 246 and 247 are tilted, left and right edges of the hood shield 244 can be disposed more forwardly away from the front window glass 321 so as to enlarge the space with respect to the cabin 7 at rear left and right positions of the hood shield 244.

As described above, the hood shield 244 has the bent shape in the plan view. That is, the both left and right sides of the hood shield 244 is bent forward so that both left and right edges of the hood shield 244 are disposed ahead of a middle portion thereof. Heat in the engine compartment below the hood 6 is blocked by the hood shield 244. This makes it possible to prevent the cabin 7 (operator's seat 8) behind the engine compartment from heated by the exhaust heat from the engine compartment. Accordingly, the operator in the cabin 7 is capable of comfortably operating without receiving influence of the exhaust heat from the engine 5 and the exhaust-gas purification device 52.

The hood shield 244 is disposed on the back side of the hood 6 so as to cover at least the back of the exhaust-gas purification device 52 and the back of the exhaust pipe 227 in the interior of the hood 6. The hood shield 244 covers at least the back of the diesel engine 5 by having a shape overhanging leftward and rightward from the pair of left and right pillar frames 242 and 243. A right region of the hood shield 244 is opened on the back side of the engine compartment, and the exhaust pipe 227 and the tailpipe 229 are coupled to each other in the region. An open region for coupling the exhaust pipe 227 and the tailpipe 229 is provided by cutting away a lower right side of the right side shield surface 247.

By covering the back of the hood 6 with the hood shield 244, the heat in the engine compartment below the hood 6 is blocked by the hood shield 244, thereby preventing the cabin 7 from being heated by the exhaust heat from the engine compartment. The operator in the cabin 7 is therefore capable of operating comfortably without receiving the influence of the exhaust heat from the diesel engine 5 and the exhaust-gas purification device 52. By disposing the hood shield 244 away from the front of the cabin 7, a heat insulating layer is formed between the cabin 7 disposed behind the hood 6 and the hood shield 244.

Figure 22:
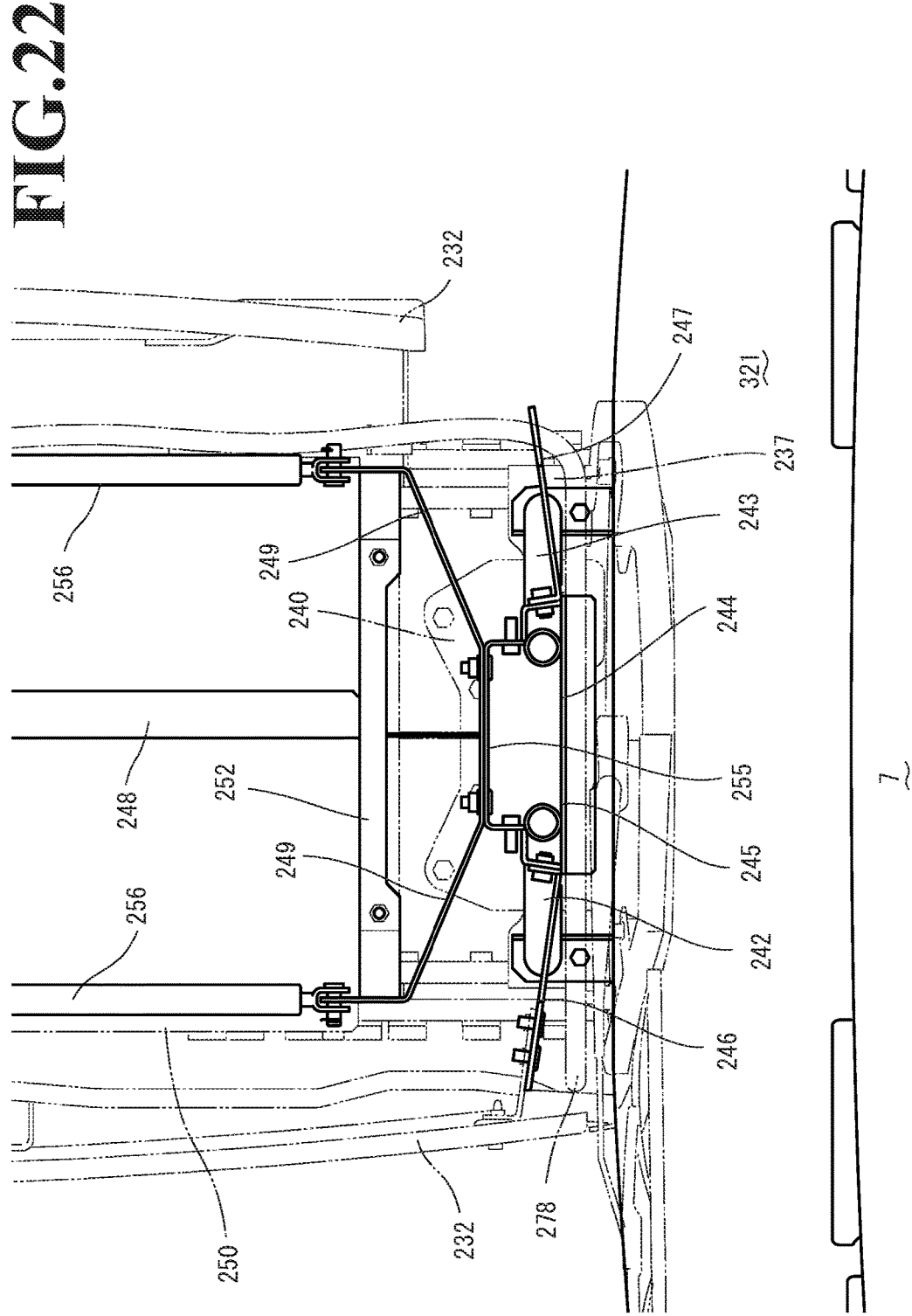
FIG. 22 is an enlarged plan view illustrating a configuration of a hood shield plate in the engine compartment.
Figure 23:
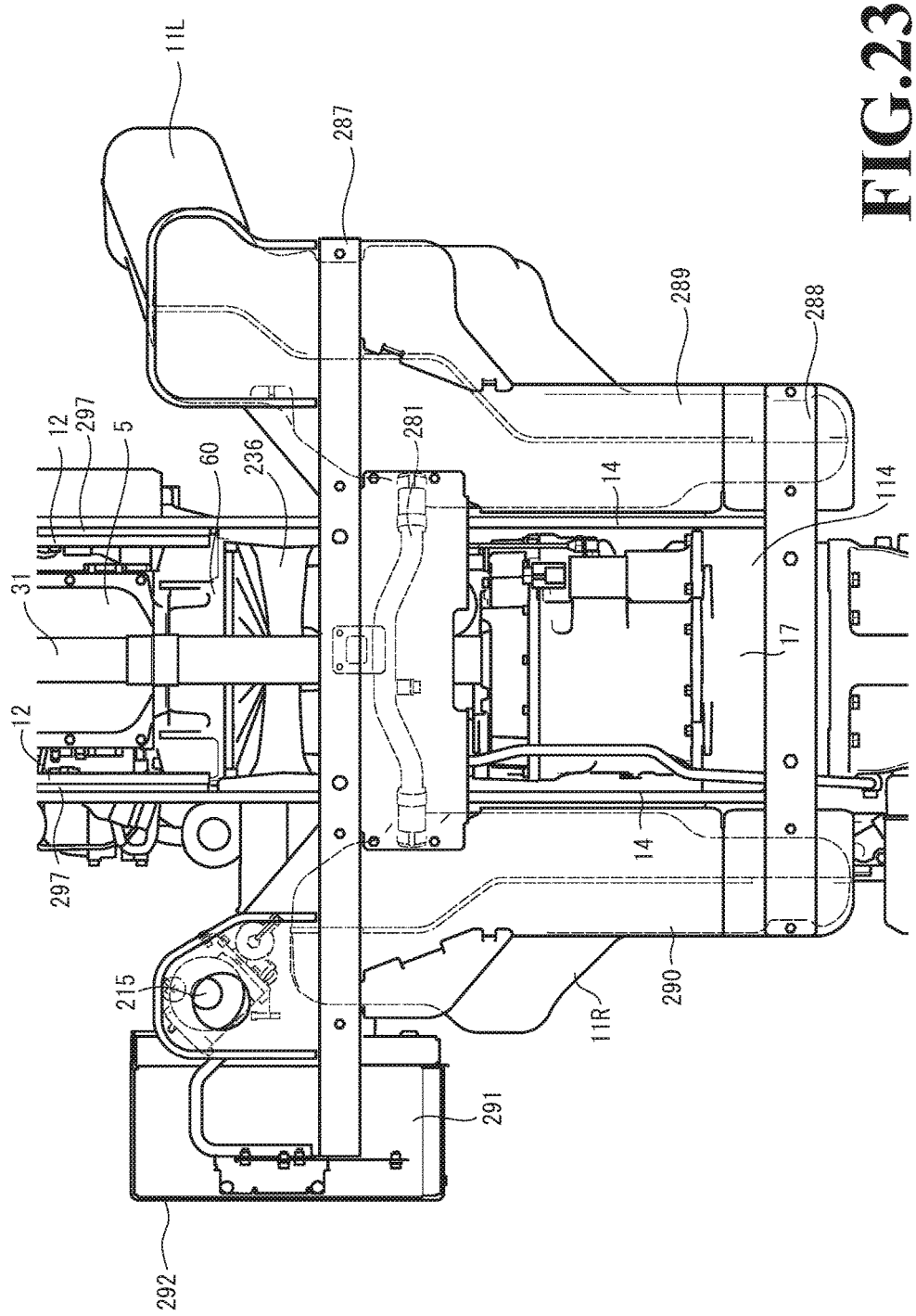
FIG. 23 is an enlarged bottom view illustrating a support configuration of a fuel tank.
Figure 24:
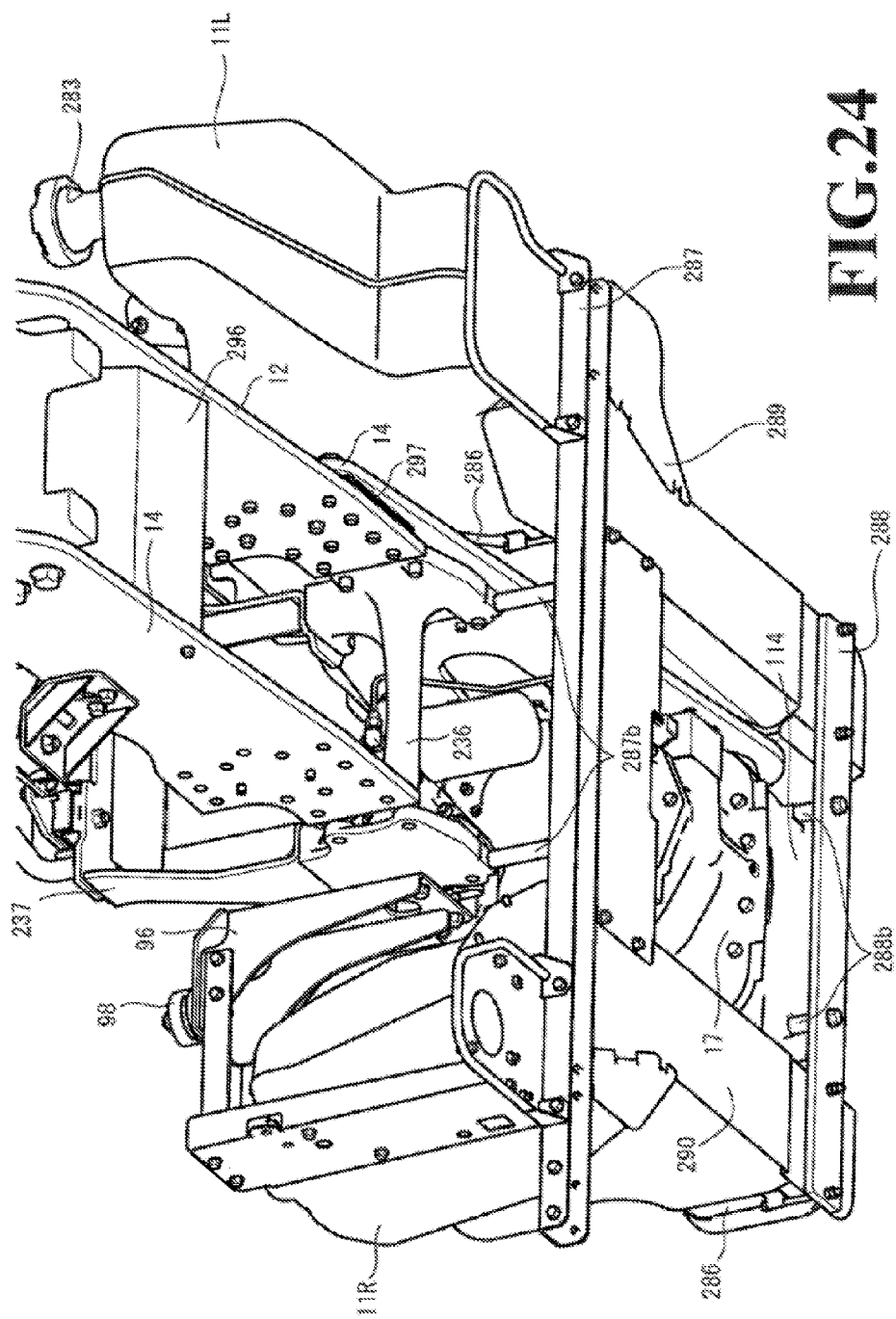
FIG. 24 is a perspective view illustrating the support configuration of the fuel tank as viewed from a lower side.
Figure 25:
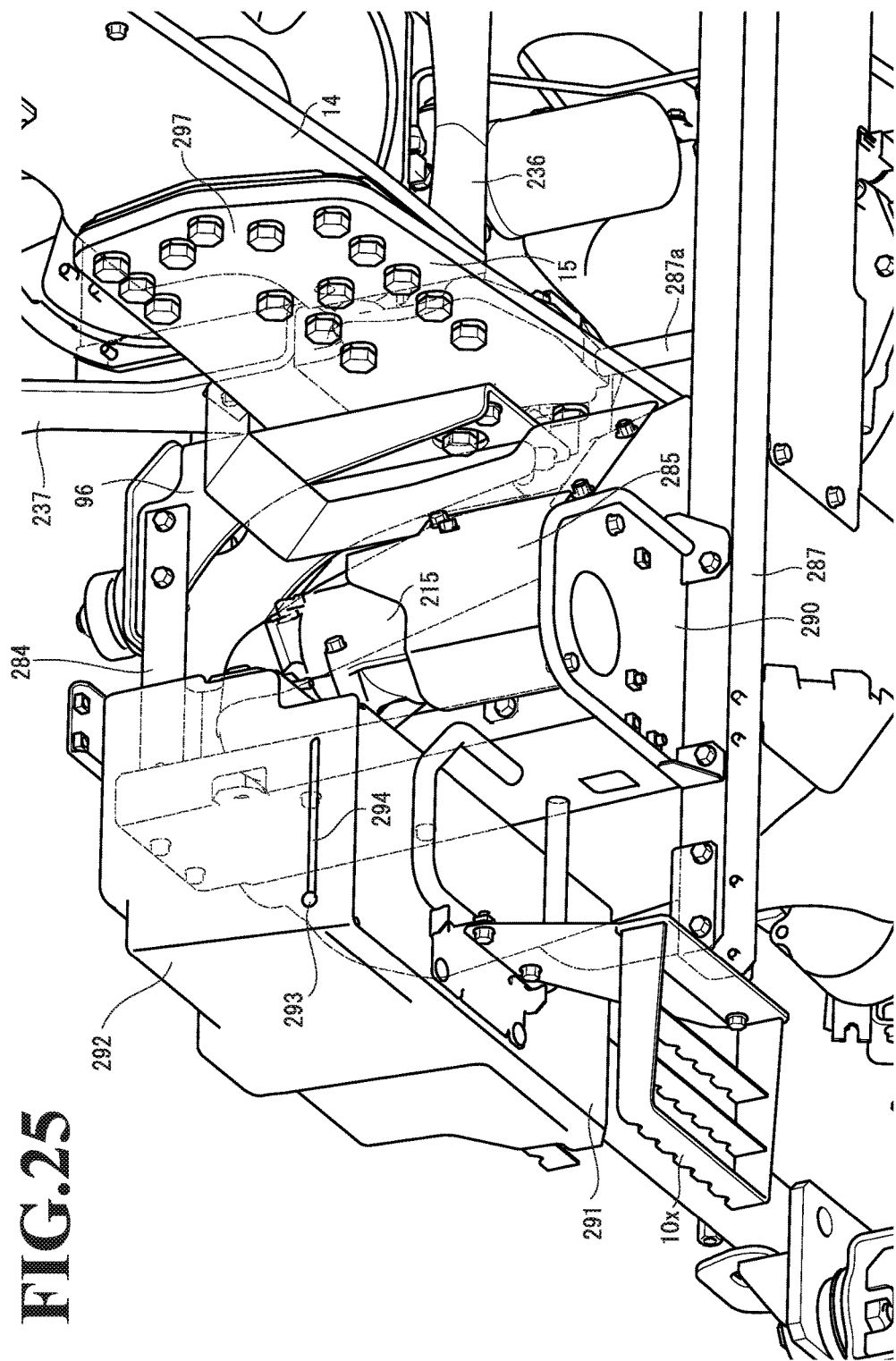
FIG. 25 is a perspective view illustrating a support configuration of a battery as viewed from a lower side.

As illustrated in FIGS. 20 to 22, the pair of left and right pillar frames 242 and 243 are coupled to a middle region surrounded by bend portions of the hood shield 244 (rear shield surface 245), and the pillar frames 242 and 243 and the fan shroud 234 are held by the beam frames 248. The fan shroud 234 and the pillar frames 242 and 243, which are stably supported by the travelling body 2, are coupled to each other by being held by the beam frames 248. Consequently, these members are integrated together to configure a robust engine compartment frame body as a whole.

A hood support bracket 255 is disposed on upper ends of the pillar frames 242 and 243. A rear part of the hood 6 is rotatably supported on the upper ends of the pillar frames 242 and 243 by establishing coupling between the hood support bracket 255 and a hinge member 253 disposed at a rear part of the hood 6. The hood support bracket 255 has a shape obtained by bending both left and right edges thereof, and is firmly secured to the front of each of the pillar frames 242 and 243. The hood support bracket 255 is made into a U-shape obtained by backwardly bending both left and right edges thereof. Both ends of the hood support bracket 255 are coupled to the pillar frames 242 and 243, and the front thereof is coupled to rear ends of the beam frames 248. That is, the beam frames 248 are coupled to the pillar frames 242 and 243 via the hood support bracket 255.

The beam frames 248 are extended forward and backward so that a right edge of each of the beam frames 248 is located rightward beyond a central position of the hood 6. The exhaust-gas purification device 52 is disposed along the beam frames 248 so that the exhaust-gas purification device 52 is located above the engine 5 and between the beam frames 248 and an inner side surface of the hood 6. Because the exhaust-gas purification device 52 is located between the beam frames 248 and the inner side surface of the hood 6, there is a large space around the exhaust-gas purification device 52. It is therefore possible to eliminate complications in attachment of components and maintenance above the engine 5.

A heat insulator 250 is disposed above the engine 5 so as to cover middle portions of the beams frames 248 to rear portions thereof below the hood 6. Frames 251 and 252 are extend to both left and right sides at each of the middle portions and rear ends of the beam frames 248. That is, the front frame 251 is secured onto the upper side of the middle portions of the beam frames 248 and is extended to the left and right sides of the beam frames 248. The rear frame 252 is secured onto the lower side of the rear ends of the beam frames 248 and is extended to the left and right sides of the beam frames 248. Both front and rear edges of the heat insulator 250 are firmly secured to the pair of front and rear frames 251 and 252. The heat insulator 250 is disposed so as to cover over the exhaust-gas purification device 52 and the exhaust pipe 227 above the engine 5. By disposing the heat insulator 250 between the exhaust-gas purification device 52 and the exhaust pipe 227, and the hood 6, it is possible to prevent warming of the hood 6 due to the exhaust heat from the engine compartment.

The exhaust-gas purification device 52, which is mounted on the upper section of the engine 5, is located inside the rear section of the hood 6. A heat insulator 250 is located between the hood 6 and the exhaust-gas purification device 52. Since the heat insulator 250 is located above the exhaust-gas purification device 52, the temperature of the hood 6 is prevented from being increased by exhaust heat generated by the exhaust-gas purification device 52 and the diesel engine 5. A space is formed between the hood 6 and the heat insulator 250 to insulate the inside of the engine compartment below the heat insulator 250 from the outside air. This configuration allows the exhaust-gas purification device 52 to be operated under a high-temperature environment.

Furthermore, the hood shield 244, which is located on the rear side of the hood 6 and covers at least the exhaust-gas purification device 52 from the rear surface, is provided in addition to the above-described heat insulator 250. Since heat in the engine compartment below the hood 6 is insulated by the hood shield 244 together with the heat insulator 250, the temperature inside the cabin 7 is prevented from being increased by the exhaust heat from the engine compartment. Also, a gap between the hood shield 244 and the heat insulator 250 makes it unlikely that heat is kept in the engine compartment below the hood 6. This inhibits heat damage on, for example, the exhaust-gas purification device 52 itself and the hood 6.

Extendable gas springs (hood dampers) 256, 256 are located on the left and right sides of the heat insulator 250 below the hood 6. One end (rear end) of each of the pair of left and right gas springs 256, 256 is pivotally attached to the engine compartment frame, and the other end (front end) of each of the gas springs 256, 256 is pivotally attached to the inner surface of the upper section of the hood 6. An extended frame 249 has a shape of being extended leftward and rightward around the rear end of the beam frame 248, and is coupled to both left and right ends of the rear frame 252.

That is, the extend frame 249 is integrated with the beam frames 248 and the rear frame 252 at the rear ends of the beam frames 248. One end (rear end) of each of the pair of left and right gas springs 256 and 256 is pivotally attached to a position ahead of the left and right ends of the rear frame 252 on both left and right ends of the extended frame 249.

The hood 6 is held in an open position by the tension of the gas springs 256. Thus, when the front portion of the hood 6 is lifted to open the hood 6 with the upper end position of the hood shield 244 serving as a shaft fulcrum, the gas springs 256 keep the hood 6 in the open state. In this state, maintenance of the diesel engine 5 can be performed.

As illustrated in FIG. 20 or the like, a left engine cover frame 257 has a shape of being tilted upward from a front end thereof to a rear end thereof. The rear end of the left engine cover frame 257 is coupled to a left edge of a left side shield surface 246 of the hood shield 244, and the front end thereof is coupled to a coupling bracket 259 coupled to a side surface of the left engine frame 14. The coupling bracket 259 is secured to the engine frame 14 at a position between the frame bottom plate 233 and the front engine leg body 238. The left engine cover 232 is secured to a lower side of the left side surface of the hood 6 by being coupled to front and rear end portions and a middle portion of the left engine cover frame, and by being coupled to a left side surface of the engine support frame 237.

A right engine cover frame 258 is coupled to the coupling bracket 259 whose front end is coupled to the side surface of the engine frame 14. The right engine cover frame 258 has a shape of being tilted upward toward the back and then bent downward. A rear end of the right engine cover frame 258 has a height position equal to the front end thereof, and both ends of the right engine cover frame 258 are coupled to a lower plate 258*a* secured to the engine cover frame 258. One end of an upper plate 258*b* is coupled to a bent part of the engine cover frame 258.

The right engine cover 232 is secured to a lower side of the right side surface of the hood 6 by being coupled to front and rear end portions of the left engine cover frame, and by being coupled to the other end of the upper plate 258*b*. The right engine cover 232 has a shape obtained by cutting away the part of the lower edge thereof, and is configured so that the oil filter 63 of the engine 5 is projectable outward. The right engine cover 232 has a smaller back-and-forth-direction length than the left engine cover 233. The exhaust pipe 227 and the tailpipe 229 are coupled to each other behind the right engine cover 232.

As illustrated in FIGS. 16 and 17, a perforated shield 205 is located below the exhaust-gas purification device (DPF) 52. The perforated shield 205 covers the left side of the engine 5. Since the shield 205 is configured to cover the exhaust manifold 57, the turbocharger 81, and the exhaust connecting pipe 84, high-heat sources in the engine 5 are covered with the shield 205. Thus, the temperature of the exhaust gas supplied to the DPF 52 is maintained high, and decrease in the regeneration ability of the DPF 52 is prevented. Since the shield 205 is perforated and located to face the similarly perforated left side engine cover 232, some of air heated by the engine 5 is discharged to the outside through the shield 205 and the engine cover 232. This configuration prevents heat retention on the left side of the engine 5 where the temperature becomes relatively high.

The shield 205 is bolted to the exhaust gas introduction port side of the exhaust connecting pipe 84 (coupling portion coupled to the turbine case 82 of the turbocharger 81) and coupled to a rear component coupling portion 182*d* of an outlet side second bracket 182 via a shield securing bracket 207 to be supported by the engine 5. The shield securing bracket 207 is also coupled to the upstream relay pipe 223, which connects the fresh air introduction port of the intercooler 224 to the compressor case 83 of the turbocharger 81, and the upstream relay pipe 223 is also supported by the outlet side second bracket 182 of the engine 5.

As illustrated in FIGS. 16 and 17, a heat insulating member 206 is coupled to one side of the engine 5. The heat insulating member 206 is provided below the exhaust manifold 57, and an engine starter 69 is located below the heat insulating member 206. The heat insulating member 206, which is coupled to the left side of the cylinder block 54, extends upright toward the engine cover 232 at a position between the engine starter 69 and the EGR cooler 80. Thus, the heat insulating member 206 covers over the electric device, which is the starter 69 in this embodiment. This reduces thermal influence on the starter 69 caused by heat dissipation from the exhaust manifold 57 that is heated and prevents failure of the electric device, which is the starter 69 in this embodiment.

As illustrated in FIGS. 4 to 10 and FIGS. 23 and 24 or the like, the fuel tank 11 includes a left tank 11L and a right tank 11R disposed below the floor plate 40 of the cabin 7 and inside a pair of left and right steps 10 and rear wheels 4 (close to the body frame 11). The left tank 11L and the right tank 11R are distributed into left and right sides so as to sandwich therebetween the pair of body frames 14. That is, a front part of the left tank 11L is disposed between the left body frame 14 and the left step 10, and a rear part thereof is disposed between the left body frame 14 and the left rear wheel 4. Similarly, a front part of the right tank 11R is disposed between the right body frame 14 and the right step 10, and a rear part thereof is disposed between the right body frame 14 and the right rear wheel 4. The pair of left tank 11L and right tank 11R have different capacities, and their respect lower parts are communicated with each other via a fuel communication pipe 281.

The left tank 11L having a large capacity has such a shape as to cover the front of the left step 10 in front of the cabin 7, and includes a fuel filler opening 283 on a front upper surface of the step 10. That is, the left tank 11L is disposed so as to surround the right side and font side of the left step 10. Because the fuel filler opening 283 disposed on the left tank 11L is disposed at a position adjacent to the left step 10, the operator is capable of passing through the left step and performing a refueling operation into the fuel tank 11, thereby facilitating the refueling operation. Additionally, because the fuel tank 11 is disposed inside the steps 10 and the rear wheels 4, any direct collision with an object outside the body is avoidable, and damage to the fuel tank 11 is preventable.

An oil separator 215 that supplies the fuel in the fuel tank 11 to the diesel engine 5 is disposed in front of the right tank 11R having a small capacity. The oil separator 215 is protected by covering an outer periphery of the oil separator 215 and covering over the oil separator 215 with a plate 285 being disposed upright from the tank frame 18. The outer periphery of the oil separator 215 is covered with the plate 285 that is also coupled to a right side surface of the engine support frame 237. The fuel in the fuel tank 11 is subjected to water removal by the oil separator 215 and then supplied to the fuel supply pump 64 of the engine 5. That is, the oil separator 215 lies on a fuel supply pipe to couple the left tank 11L and a fuel filter 209 of the diesel engine 5.

The oil separator 215 is made of a transparent container in order to visualize the separated fuel and water. The oil separator 21 is provided with a sensor that detects a water content of the fuel (the content of separated water) and indicates the water content to the engine ECU 271 or the like. Thus, the engine ECU 271 receives a signal from the sensor of the oil separator 215, thereby making it possible to inform the operator sitting on the operator's seat 8 of the water content in the fuel by, for example, a meter panel or monitor.

The fuel tank 11, namely, the pair of left tank 11L and right tank 11R having different capacities, are distributed into the left and right sides of the traveling body 2, and are communicated with each other via the fuel communication pipe 281. The fuel filler opening 283 is disposed on the front side of the left tank 11L having the large capacity, and the oil separator 215 is disposed on the front of the right tank 11R having the small capacity. The fuel is supplied from the left tank 11 via a fuel boost pump 213 to the diesel engine 5. This ensures that the fuel tank 11 made up of the left tank 11L and the right tank 11R can have a large capacity as much as possible, and also ensures the location of the oil separator 215 at a region adjacent to the diesel engine 5.

The fuel tank 11 is mounted on the tank frame 18 bulging leftward, rightward, and outward below the body frame 15, and is secured by a band 286. The tank frame 18 is made into a rectangular frame shape in a bottom view by a front transverse frame 287 being secured in a hanging manner to the left and right body frames 15, a rear transverse frame 288 being secured to the lower surface of the transmission case 17, and left and right tank mounting plates 289 and 290 being secured to both ends of each of the transverse plates 287 and 288. The left and right tank mounting plates 289 and 290 have respectively approximately the same shape as a bottom shape of the left tank 11L and a bottom shape of the right tank 11R, and are secured by binding, with a band 286, two front and rear points of each of the left tank 11L and the right tank 11R respectively mounted on the upper surfaces of the plates 289 and 290.

The front parts of the pair of left and right body frames 15 are respectively coupled to the rear parts of the pair of left and right engine frames 14. The tank frames (tank support plates) 18, which support from below the left tank 11L and the right tank 11R on which the transmission case 17 is disposed between the rear parts of the body frames 15, are coupled to each other by the pair of front and rear transverse frames 287 and 288. The tank frames (tank support plates) 18 are supported in the hanging manner by coupling from below the pair of front and rear transverse frames 287 and 288 to the support beam frame 236 and the transmission case 17.

The front transverse frame 287 is coupled to both left and right end lower surfaces of the support beam frame 236 via a spacer 287b, and is supported in the hanging manner by the support beam frame 236. That is, the front transverse frame 287 is supported in the hanging manner by the support beam frame 236 in such a way that a pair of left and right bolts are fastened into bolt holes provided on the lower surface of the support beam frame 236 by interposing therebetween the front transverse frame 287 and the spacer 287b. The rear transverse frame 288 is bolt-fastened to the transmission case 17 with a spacer 288b interposed therebetween. That is, the rear transverse frame 288 is supported in the hanging manner by the transmission case 17 in such a way that the pair of left and right bolts are fastened into bolt holes provided on a lower surface of the intermediate case 114 of the transmission case 17 by interposing therebetween the rear transverse frame 288 and the spacer 288b.

Thus, the tank frame (tank support plate) 18 is made up of the pair of front and rear transverse frames 287 and 288 extended leftward and rightward below the left and right rear frames, and the pair of left and right tank mounting plates 289 and 290 on which the front and rear transverse frames 287 and 288 are held in a back-and-forth direction on both left and right sides. The left and right fuel tanks 11L and 11R are respectively mounted and secured onto the left and right tank mounting plates 289 and 290. This ensures support strength to support the fuel tanks 11L and 11R that become heavy, while reducing the weight of the tank frame (tank support plate) 18 itself.

Additionally, the front end of each of the left and right body frames 15 is held by the support beam frame 236, and the rear end of each of the left and right body frames 15 is coupled to the left and right side surfaces of the transmission case 17. Each of the front and rear transverse frames 287 and 288 is secured in the hanging manner by being fastened to the lower surface of the support beam frame 236 and the transmission case 17. Thus, the tank frame (tank support plate) 18 to support the fuel tank 11 (11L, 11R) that becomes heavy is secured to the highly rigid support beam frame 236 and the transmission case 17, thereby making it possible to support the fuel tank 11 in a highly rigid and stable manner.

As illustrated in FIGS. 23 to 27, the front support (anti-vibration support) 96 disposed on the body frame 14 and the front transverse frame 287 are coupled to each other by a coupling bracket 284. The front of the fuel tank 11R having the small capacity is embedded in a space surrounded by the front support 96, the front transverse frame 287, and the coupling bracket 284. The fuel tank 11R having the small capacity can be stably supported while increasing the capacity as much as possible. The coupling bracket 284 has an L-shape and is disposed upright from a right edge of a front part of the right tank mounting plate 289. The coupling bracket 284 is coupled to an upper part of the front support 96 being secured to the right body frame 14 so as to cross over the right fuel tank 11R.

The right end of the front transverse frame 287 is projected rightward beyond the right edge of the right tank mounting 290 being coupled to the upper surface of the right transverse frame 287. A first-stage tread member 10x located at a lower front is coupled to the right end of the front transverse frame 287. The step 10 disposed on the right side of the cabin 7 is made up of the first-stage tread member 10x coupled to the tank frame 18, and a second-stage tread member 10y coupled to the cabin frame 300. That is, the right step 10 is formed separately into the first-stage tread member 10x and the second-stage tread member 10y. The tread member 10x is secured to the tank frame 18 so that the first-stage tread member 10x is located anteriorly, and the tread member 10y is secured closely to the side doors 323 of the cabin frame 300.

As illustrated in FIG. 23 and FIGS. 25 to 27, the battery 272 is mounted on a battery case 291 covered with a battery cover 292, and is disposed on the right side of the right fuel tank 11R. The battery case 291 is coupled to a right surface of the coupling bracket 284 being disposed upright from the right fuel tank 11R. A bottom surface of the battery case 291 is coupled to an upper end portion of the first-stage tread member 10x of the right step 10. Therefore, the battery case 291 is supported above the right side of the tank frame 18 with the coupling bracket 284 and the tread member 10x interposed therebetween.

Figure 26:
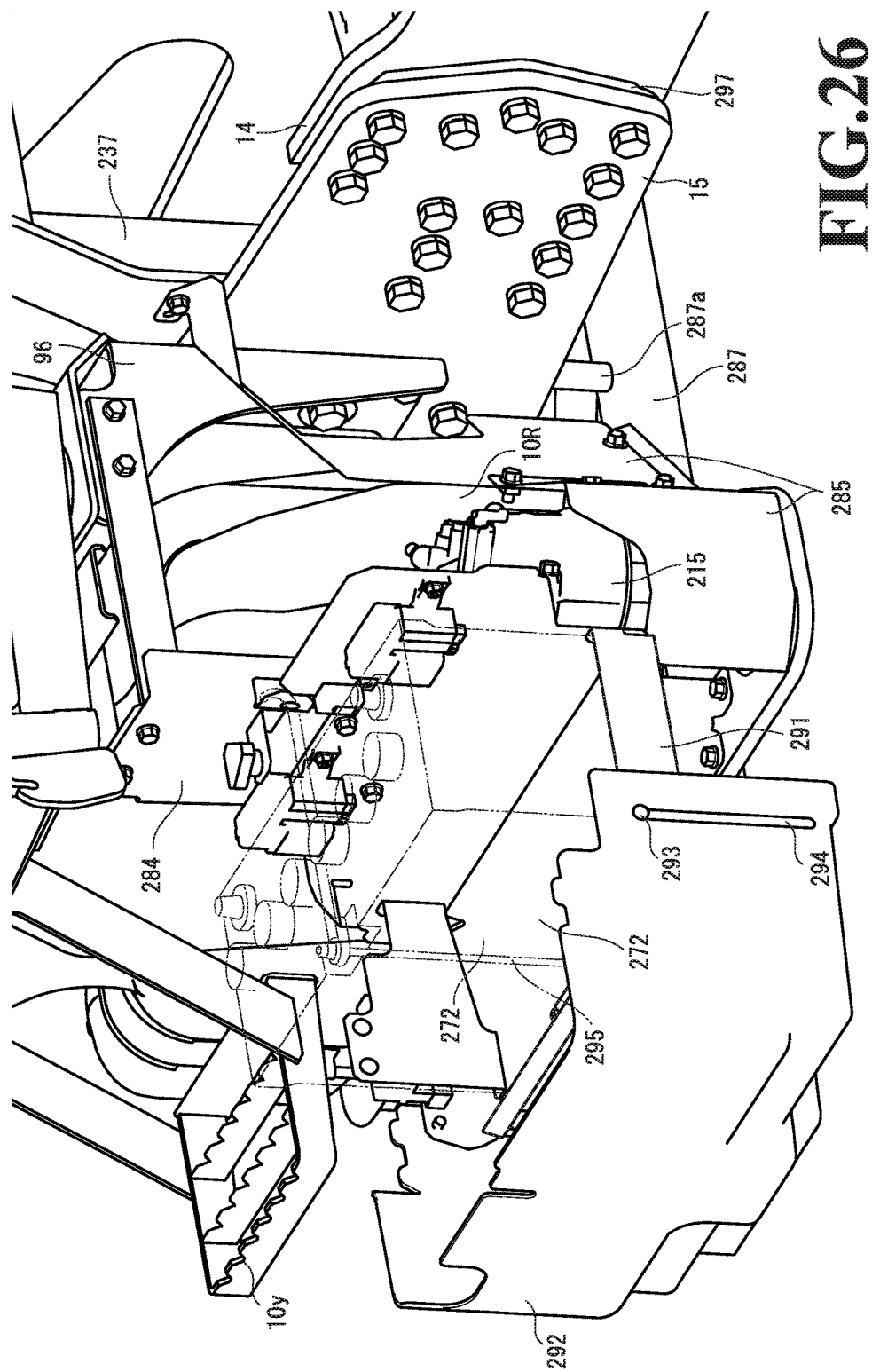
FIG. 26 is a perspective view illustrating the support configuration of the battery as viewed from an upper side.
Figure 27:
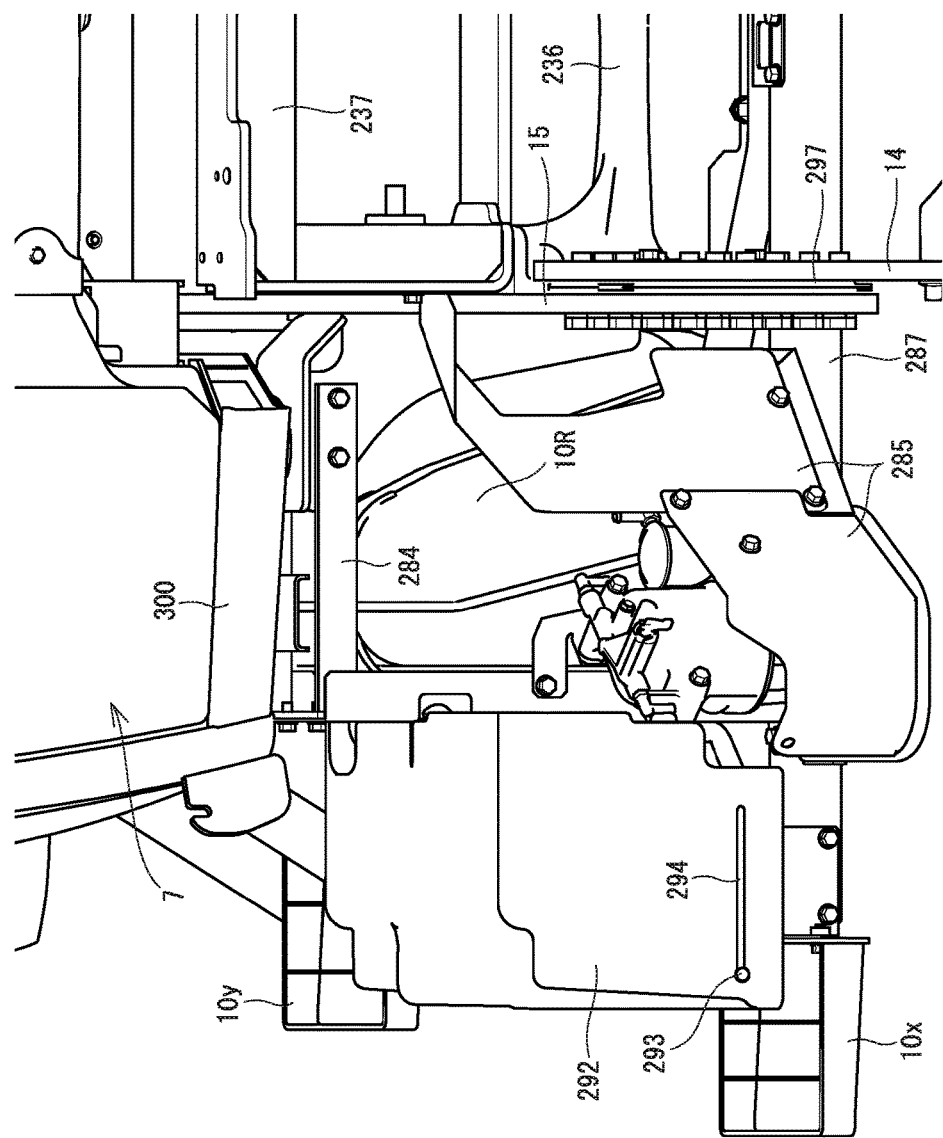
FIG. 27 is a perspective view illustrating a mounted state of the battery.

As illustrated in FIGS. 26 and 27, the battery cover covering the battery case 291 is configured to be free to open and close. That is, the battery case 291 has, on a side surface thereof, a slide guide 293 used when the battery cover 292 is slide laterally. The side surface of the battery cover 292 is provided with a slide groove 294 that permits insertion of the slide guide 293. Therefore, the battery cover 292 is slidable laterally with respect to the battery case 291 being coupled and secured to the tank frame 18. The battery 272 mounted on the battery case 291 is secured to the battery case 291 by a detachable battery securing tool 295.

Figure 28A:
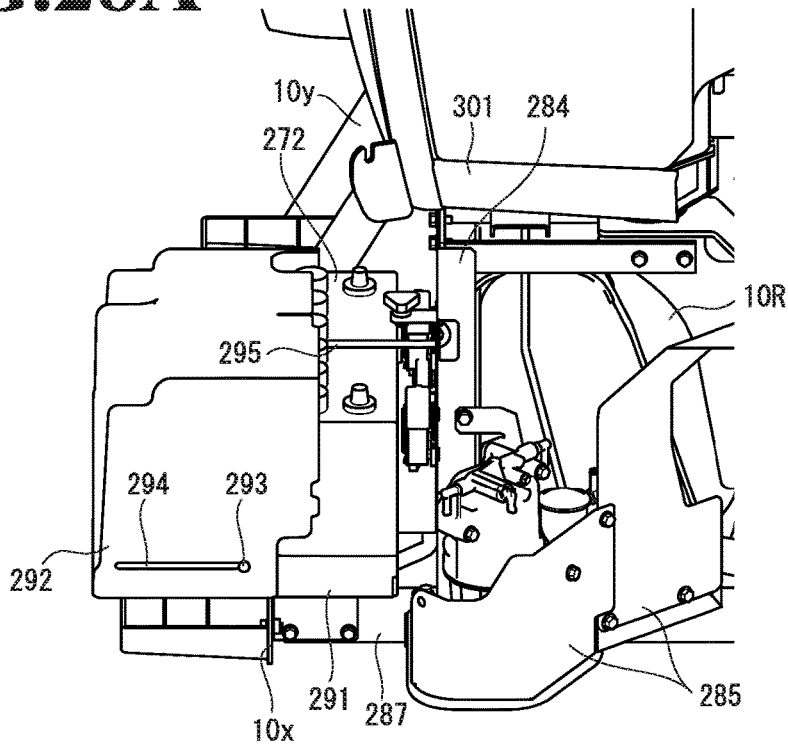
FIG. 28(a) is a diagram illustrating opening/closing operation of a battery cover, specifically a state in which the battery cover is slid.
Figure 28B:
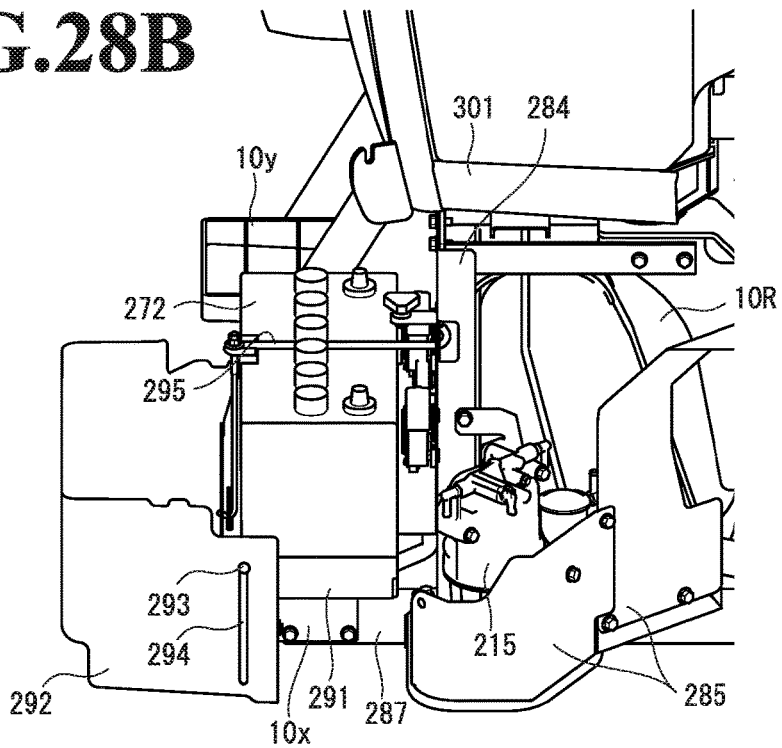
FIG. 28(b) illustrates a state in which the battery cover is rotated.

A transition state of the battery cover 292 when a state in which the battery case 291 is covered with the battery cover 292 (a closed state) as illustrated in FIG. 27 is changed to a state in which the battery cover 292 is opened (an open state) as illustrated in FIG. 26 is described with reference to FIG. 28. First, in the state in which the battery cover 292 is closed as illustrated in FIG. 27, a left end of the slide groove 294 disposed on the front side surface of the battery cover 292 is in contact with the slide guide 293 on the front side surface of the battery case 291. Subsequently, as shown in FIG. 28(a), a right end of the slide groove 294 of the battery cover 292 is brought into contact with the slide guide 293 by sliding the battery cover 292 rightward. Thereafter, as shown in FIG. 28(b), the upper side of the battery case 291 can be opened by rotating the battery cover 292 by using the slide guide 293 as a central axis.

Figure 29:
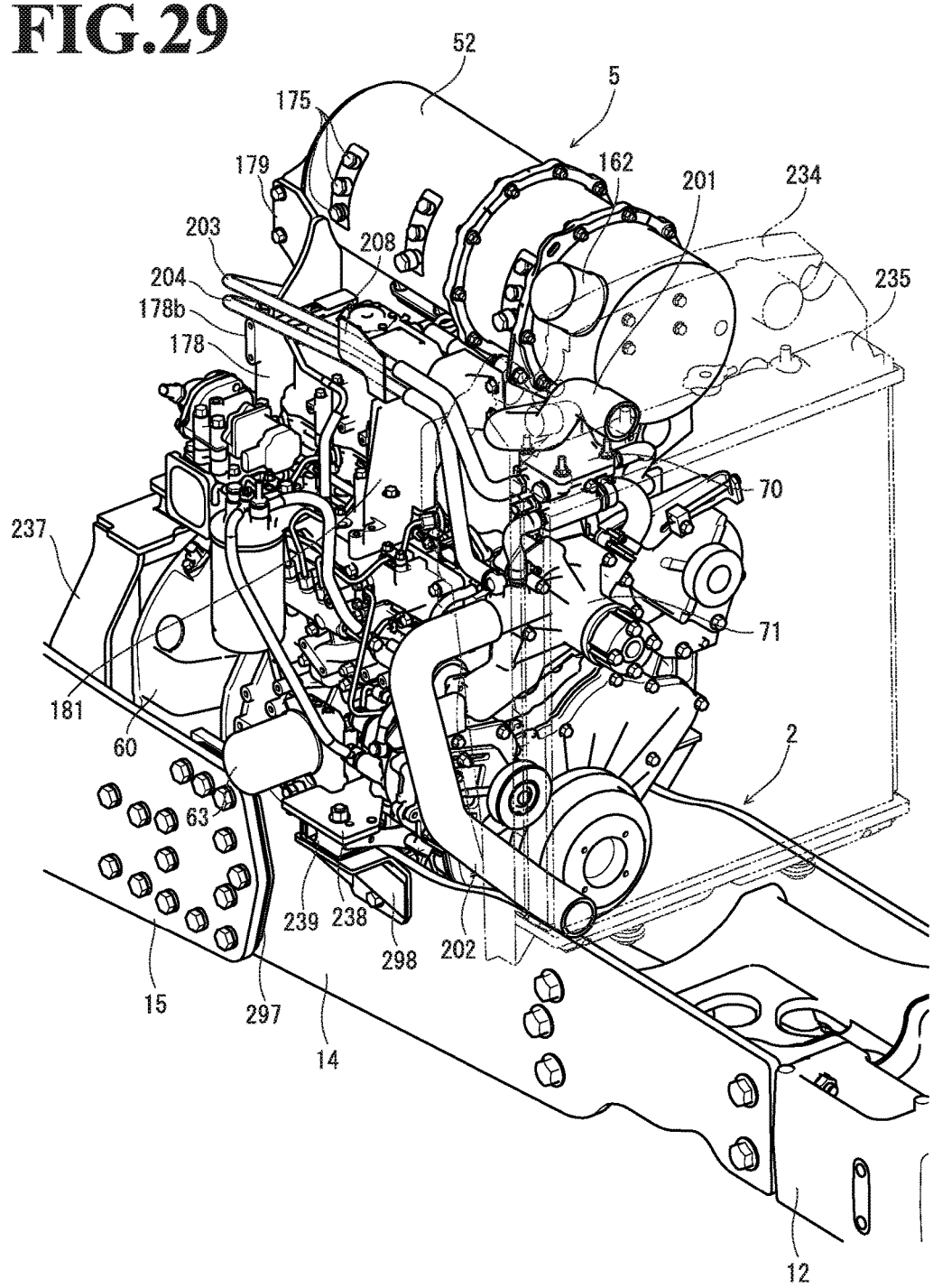
FIG. 29 is a front perspective view illustrating a relationship between the diesel engine and a radiator.

As illustrated in FIG. 29, the radiator 235 includes a coolant discharge port at the upper section and a coolant introduction port at the lower section. The coolant discharge port of the radiator 235 communicates with the coolant introduction port of the thermostat case 70 via a coolant supply pipe 201. The coolant introduction port of the radiator 235 communicates with a coolant discharge port of the coolant pump 71 via a coolant return pipe 202. The coolant in the radiator 235 is supplied to the coolant pump 71 via the coolant supply pipe 201 and the thermostat case 70. When the coolant pump 71 is driven, the coolant is supplied to the water-cooling jacket (not shown), which is formed in the cylinder block 54 and the cylinder head 55, to cool the engine 5. The coolant that has contributed to cooling the engine 5 is returned to the radiator 235 via the coolant return pipe 202.

The thermostat 70 is also coupled to the warm water pipe 203, and the coolant pump 71 is also coupled to the warm water pipe 204. The coolant (warm water) that has contributed to cooling the engine 5 is circulated to the air conditioner 364 of the cabin 7. Thus, warm water circulates in the air conditioner 364 of the cabin 7, and the air conditioner (not shown) supplies warm air into the cabin 7. This configuration allows an operator to adjust the temperature in the cabin 7 to a desired temperature.

The coolant inlet that is bent rightward above the thermostat case 70 communicates with the coolant outlet (coolant discharge port) at the upper section of the radiator 235 via the coolant supply pipe 201. The radiator 235 is located forward of the engine 5 with the fan shroud 234 located in between. Also, the coolant discharge port of the coolant pump 71 projects rightward from the main body of the coolant pump 71 and communicates with the coolant introduction port at the lower section of the radiator 235 via the coolant return pipe 202. The coolant supply pipe 201 and the coolant return pipe 202, which are coupled to the radiator 235, are both arranged on the right side of the engine 5. This configuration not only reduces thermal influence on the coolant caused by exhaust heat from the engine 5, but also improves workability in assembly and disassembly.

As illustrated in FIG. 29, the warm water pipes 203, 204, which circulate warm water (coolant) to the air conditioner 364, are respectively coupled to the thermostat 70 and the coolant pump 71. The warm water pipes 203, 204 extend rearward on the right side position of the exhaust-gas purification device 52 and are coupled to the air conditioner 364 in the cabin 7. That is, the warm water pipes 203, 204, which are coupled to the thermostat 70 and the coolant pump 71 on the right side, extend rearward in a bundle located one above the other. The warm water pipes 203, 204 are also arranged to pass above a bent portion (middle portion) 181c of an outlet side first bracket 181. The warm water pipes 203, 204 are coupled to a middle component coupling portion 181d on the bent portion 181c of the outlet side first bracket 181 via a warm water pipe securing bracket 208 to be supported by the engine 5.

Figure 30:
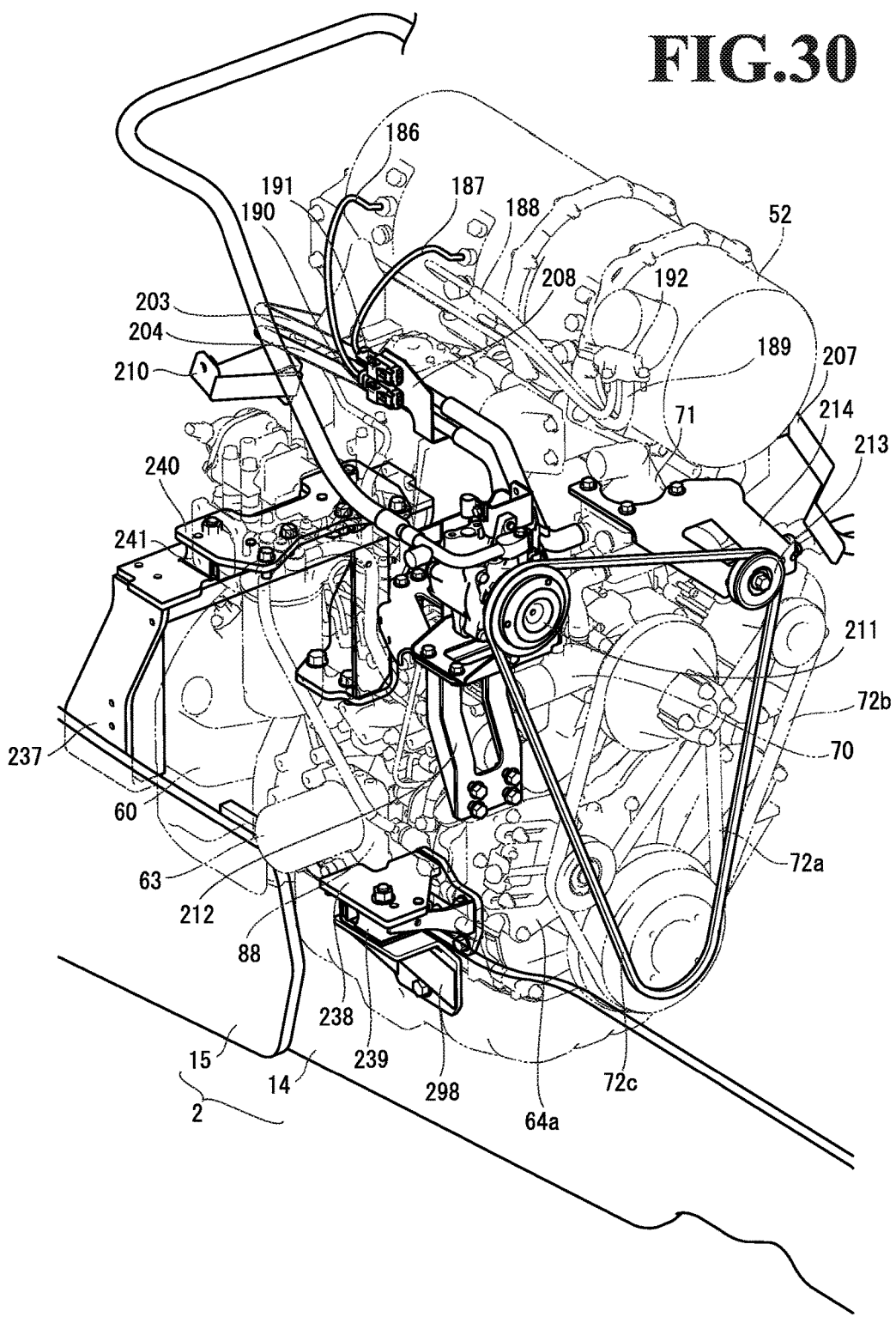
FIG. 30 is a front perspective view illustrating an arrangement positions of components included in the diesel engine.

As illustrated in FIG. 30 or the like, the DPF 52 includes temperature sensors 186, 187, which detect exhaust gas temperature that flows through a gas purification housing 168. The temperature sensors 186, 187 are, for example, thermistor temperature sensors. The temperature sensors 186, 187 are inserted in the gas purification housing 168 and include wiring connectors 190, 191 for outputting measurement signals. The wiring connectors 190, 191 of the temperature sensors 186, 187 are secured to the warm water pipe securing bracket 208. The warm water pipe bracket 208 is configured by a plate that is bent into an L-shape and extends upright from the bent portion 181c of the outlet side first bracket 181 to be parallel to the DPF 52.

Figure 32:
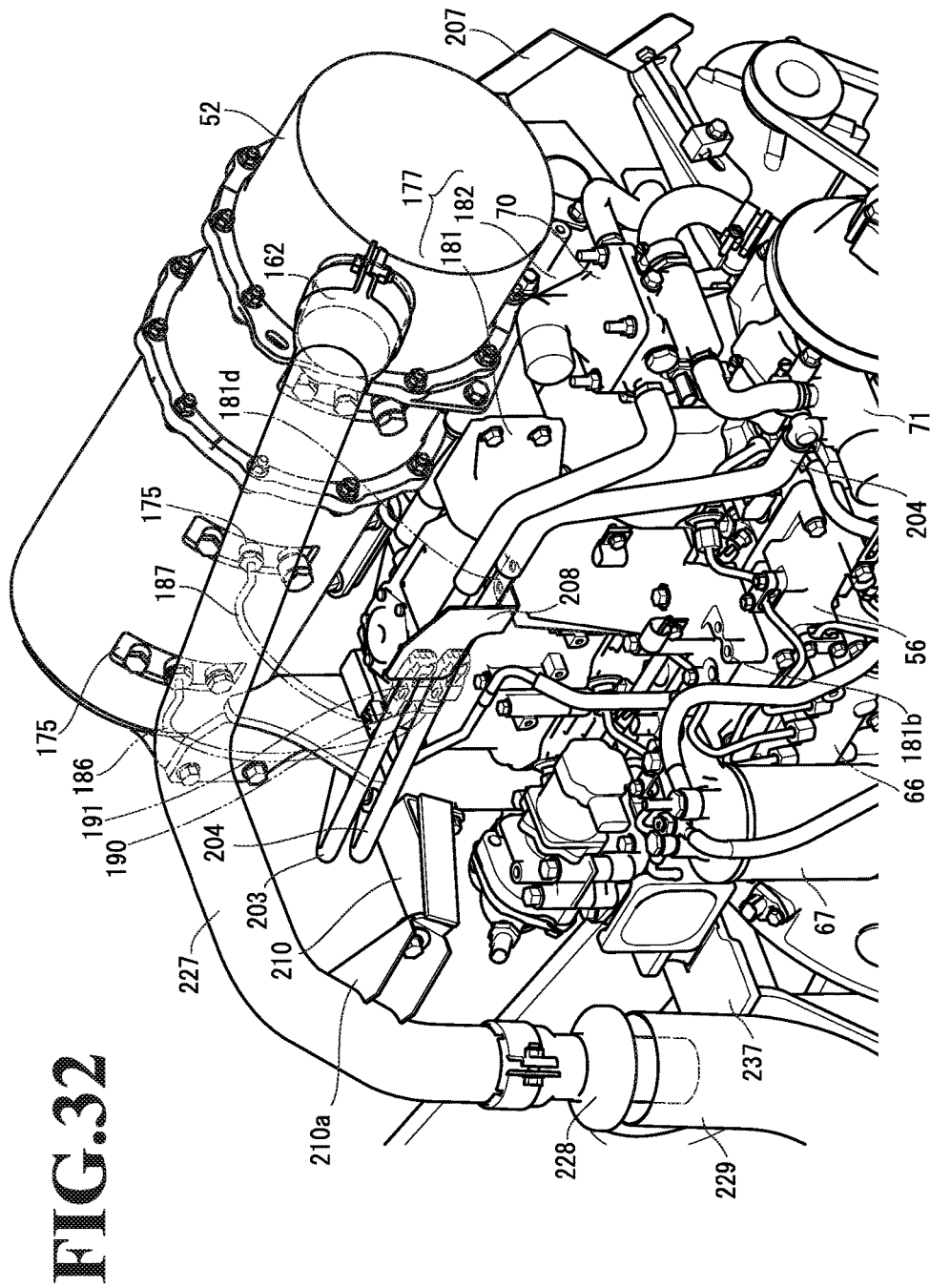
FIG. 32 is an enlarged perspective view of the diesel engine and a tailpipe illustrating how the diesel engine and the tailpipe are coupled to each other.
Figure 33:
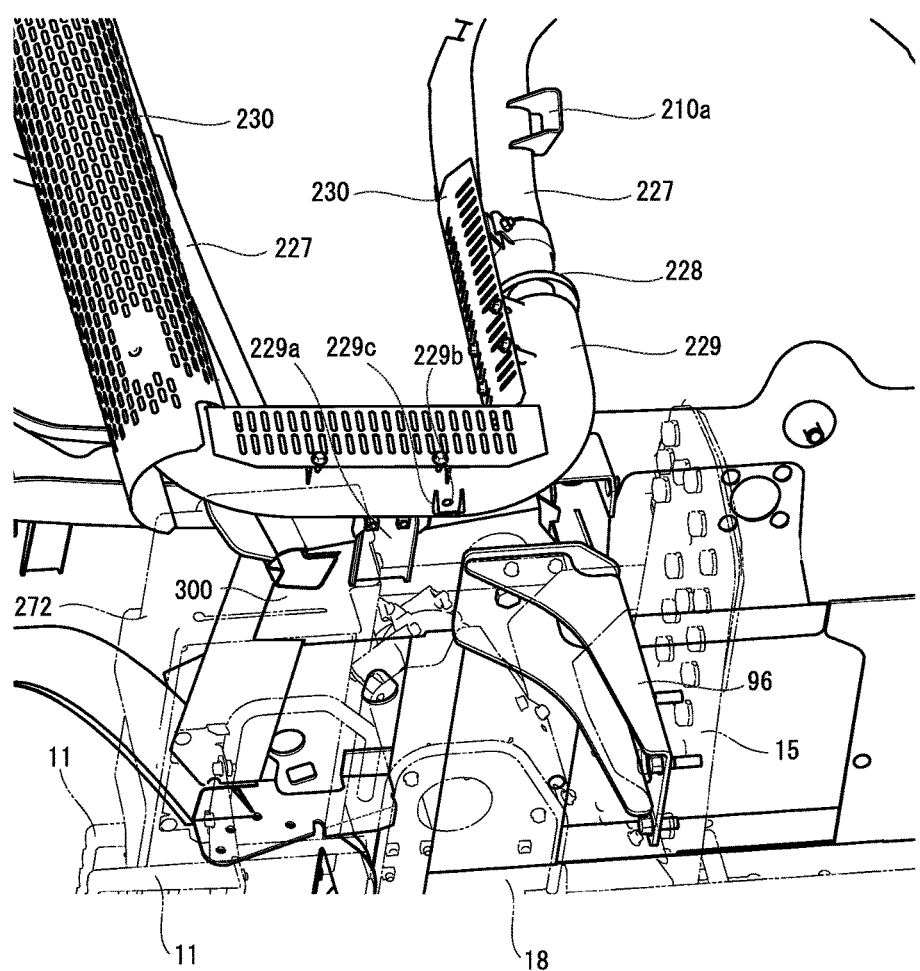
FIG. 33 is a bottom perspective view for describing a configuration on a lower side of the tailpipe.

As illustrated in FIGS. 30 and 32 or the like, while the warm water pipes 203, 204 are secured to the left side (side facing the DPF 52) of the warm water pipe securing bracket 208, the wiring connectors 190, 191 are secured to the right side (side further from the DPF 52) of the warm water pipe securing bracket 208. The warm water pipes 203, 204, which supply coolant (warm water) that has contributed to cooling the engine 5 to an external device such as the air conditioner 364, are provided close to the DPF 52. This prevents decrease in the coolant temperature supplied to the external device. Providing a component to stand on the outer side of the warm water pipe securing bracket 208 insulates the heat of exhaust heat from the DPF 52. The electric components, which are the wiring connectors 190, 191 in this embodiment, are arranged on the further side of the warm water pipe securing bracket 208 from the DPF 52. This reduces influence caused by the exhaust heat from the engine 5 and the DPF 52, prevents failure caused by heat, and simultaneously inhibits noise from being superimposed on the output signal.

Figure 31:
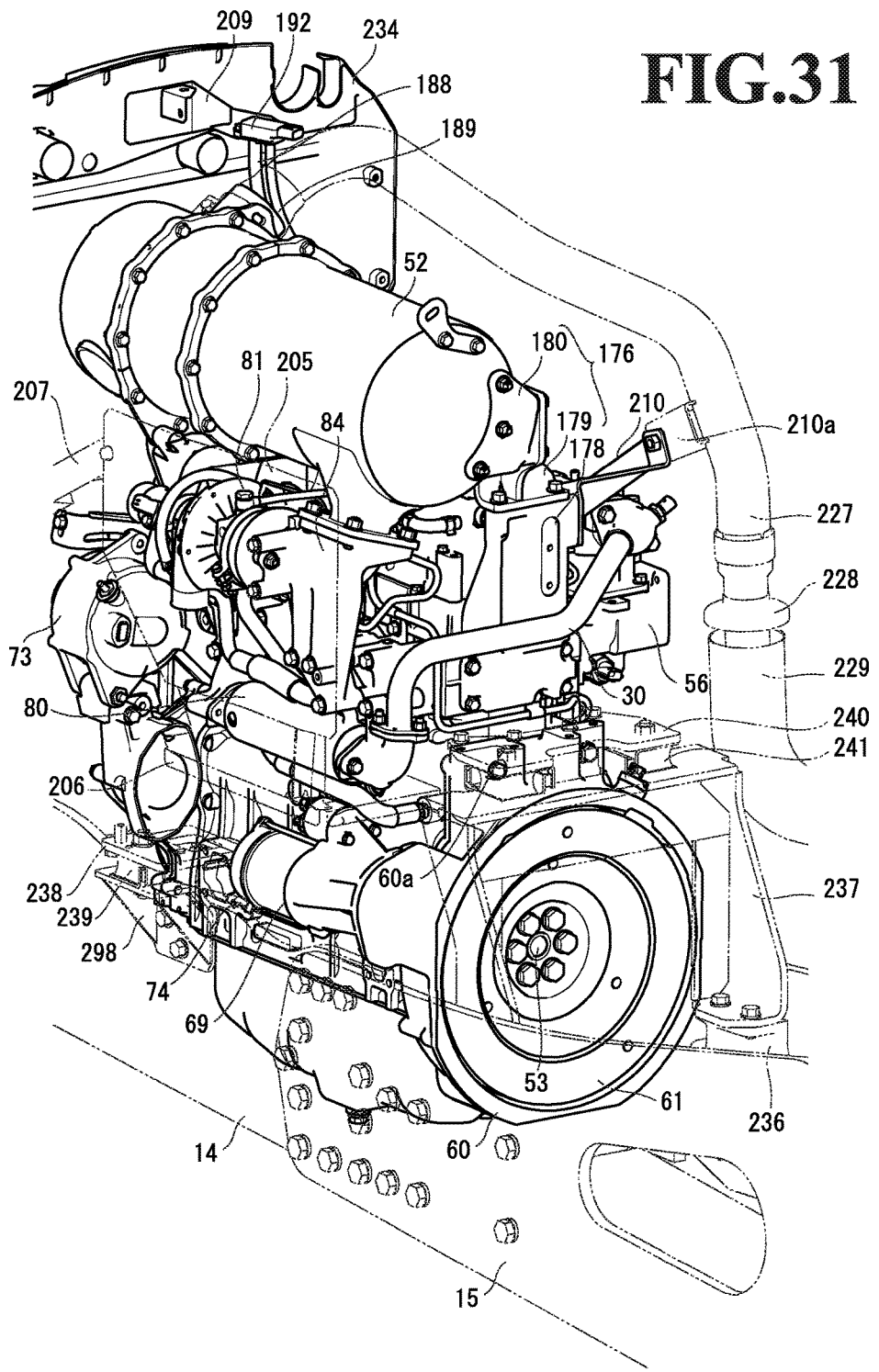
FIG. 31 is a rear perspective view illustrating an arrangement relationship of components in the engine compartment.

As illustrated in FIGS. 30 to 32 or the like, the DPF 52 includes sensor pipes 188, 189. The sensor pipes 188, 189 are coupled to positions at the front and the rear of a soot filter 164 in the gas purification housing 168 to detect the difference between the pressure of the exhaust gas in the section upstream of the soot filter 164 and the pressure of the exhaust gas in the section downstream of the soot filter 164 with a pressure difference sensor 192. The deposition amount of the particulate matter in the soot filter 164 is converted based on the pressure difference detected by the pressure difference sensor 192 to grasp the state of clogging in the DPF. A sensor bracket 209 is located on the fan shroud 234, which is located in front of the engine 5 and surrounds the cooling fan 59. The pressure difference sensor 192 is secured to the sensor bracket 209.

The sensor bracket 209 projects rearward from the rear surface of the fan shroud 234 and is located at a position higher than sensor bosses 175 and rightward of the DPF 52. The sensor bosses 175 are coupled to the sensor pipes 188, 189. The pressure difference sensor 192 is secured to the upper surface of the sensor bracket 209, and the sensor pipes 188, 189 are coupled to the sensor bracket 209 from the lower side. In this embodiment, the pressure difference sensor 192, which is secured to the sensor bracket 209, is located at a position higher than the DPF 52.

Since the sensor 192, which measures the internal environment of the DPF 52, is secured at the upper section of the fan shroud 234, the sensor 192 is located at an upstream section in the engine compartment along the flow direction of the cooling air. This configuration reduces influence of exhaust heat from the engine 5 and the DPF 52 and prevents failure of the sensor 192 that might otherwise be caused by the heat. Thus, the internal environment of the DPF 52 is properly grasped to optimally control the engine 5.

The exhaust gas outlet pipe 162 of the DPF 52 is provided close to the cooling fan 59. The pressure sensor 63, which measures the pressure difference between the front and the rear of the purification filter 164 in the DPF 52, is secured to the upper section of the fan shroud 234. The DPF 52 is located in a direction along the output shaft 53 of the engine 5. The pressure sensor 63, which measures the pressure at the front and the rear of the purification filter 164 close to the exhaust outlet, is located at the upper section of the fan shroud 234 adjacent to the exhaust outlet. This configuration reduces the length of the pressure measurement pipes 188, 189, which are located between the pressure sensor 63 and the DPF 52, and reduces measurement errors caused by the pressure sensor 234.

As illustrated in FIG. 30, the tractor 1 of this embodiment includes an air conditioner compressor 211. The air conditioner compressor 211 compresses refrigerant to be supplied to the air conditioner 364 of the cabin 7. The air conditioner compressor 211 receives power transmitted from the front end of the output shaft 53 of the engine 5 via a compressor V-belt 72*c* to be driven by the engine 5. The air conditioner compressor 211 is located at a position higher than the coolant pump 71 on the front right side of the engine 5. The air conditioner compressor 211 is mounted on a compressor securing bracket 212. One end of the compressor securing bracket 212 is coupled to an extended bracket 64*a*. The extended bracket 64*a* is coupled to the front section of a fuel supply pump 64.

The compressor securing bracket 212 is bent into an L-shape, and the air conditioner compressor 211 is secured to and located on the upper surface of the compressor securing bracket 212. The compressor securing bracket 212 is supported by the engine 5 by coupling one end of the compressor securing bracket 212 at the lower end to the extended bracket 64*a* and coupling the other end of the compressor securing bracket 212 at the upper end to a proximal end component coupling portion 181*b* at a proximal end of the outlet side first bracket 181. A pulley 213 is located on the front left side of the engine 5. The pulley 213 keeps the compressor V-belt in tension. The pulley 213, around which the compressor V-belt 72*c* is wound, is secured to the front edge of a position adjustment bracket 214 to be able to adjust the position. The position adjustment bracket 214 is coupled to the thermostat case 71 and projects forward of the engine 5.

As illustrated in FIG. 5, FIGS. 8 to 10, and FIGS. 31 and 32 or the like, the exhaust gas purification device 52 includes the exhaust gas outlet pipe 162 on the case outer circumferential surface at the other end (front end) of the exhaust gas purification device 52 in the longitudinal direction. The exhaust gas outlet pipe 162 is coupled to the exhaust pipe 227. The exhaust pipe 227 is located to extend over the engine 5 from the front left side toward the rear right side of the diesel engine 5. The exhaust pipe 227 is located between the exhaust gas purification device 52 and the downstream relay pipe 225 to be approximately parallel to the exhaust gas purification device 52 and the downstream relay pipe 225.

The exhaust gas purification device 52 and the exhaust pipe 227 are arranged above the engine 5 next to each other in the left and right direction to be parallel to the output shaft of the engine 5. That is, the exhaust gas purification device 52 and the exhaust pipe 227 are arranged next to each other such that the exhaust gas purification device 52 covers the left section of the upper surface of the engine 5, and the exhaust pipe 227 covers the right section of the upper surface of the diesel engine 5. The downstream relay pipe 225, which connects the intercooler 224 and the intake connecting pipe 84, is located further rightward of the exhaust pipe 227. This configuration prevents the exhaust gas purification device 52 that is heated to a high temperature from thermally affecting the downstream relay pipe 225.

The exhaust pipe (first exhaust pipe) 227, which is coupled to the exhaust side of the exhaust gas purification device 52, is inserted in the exhaust gas inlet port of the tailpipe (second exhaust pipe) 229 on the rear right side of the diesel engine 5. The tailpipe 229 is located on the front right side of the cabin 7 and extends toward the exhaust gas discharge side from below upward. The tail pipe 229 is bent toward the diesel engine 5 below the cabin 7 so that the tail pipe 229 has a J-shape. The exhaust pipe 227 also includes an umbrella-like upper surface cover 228 on the outer circumferential surface above the section at which the exhaust pipe 227 is inserted in the tailpipe 229. The upper surface cover 228 is secured to the outer circumferential surface of the exhaust pipe 227 to extend in a radial pattern. The upper surface cover 228 covers the exhaust gas inlet port of the tailpipe 229 and prevents dust and rain water from entering the tailpipe 229.

The tailpipe 229 is formed such that the lower bent portion extends over the body frame 15 from the inner side to the outer side. The tailpipe 229 includes an exhaust gas inlet port provided on the inner side of the body frame 15 at an upper section, and the exhaust gas discharge port of the exhaust pipe 227 is inserted in the exhaust gas inlet port. That is, the coupling portion between the tailpipe 229 and the exhaust pipe 227 has a two-layer pipe structure. When exhaust gas flows from the exhaust pipe 227 to the tailpipe 229, outside air is simultaneously allowed to flow into the tailpipe 229 through the space between the exhaust pipe 227 and the tailpipe 229. This configuration cools the exhaust gas that flows in the tailpipe 229. Furthermore, the tailpipe 229 is configured to be covered with a heat insulator 230. Engine covers 232 are located below the hood 6 on the left and right sides to cover the left and right sides of the engine compartment. The engine covers 232 are made of perforated plates.

As illustrated in FIGS. 30 to 33, the exhaust pipe 227 is coupled to the exhaust gas outlet pipe 162, which is provided on the front right side of the outer circumferential surface of the DPF 52 facing upward. The exhaust pipe 227 is bent rearward along the exhaust gas flow direction and is arranged to be parallel to the DPF 52. The exhaust pipe 227 is bent downward at the downstream section along the exhaust gas flow such that the exhaust gas discharge port faces downward. The exhaust gas discharge port of the exhaust pipe 227 is inserted in the exhaust gas introduction port of the tailpipe 229, which is secured to the cabin 7. A securing coupling member 210*a* is provided at the middle of the outer circumference of the exhaust pipe 227. The exhaust pipe 227 is supported by the engine 5 by coupling the securing coupling member 210*a* to a bracket coupling portion 178*b* of a securing bracket 178 via an exhaust pipe securing bracket 210.

The tractor 1 includes the exhaust pipe (first exhaust pipe) 227, which is coupled to the exhaust gas outlet pipe 162 of the DPF 52 and secured to the engine 5, and the tailpipe (second exhaust pipe) 229, which is provided downstream of the exhaust pipe 227 and secured to the travelling machine body 2. The inner diameter of the tailpipe 229 is greater than the outer diameter of the exhaust pipe 227, and the exhaust outlet end of the exhaust pipe 227 is inserted in and communicates with the exhaust inlet of the tailpipe 229. The exhaust pipe 227 and the tailpipe 229 are securely coupled to the engine 5, the travelling machine body 2, and the cabin 7, which have different vibration systems. This configuration prevents damage on the exhaust pipe 227 and the tailpipe 229. Since the exhaust pipe 227 is configured to be inserted in the exhaust inlet of the tailpipe 229, the outside air is introduced into the tailpipe 229 together with the exhaust gas from the exhaust pipe 227. This cools the exhaust gas that is to be discharged outside.

The U-shaped tailpipe 229 is secured at a position forward of the operator's seat 8. That is, the tailpipe 229 is securely coupled to a front lower section of a cabin frame 300 of the cabin 7 via a securing bracket 229*a*. Four corners at the lower section of the cabin frame 300 of the cabin 7 are securely supported by the front supports 96 and the rear supports 97, which are located on the travelling machine body. A battery 272 for supplying power is provided at the lower right section of the cabin 7.

A drain hole 229b for drainage is provided at the lower section of the tailpipe 229, and a wind direction plate 229c is coupled to the lower section of the tailpipe 229. The wind direction plate 229c covers the drain hole 229b from below and the rear. Since the drain hole 229b is covered with the wind direction plate 229c, water is drained toward the front that is not covered with the wind direction plate 229b (in a direction to separate from the cabin 7). The drain hole 229b is provided inward (on the left side) of the battery 272. The wind direction plate 229 covers the left, the right, and the rear (three directions other than the front) of the drain hole 229b. Thus, when high-temperature water in the tailpipe 229 is drained to the outside, components having low heat resistance or low water resistance such as a harness or the battery 272, which are provided adjacent to the tailpipe 229, are prevented from being damaged by heat or causing failure due to water leakage.

The exhaust gas outlet pipe 162 and the exhaust gas inlet pipe 161 of the DPF 52 are distributed at the front and the rear of the DPF 52 such that exhaust gas from the 5 engine flows along the output shaft of the engine 5 in the exhaust-gas purification device (DPF) 52. The exhaust inlet of the exhaust pipe (first exhaust pipe) 227 is coupled to the exhaust gas outlet pipe 162, which is located at the front section of the DPF 52. The exhaust pipe (first exhaust pipe) 227 extends rearward along the DPF 52 above the engine 5, and the DPF 52 and the exhaust pipe (first exhaust pipe) 227 are covered with the heat insulator 250. Since the DPF 52 and the exhaust pipe (first exhaust pipe) 227 are covered with the heat insulator 250, the hood 6, which covers the engine compartment, is prevented from being heated by exhaust heat from the engine compartment.

The configurations of the components according to the invention of the present application are not limited to the illustrated embodiment, but may be modified in various forms without departing from the object of this invention.

The embodiment of the invention of the present application relates to work vehicles such as agricultural tractors or wheel loaders for civil engineering work.

What is claimed is:

1. A work vehicle comprising:
   an engine serving as a driving source;
   a traveling section configured to drive on a basis of power of the engine; and
   a transmission section configured to transmit the power of the engine to the traveling section,
   wherein a traveling body is configured by coupling left and right front frames and left and right rear frames in a back-and-forth direction, and an operator's seat is supported on the traveling body with a support mount interposed therebetween,
   wherein a pair of left and right fuel tanks are distributed into left and right sides of the traveling body, a tank support plate to support the fuel tanks from below is made up of a pair of front and rear transverse frames extended leftward and rightward below the left and right rear frames and a pair of left and right tank mounting plates on which the front and rear transverse frames are held in the back-and-forth direction on both left and right sides, and the left and right fuel tanks are respectively mounted and secured onto the left and right tank mounting plates, and
   wherein the support mount and the front transverse frame are coupled to each other by a coupling bracket.

2. The work vehicle according to claim 1,
   wherein a front end of each of the left and right rear frames is held by a beam frame, and a rear end of each of the left and right rear frames is coupled to left and right side surfaces of the transmission section, and the traveling body is supported by the traveling section with the transmission section interposed therebetween, and
   wherein each of the front and rear transverse frames is secured in a hanging manner by being fastened to a lower surface of the beam frame and a lower surface of the transmission section.

3. The work vehicle according to claim 1,
   wherein the left and right fuel tanks are fuel tanks having different capacities, and an oil separator to separate water from a fuel in the fuel tanks is mounted on a first tank mounting plate with a first fuel tank having a small capacity mounted thereon, and
   wherein the oil separator is mounted at a front position of the first fuel tank on the first tank mounting plate.

4. The work vehicle according to claim 1, wherein a step for getting on and off the operator's seat is coupled to one end of the front transverse frame being coupled to the support mount.

5. The work vehicle according to claim 1, wherein a battery is supported on one end of the front transverse frame.

6. The work vehicle according to claim 5, wherein an operator's seat is supported by an upper part of the traveling body with front support mounts interposed therebetween, a battery case of the battery is supported by the coupling bracket being coupled to one of the front support mounts of the support mounts, and the battery is accommodated in the battery case.

7. The work vehicle according to claim 5, wherein a step for getting on and off the operator's seat is disposed at lower left and right parts of the operator's seat, and a part of the step is supported by the front transverse frame.

* * * * *